(12) United States Patent
Yoshida et al.

(10) Patent No.: US 7,561,304 B2
(45) Date of Patent: Jul. 14, 2009

(54) METHOD OF JUDGING WHETHER OR NOT DARKNESS OF FOREIGN MATTER HAS BEEN READ, METHOD OF CALCULATING REPRESENTATIVE VALUE OF DARKNESS OF TEST PATTERN, AND APPARATUS THAT JUDGES WHETHER OR NOT DARKNESS OF FOREIGN MATTER HAS BEEN READ

(75) Inventors: Masahiko Yoshida, Nagano-ken (JP); Tatsuya Nakano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/605,432

(22) Filed: Nov. 29, 2006

(65) Prior Publication Data

US 2007/0121179 A1  May 31, 2007

(30) Foreign Application Priority Data

Nov. 29, 2005  (JP) ............................. 2005-344555

(51) Int. Cl.
  *G06F 1/00* (2006.01)
  *H04N 1/46* (2006.01)
(52) U.S. Cl. .................... 358/1.9; 358/504; 358/505; 382/167; 382/225
(58) Field of Classification Search ................. 358/3.23, 358/504, 474, 505, 453, 1.9; 382/167, 225, 382/275, 309
  See application file for complete search history.

(56) References Cited

U.S. PATENT DOCUMENTS

| | | | | |
|---|---|---|---|---|
| 5,692,066 A * | 11/1997 | Lee et al. | ..................... | 382/133 |
| 6,798,906 B1 * | 9/2004 | Kato | ........................... | 382/176 |
| 7,046,399 B2 * | 5/2006 | Endo | .......................... | 358/3.26 |
| 2001/0033683 A1 * | 10/2001 | Tanaka et al. | ............... | 382/149 |
| 2002/0071135 A1 * | 6/2002 | Takeda et al. | .............. | 358/1.14 |
| 2003/0139886 A1 * | 7/2003 | Bodzin et al. | ................ | 702/28 |
| 2003/0228583 A1 * | 12/2003 | Amacher et al. | .............. | 435/6 |
| 2005/0001870 A1 * | 1/2005 | Komatsu | ...................... | 347/19 |
| 2005/0179711 A1 * | 8/2005 | Yoshida | ......................... | 347/5 |
| 2005/0179953 A1 * | 8/2005 | Schweid | .................... | 358/3.26 |
| 2005/0179954 A1 * | 8/2005 | Arai et al. | .................. | 358/3.26 |
| 2005/0212832 A1 * | 9/2005 | Hoshiyama et al. | ........... | 347/5 |
| 2005/0212833 A1 * | 9/2005 | Yoshida | ......................... | 347/5 |
| 2006/0072450 A1 * | 4/2006 | Miyoshi et al. | ............. | 370/205 |
| 2006/0263101 A1 * | 11/2006 | Takamatsu et al. | ............ | 399/4 |

FOREIGN PATENT DOCUMENTS

| | | | |
|---|---|---|---|
| JP | 02-054676 | | 2/1990 |
| JP | 2005323100 A | * | 11/2005 |

* cited by examiner

*Primary Examiner*—Mark K Zimmerman
*Assistant Examiner*—Huo Long Chen
(74) *Attorney, Agent, or Firm*—Sughrue Mion, PLLC

(57) ABSTRACT

A method of judging whether or not darkness of a foreign matter on a test pattern printed on a medium with predetermined darkness has been read at the time of reading the darkness of the test pattern using a reading section, includes: detecting a section in the test pattern for which an amount of deviation, from a predetermined reference value, of a readout value on the darkness of that section exceeds a predetermined darkness-deviation threshold which is a threshold adopted for the deviation in darkness; and judging whether or not the darkness of the foreign matter has been read based on a size of the above-mentioned section that has been detected.

9 Claims, 28 Drawing Sheets

READ DARKNESS DATA TABLE

| row region number | cyan | | | | | magenta | | | | | |
|---|---|---|---|---|---|---|---|---|---|---|---|
| | darkness 1 | darkness 2 | darkness 3 | darkness 4 | darkness 5 | darkness 1 | darkness 2 | darkness 3 | darkness 4 | darkness 5 | |
| 1 | XXX | XXX | XXX | XXX | XXX | XXX | XXX | XXX | XXX | XXX | ... |
| 2 | XXX | XXX | XXX | XXX | XXX | XXX | XXX | XXX | XXX | XXX | |
| 3 | XXX | XXX | XXX | XXX | XXX | XXX | XXX | XXX | XXX | XXX | |

312 correction values for
front-end processing section

| row region number | cyan | | | magenta | | | yellow | | | black | | |
|---|---|---|---|---|---|---|---|---|---|---|---|---|
| | darkness 2 | darkness 3 | darkness 4 | darkness 2 | darkness 3 | darkness 4 | darkness 2 | darkness 3 | darkness 4 | darkness 2 | darkness 3 | darkness 4 |
| 1 | C2_1 | C3_1 | C4_1 | M2_1 | M3_1 | M4_1 | Y2_1 | Y3_1 | Y4_1 | K2_1 | K3_1 | K4_1 |
| 2 | C2_2 | C3_2 | C4_2 | M2_2 | M3_2 | M4_2 | Y2_2 | Y3_2 | Y4_2 | K2_2 | K3_2 | K4_2 |
| 3 | C2_3 | C3_3 | C4_3 | M2_3 | M3_3 | M4_3 | Y2_3 | Y3_3 | Y4_3 | K2_3 | K3_3 | K4_3 |
| ⋮ | ⋮ | | | ⋮ | | | ⋮ | | | ⋮ | | |

REFERENCE TABLE FOR DYE INK

| | cyan ink correction pattern | | | | | magenta ink correction pattern | | | | | yellow ink correction pattern | | | | | black ink correction pattern | | | | |
|---|---|---|---|---|---|---|---|---|---|---|---|---|---|---|---|---|---|---|---|---|
| | darkness 10% | darkness 30% | darkness 50% | darkness 70% | darkness 90% | darkness 10% | darkness 30% | darkness 50% | darkness 70% | darkness 90% | darkness 10% | darkness 30% | darkness 50% | darkness 70% | darkness 90% | darkness 10% | darkness 30% | darkness 50% | darkness 70% | darkness 90% |
| front-end processing section | α1 | α2 | α3 | α4 | α5 | β1 | β2 | β3 | β4 | β5 | γ1 | γ2 | γ3 | γ4 | γ5 | δ1 | δ2 | δ3 | δ4 | δ5 |
| regular processing section | α6 | α7 | α8 | α9 | α10 | β6 | β7 | β8 | β9 | β10 | γ6 | γ7 | γ8 | γ9 | γ10 | δ6 | δ7 | δ8 | δ9 | δ10 |
| rear-end processing section | α11 | α12 | α13 | α14 | α15 | β11 | β12 | β13 | β14 | β15 | γ11 | γ12 | γ13 | γ14 | γ15 | δ11 | δ12 | δ13 | δ14 | δ15 |

α1~δ15: darkness-deviation threshold ΔV

FIG. 34A

REFERENCE TABLE FOR PIGMENT INK

| | cyan ink correction pattern | | | | | magenta ink correction pattern | | | | | yellow ink correction pattern | | | | | black ink correction pattern | | | | |
|---|---|---|---|---|---|---|---|---|---|---|---|---|---|---|---|---|---|---|---|---|
| | darkness 10% | darkness 30% | darkness 50% | darkness 70% | darkness 90% | darkness 10% | darkness 30% | darkness 50% | darkness 70% | darkness 90% | darkness 10% | darkness 30% | darkness 50% | darkness 70% | darkness 90% | darkness 10% | darkness 30% | darkness 50% | darkness 70% | darkness 90% |
| front-end processing section | ε1 | ε2 | ε3 | ε4 | ε5 | ζ1 | ζ2 | ζ3 | ζ4 | ζ5 | η1 | η2 | η3 | η4 | η5 | κ1 | κ2 | κ3 | κ4 | κ5 |
| regular processing section | ε6 | ε7 | ε8 | ε9 | ε10 | ζ6 | ζ7 | ζ8 | ζ9 | ζ10 | η6 | η7 | η8 | η9 | η10 | κ6 | κ7 | κ8 | κ9 | κ10 |
| rear-end processing section | ε11 | ε12 | ε13 | ε14 | ε15 | ζ11 | ζ12 | ζ13 | ζ14 | ζ15 | η11 | η12 | η13 | η14 | η15 | κ11 | κ12 | κ13 | κ14 | κ15 |

ε1~κ15: darkness-deviation threshold ΔV

FIG. 34B

ID OF JUDGING WHETHER OR NOT
DARKNESS OF FOREIGN MATTER HAS
BEEN READ, METHOD OF CALCULATING
REPRESENTATIVE VALUE OF DARKNESS
OF TEST PATTERN, AND APPARATUS THAT
JUDGES WHETHER OR NOT DARKNESS OF
FOREIGN MATTER HAS BEEN READ

CROSS-REFERENCE TO RELATED
APPLICATIONS

The present application claims priority upon Japanese Patent Application No. 2005-344555 filed on Nov. 29, 2005, which is herein incorporated by reference.

BACKGROUND

1. Technical Field

The present invention relates to a method of judging whether or not darkness of a foreign matter has been read at the time of reading the darkness of a test pattern, a method of calculating a representative value of darkness of a test pattern, and an apparatus that judges whether or not darkness of a foreign matter has been read.

2. Related Art

Among printing apparatuses such as inkjet printers are those that, for example, adjust unevenness in ink ejection by reading, with a scanner etc., the darkness of a test pattern printed using the printing apparatus targeted for adjustment. (See, for example, JP-A-2-54676.)

However, there is a possibility that a foreign matter, such as dust and dirt, may be adhering to the surface of the test pattern or the reading mechanism of the scanner, and, at the time of reading the test pattern darkness, the darkness of the foreign matter may also be read. In such cases, if the darkness of the foreign matter is used for the above-mentioned adjustment processing, the adjustment precision will be affected by the darkness of the foreign matter.

Therefore, it is desirable to judge whether or not the darkness of a foreign matter has been read at the time of reading the darkness of the test pattern. A conceivable example of a judgment method, which may be employed particularly in cases where the test pattern is printed with predetermined darkness, is to "compare, with a predetermined threshold, the difference between the maximum value and the minimum value of readout values on the darkness of the test pattern, and judge that the darkness of a foreign matter has been read if the difference is larger than the threshold".

With this method, however, the judgment is made based merely on the difference between the maximum value and the minimum value. Therefore, the presence of extremely small dirt which would hardly affect the above-mentioned adjustment may fall under the above-mentioned judgment condition. That is, the presence of dirt whose planar dimension is small enough as not to cause any substantial problem may be judged that the darkness of a foreign matter has been read, and as a result thereof, a worker carrying out the adjustment task may be forced to perform cleaning and other unnecessary removal tasks even in the case of extremely small dirt. Therefore, the above-mentioned method has a drawback in terms of judgment accuracy.

SUMMARY

An advantage achieved by some aspects of the present invention is that it is possible to provide a method of judging whether or not darkness of a foreign matter has been read and a method of calculating a representative value of darkness of a test pattern, with which the judgment as to whether or not the darkness of a foreign matter has been read can be made more accurately.

A primary aspect of the invention is a method of judging whether or not darkness of a foreign matter on a test pattern printed on a medium with predetermined darkness has been read at the time of reading the darkness of the test pattern using a reading section, the method including:
detecting a section in the test pattern for which an amount of deviation, from a predetermined reference value, of a readout value on the darkness of that section exceeds a predetermined darkness-deviation threshold which is a threshold adopted for the deviation in darkness; and
judging whether or not the darkness of the foreign matter has been read based on a size of the above-mentioned section that has been detected.

Other features of the present invention will be made clear through the description of the present specification with reference to the accompanying drawings.

BRIEF DESCRIPTION OF THE DRAWINGS

FIGS. 34A and 34B show reference tables that are referred to for finding a darkness-deviation threshold.

DESCRIPTION OF EXEMPLARY EMBODIMENTS

Figure 1:
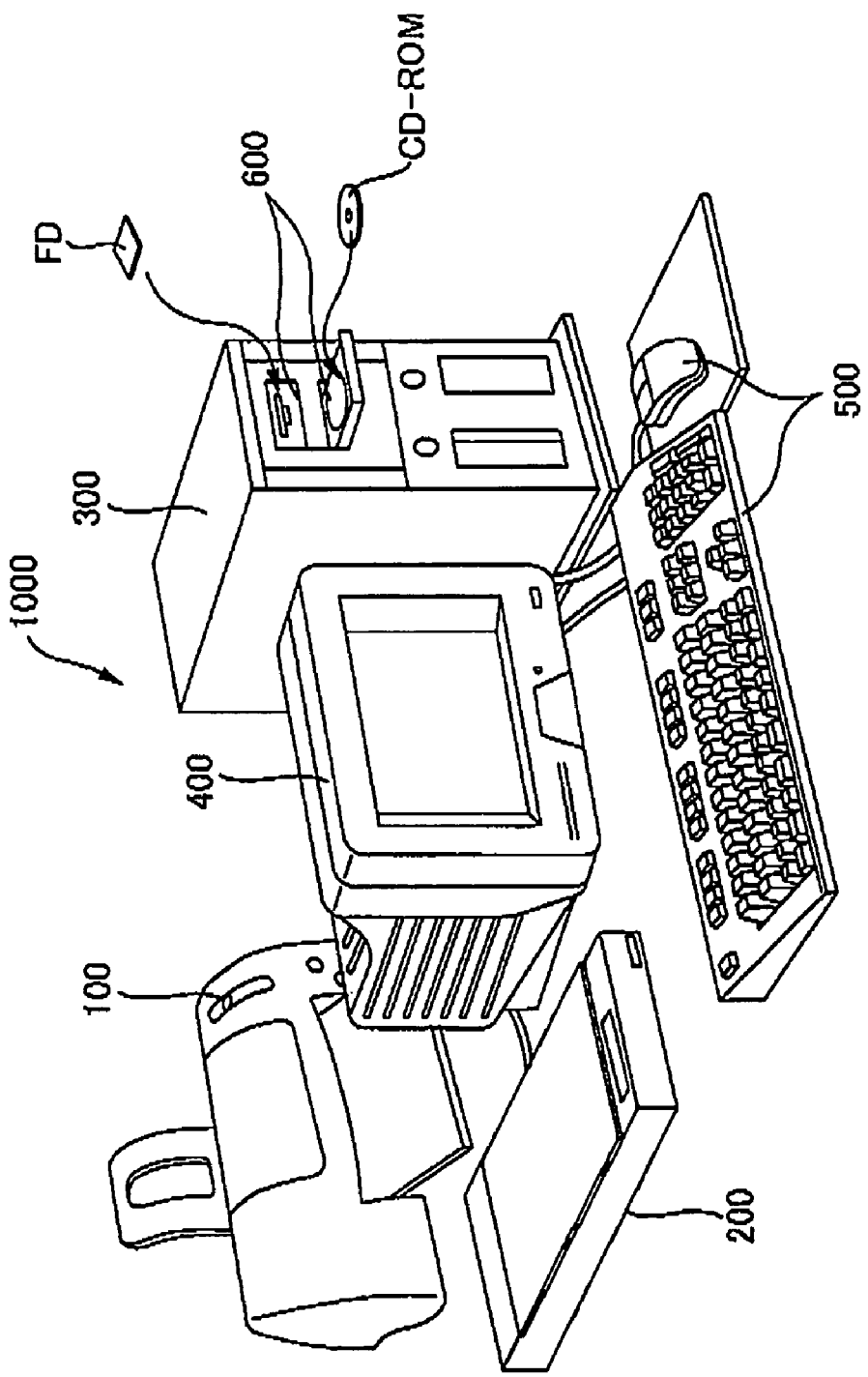
FIG. 1 is an explanatory diagram showing a structure of a correction value setting system.

At least the following matters will be made clear by the description of the present specification and the accompanying drawings.

A primary aspect of the invention is a method of judging whether or not darkness of a foreign matter on a test pattern printed on a medium with predetermined darkness has been read at the time of reading the darkness of the test pattern using a reading section, the method including:

detecting a section in the test pattern for which an amount of deviation, from a predetermined reference value, of a readout value on the darkness of that section exceeds a predetermined darkness-deviation threshold which is a threshold adopted for the deviation in darkness; and judging whether or not the darkness of the foreign matter has been read based on a size of the above-mentioned section that has been detected.

With this method of judging whether or not darkness of a foreign matter has been read, upon judging whether or not darkness of a foreign matter has been read, the judgment is made not only based on the deviation of the readout value on the darkness, but also by taking into consideration the size of the section in the test pattern that has been detected based on the deviation. Therefore, it is possible to prevent occurrence of a situation in which the presence of extremely small foreign matter whose planar dimension is small enough as not to cause any substantial problem is excessively judged that the darkness of a foreign matter has been read. As a result thereof, the judgment can be made more accurately.

In the method of judging whether or not darkness of a foreign matter has been read, it is preferable that:

the test pattern is printed by repeating an ink ejection operation in which ink is ejected from a nozzle while the nozzle is being moved in a movement direction, and a carry operation in which the medium is carried in a carrying direction that intersects with the movement direction; and readout values on the darkness of the test pattern are generated respectively for unit regions that are arranged adjacent to one another in the movement direction and adjacent to one another in the carrying direction.

With this method of judging whether or not darkness of a foreign matter has been read, since the readout values on the darkness of the test pattern are generated for the respective unit regions, the evaluation on the size of the above-mentioned section can be made more finely.

In the method of judging whether or not darkness of a foreign matter has been read, it is preferable that:

the test pattern is divided up, in the carrying direction, into row regions, each of the row regions being made up of a plurality of the unit regions that are arranged adjacent to one another in the movement direction; and the detection of the above-mentioned section is performed row-region-by-row-region.

With this method of judging whether or not darkness of a foreign matter has been read, the detection of the above-mentioned section is performed row-region-by-row-region. Thus, in cases where there is a calculation process carried out on a row-region-by-row-region basis, the detection of the above-mentioned section can be performed as a part of that calculation process, and as a result, it becomes unnecessary to carry out a process dedicated for detecting the above-mentioned section and the process load can thus be reduced.

In the method of judging whether or not darkness of a foreign matter has been read, it is preferable that:

the size of the above-mentioned section is obtained as an occupancy rate indicating a ratio of the size of the above-mentioned section with respect to a size of a row region that is targeted for the detection; and if the obtained occupancy rate is equal to or larger than a predetermined first occupancy-rate threshold which is a threshold adopted for the occupancy rate, then it is judged that the darkness of the foreign matter has been read.

With this method of judging whether or not darkness of a foreign matter has been read, the occupancy rate regarding the above-mentioned section is obtained as a ratio of the size of the above-mentioned section with respect to the row region; in other words, this occupancy rate expresses the degree of influence the section has on the row region. Therefore, comparing the occupancy rate with the first occupancy-rate threshold allows to make judgments based on the degree of influence of the section on the row region, and the judgment thus becomes more accurate.

In the method of judging whether or not darkness of a foreign matter has been read, it is preferable that:

when a total number of the unit regions for which the readout values have been obtained in the row region that is targeted for the detection is defined as Fs, a number of the unit region in the targeted row region for which the amount of deviation, from the reference value, of the readout value of that unit region exceeds the darkness-deviation threshold is defined as Ft, and the occupancy rate is defined as R, the occupancy rate R is calculated according to the following equation:

$R=Ft/Fs.$

With this method of judging whether or not darkness of a foreign matter has been read, since the occupancy rate is obtained using the number of unit regions, the judgment can be made more quantitatively.

In the method of judging whether or not darkness of a foreign matter has been read, it is preferable that:

the reference value is determined for each of the row regions.

With this method of judging whether or not darkness of a foreign matter has been read, the reference value is determined for each row region. Therefore, even when the darkness of the test pattern slightly fluctuates among the row regions, the judgment can be made accurately regardless of such fluctuation.

In the method of judging whether or not darkness of a foreign matter has been read, it is preferable that:

in determining the reference value, it is judged which of either a maximum value and a minimum value of the readout values for the row region that is targeted for the detection indicates darkness on the foreign-matter side, and of the maximum value and the minimum value, the value that has not been judged to be the darkness on the foreign-matter side is determined as the reference value for the targeted row region.

With this method of judging whether or not darkness of a foreign matter has been read, the value that has not been judged to be the darkness on the foreign-matter side is determined as the reference value. Therefore, the deviation from the reference value expresses the deviation from the darkness of the test pattern itself, and thus, the section corresponding to the foreign matter can be detected accurately based on the deviation from the reference value.

In the method of judging whether or not darkness of a foreign matter has been read, it is preferable that:

taking a median value between the maximum value and the minimum value as a border, a number of unit regions whose readout values are larger than the median value and a number of unit regions whose readout values are smaller than the median value are counted for each of the row regions; and the maximum value is judged to be the darkness on the foreign-matter side for a row region in which the number of unit regions whose readout values are larger than the median value is smaller, whereas the minimum value is judged to be the darkness on the foreign-matter side for a row region in which the number of unit regions whose readout values are smaller than the median value is smaller.

With this method of judging whether or not darkness of a foreign matter has been read, both foreign matter having a color darker than the test pattern and foreign matter lighter in color can be detected.

In a method of calculating a representative value of darkness of a test pattern by reading the darkness of the test pattern using the above-mentioned method of judging whether or not darkness of a foreign matter has been read, it is preferable that:

as for a row region whose occupancy rate is smaller than the first occupancy-rate threshold, an average value of all of the readout values read for that row region is adopted as a representative value of darkness of that row region.

With this method of calculating a representative value of darkness of a test pattern, for a row region in which the influence of the foreign matter is small, the average value of all of the readout values read for that row region is adopted as the representative value of darkness of that row region. Therefore, the population parameter in calculating the representative value as the average value can be increased to the greatest extent, and thus, the representative value of darkness of the row region can be calculated more accurately.

In the method of calculating a representative value of darkness of a test pattern, it is preferable that:

as for a row region whose occupancy rate is equal to or larger than the first occupancy-rate threshold, an average value of readout values obtained by excluding readout values that correspond to the above-mentioned section from all of the readout values read for that row region is adopted as a representative value of darkness of that row region.

With this method of calculating a representative value of darkness of a test pattern, in cases where the influence of the above-mentioned section in the row region is large, this is detected based on a comparison between the occupancy rate and the first occupancy-rate threshold and the representative value for that row region is obtained after excluding the readout values that correspond to that section. Thus, the representative value of darkness of that row region can be calculated even more accurately.

In the method of calculating a representative value of darkness of a test pattern, it is preferable that:

a second occupancy-rate threshold that is larger than the first occupancy-rate threshold is employed; and if there is even one row region whose occupancy rate is equal to or larger than the second occupancy-rate threshold, then an error message is given out.

With this method of calculating a representative value of darkness of a test pattern, in cases where the influence of the above-mentioned section in the row region is extremely large, this is detected based on a comparison between the occupancy rate and the second occupancy-rate threshold and an error message is given out. Thus, a worker in charge of the task of reading the darkness of the test pattern can take such measures as to remove the foreign matter which causes the above-mentioned section to appear and then restart the darkness-reading task, and therefore, the representative value of darkness of that row region can be calculated even more accurately.

In the method of calculating a representative value of darkness of a test pattern, it is preferable that:

the test pattern includes a front-end processing section for obtaining a front-end-section correction value that is used at the time of performing printing on a front-end section, in the carrying direction, of the medium, a rear-end processing section for obtaining a rear-end-section correction value that is used at the time of performing printing on a rear-end section of the medium, and an intermediate processing section for obtaining an intermediate-section correction value that is used at the time of performing printing on an intermediate section located between the front-end section and the rear-end section; and the first occupancy-rate threshold is set respectively for the front-end processing section, the intermediate processing section, and the rear-end processing section.

With this method of calculating a representative value of darkness of a test pattern, since the first occupancy-rate threshold is set respectively for the processing sections, processing that suits each processing section can be carried out with regard to calculation of the representative value of darkness.

Another aspect of the invention is a method of judging whether or not darkness of a foreign matter on a test pattern printed on a medium with predetermined darkness has been read at the time of reading the darkness of the test pattern using a reading section, the method including: detecting a section in the test pattern for which an amount of deviation, from a predetermined reference value, of a readout value on the darkness of that section exceeds a predetermined darkness-deviation threshold which is a threshold adopted for the deviation in darkness; and judging whether or not the darkness of the foreign matter has been read based on a size of the above-mentioned section that has been detected, wherein:

the test pattern is printed by repeating an ink ejection operation in which ink is ejected from a nozzle while the nozzle is being moved in a movement direction, and a carry operation in which the medium is carried in a carrying direction that intersects with the movement direction;

readout values on the darkness of the test pattern are generated respectively for unit regions that are arranged adjacent to one another in the movement direction and adjacent to one another in the carrying direction;

the test pattern is divided up, in the carrying direction, into row regions, each of the row regions being made up of a plurality of the unit regions that are arranged adjacent to one another in the movement direction;

the detection of the above-mentioned section is performed row-region-by-row-region;

the size of the above-mentioned section is obtained as an occupancy rate indicating a ratio of the size of the above-mentioned section with respect to a size of a row region that is targeted for the detection;

if the obtained occupancy rate is equal to or larger than a predetermined first occupancy-rate threshold which is a threshold adopted for the occupancy rate, then it is judged that the darkness of the foreign matter has been read;

when a total number of the unit regions for which the readout values have been obtained in the row region that is targeted for the detection is defined as Fs, a number of the unit region in the targeted row region for which the amount of deviation, from the reference value, of the readout value of that unit region exceeds the darkness-deviation threshold is defined as Ft, and the occupancy rate is defined as R, the occupancy rate R is R=Ft/Fs;

the reference value is determined for each of the row regions;

in determining the reference value,
it is judged which of either a maximum value and a minimum value of the readout values for the row region that is targeted for the detection indicates darkness on the foreign-matter side, and
of the maximum value and the minimum value, the value that has not been judged to be the darkness on the foreign-matter side is determined as the reference value for the targeted row region;

taking a median value between the maximum value and the minimum value as a border, a number of unit regions whose readout values are larger than the median value and a number of unit regions whose readout values are smaller than the median value are counted for each of the row regions; and the maximum value is judged to be the darkness on the foreign-matter side for a row region in which the number of unit regions whose readout values are larger than the median value is smaller, whereas the minimum value is judged to be the darkness on the foreign-matter side for a row region in which the number of unit regions whose readout values are smaller than the median value is smaller.

With this method of judging whether or not darkness of a foreign matter has been read, since all of the above-mentioned effects can be attained, the advantages brought about by some aspects of the invention can be achieved more effectively.

Another aspect of the invention is an apparatus that judges whether or not darkness of a foreign matter has been read, the apparatus comprising:

a reading section that reads the darkness of a test pattern printed on a medium with predetermined darkness; and a controller
that detects a section in the test pattern for which an amount of deviation, from a predetermined reference value, of a readout value on the darkness of that section exceeds a predetermined darkness-deviation threshold which is a threshold adopted for the deviation in darkness, and
that judges whether or not the darkness of the foreign matter on the test pattern has been read based on a size of said section that has been detected.

With this apparatus that judges whether or not darkness of a foreign matter has been read, upon judging whether or not darkness of a foreign matter has been read, the judgment is made not only based on the deviation of the readout value on the darkness, but also by taking into consideration the size of the section in the test pattern that has been detected based on the deviation. Therefore, it is possible to prevent occurrence of a situation in which the presence of extremely small foreign matter whose planar dimension is small enough as not to cause any substantial problem is excessively judged that the darkness of a foreign matter has been read. As a result thereof, the judgment can be made more accurately.

Correction Value Setting System 1000

Overview of Correction Value Setting System 1000

FIG. 1 is an explanatory diagram showing a structure of a correction value setting system 1000. The correction value setting system 1000 is a system for setting, to a printing apparatus, correction values for correcting darkness of printed images. This correction value setting system 1000 is installed, for example, in a factory. Note, however, that the correction value setting system 1000 may be constructed under the supervision of a user, and in this case, the correction value setting system 1000 will serve as a system for setting a new set of correction values (i.e., for updating the correction values). On the other hand, the printing apparatus is an apparatus for printing an image on a medium, and examples thereof are printers, plotters, and facsimile machines. For convenience's sake, in the explanation below, a printer 100 which is a typical printing apparatus and paper S which is a typical medium are described as examples (see FIG. 8).

The correction value setting system 1000 includes at least a darkness-reading apparatus for reading the darkness of a test pattern CP, and a correction value setting control apparatus communicably connected to both the darkness-reading apparatus and the printing apparatus to which the correction values are to be set. The correction value setting system 1000 illustrated in FIG. 1 has a scanner 200 which serves as the darkness-reading apparatus, a computer 300 which serves as the correction value setting control apparatus, a display device 400, input devices 500, and record/play devices 600. Note that in FIG. 1, the printer 100 is shown as the printing apparatus to which the correction values are to be set. Further, a keyboard and a mouse are shown as the input devices 500, and a flexible disk device and a CD-ROM device are shown as the record/play devices 600. Below, the devices that make up the correction value setting system 1000 are described.

Computer 300

Figure 2:
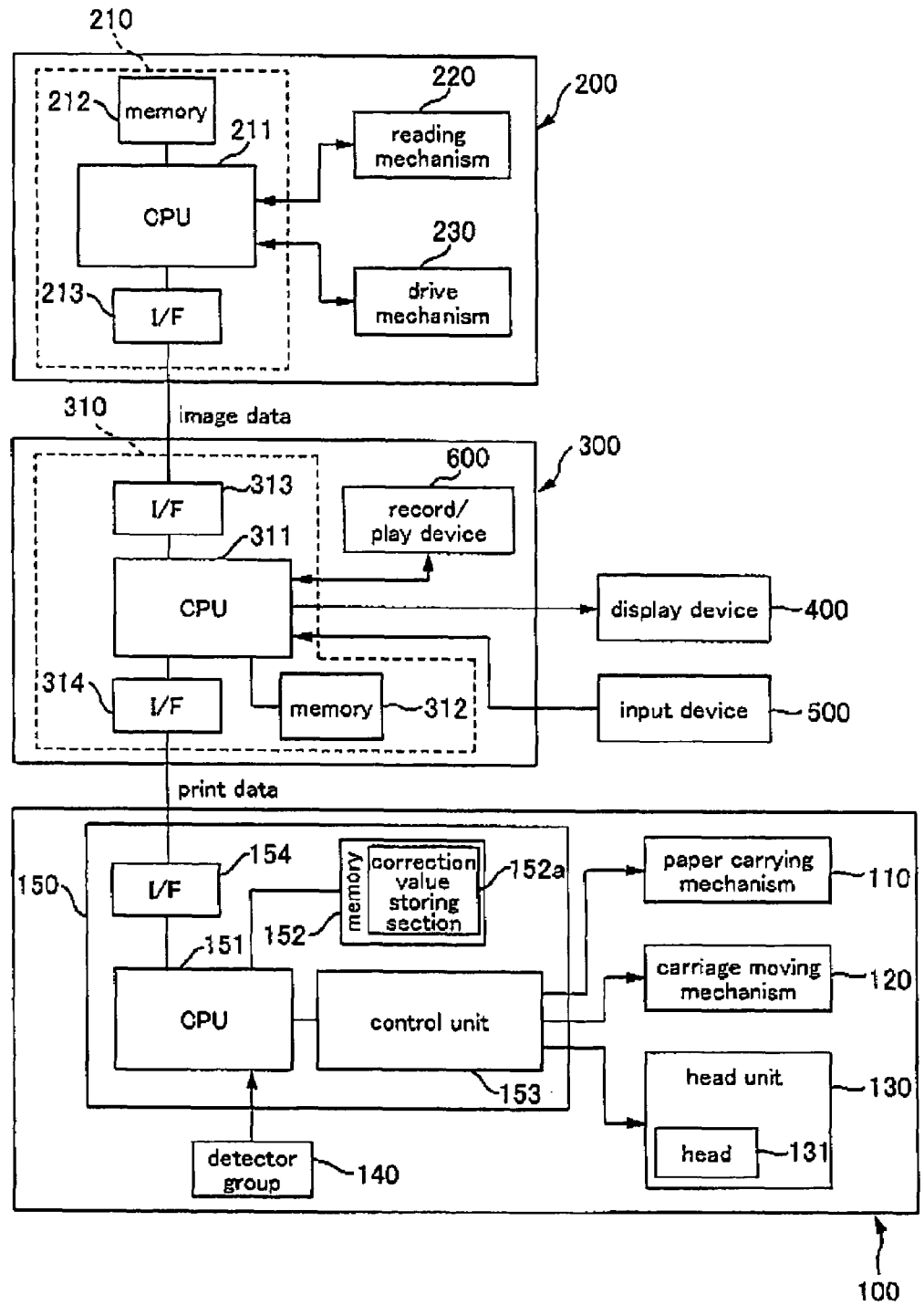
FIG. 2 is a block diagram for describing an overall configuration of the correction value setting system.
Figures 3, 4:
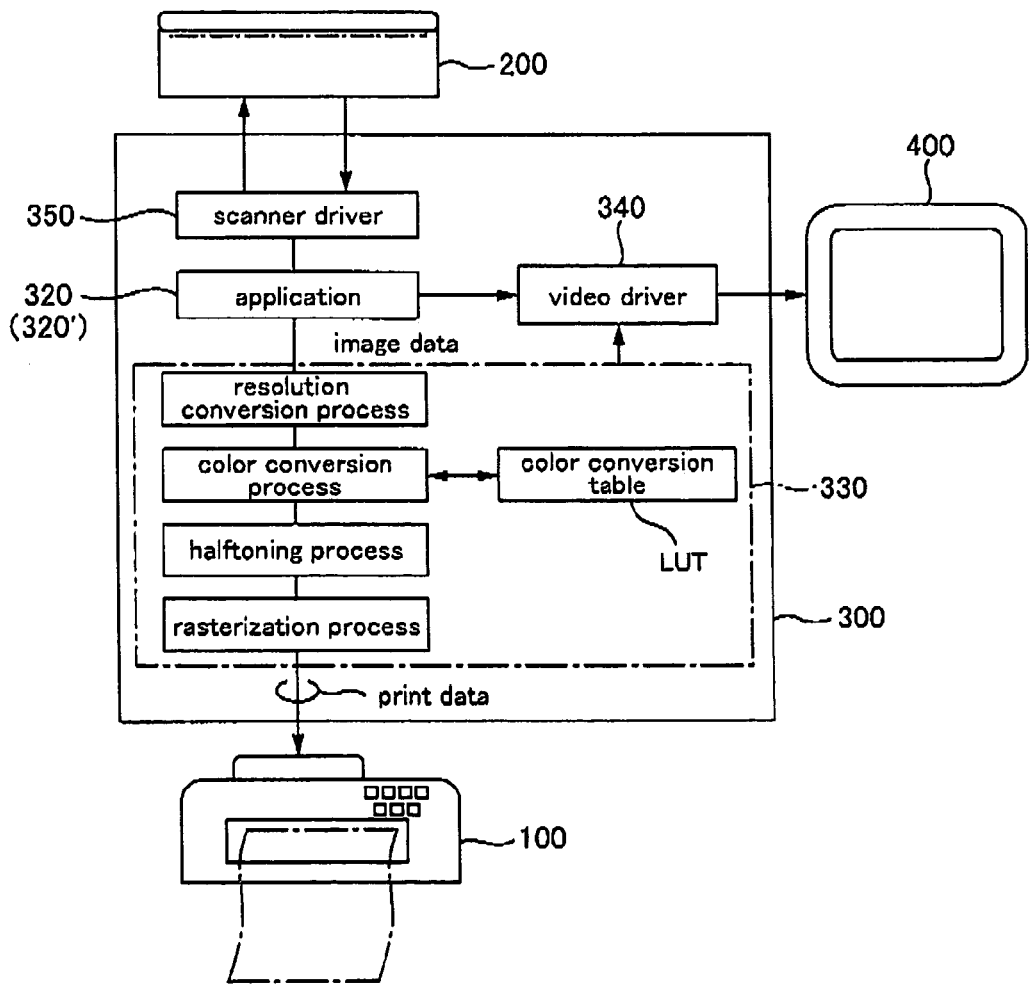
FIG. 3 is a diagram for describing a data table on readout darkness.
FIG. 4 is a diagram for describing processing based on a printer driver.
Figure 5:
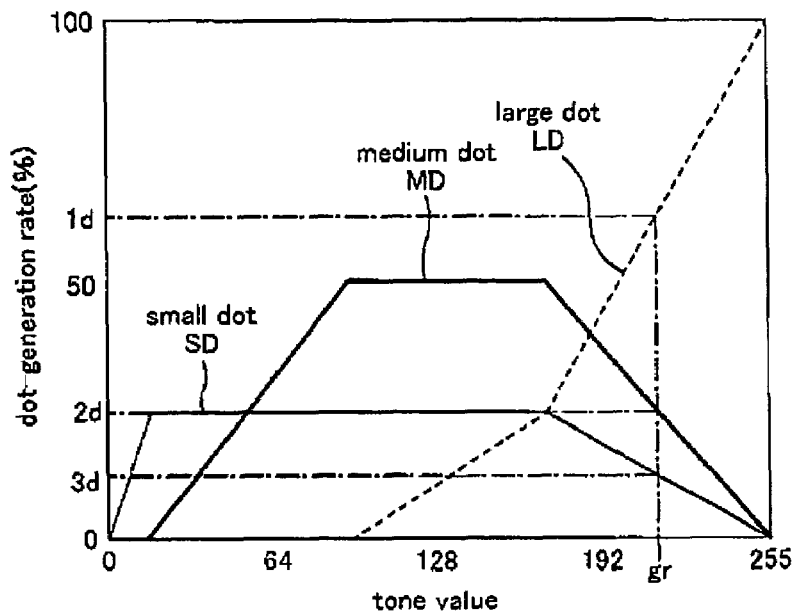
FIG. 5 is a diagram for describing a relationship between tone values and a dot-generation rate.

First, the computer 300 is described. FIG. 2 is a block diagram for describing an overall configuration of the correction value setting system 1000. FIG. 3 is a diagram for describing a data table which is set in a portion of a memory 312 of the computer 300 and in which data on the readout darkness are recorded. FIG. 4 is a diagram for describing processing based on a printer driver 330. FIG. 5 is a diagram for describing a relationship between tone values and a dot-generation rate.

The computer 300 is responsible for control of the correction value setting system 1000. For example, the computer 300 controls the scanner 200 to obtain the darkness of an image printed on paper S, controls the printer 100 to print an image on the paper S, and also stores correction values in a memory 152 (correction value storing section 152a) of the printer 100. To achieve this, the computer 300 is communicably connected to the scanner 200 and the printer 100.

The computer 300 has a host-side controller 310. The host-side controller 310 has a CPU 311, the memory 312, a first interface section 313, and a second interface section 314. The CPU 311 is an arithmetic processing device for performing overall control of the computer 300. The CPU 311 is communicably connected to the record/play devices 600, the display device 400, and the input devices 500. It should be noted that the record/play devices 600 are mounted to the housing of the computer 300. The memory 312 is for reserving a work area, an area for storing computer programs to be used by the CPU 311, and so forth, and is made up of devices such as RAMs, EEPROMs, ROMs, and magnetic disks. The first interface section 313 is provided between the CPU 311 and the scanner 200 and serves to exchange data with the scanner 200, The second interface section 314 is provided between the CPU 311 and the printer 100 and serves to exchange data with the printer 100.

Examples of computer programs installed to the memory 312 include an application program 320, the printer driver 330, a video driver 340, and a scanner driver 350. The application program 320 is, in a broad sense, a computer program for making the computer 300 perform desired operations. The application program 320 in the correction value setting system 1000 is a computer program for making the computer 300 function as the correction value setting control apparatus (and is therefore referred to also as a correction value setting program 320' for convenience's sake). The printer driver 330 is a computer program for making the printer 100 operate using the computer 300. The video driver 340 is a computer program for displaying, on the display device 400, display data from the application program 320 and the printer driver 330. The scanner driver 350 is a computer program for making the scanner 200 operate using the computer 300. Further, as shown in FIG. 3, in the present correction value setting system 1000, a portion of an area of the memory 312 of the host-side controller 310 is used as a data table for storing the readout darkness.

The CPU 311 performs various control according to the computer programs stored in the memory 312. For example, the CPU 311 performs control to obtain the darkness of an image printed on paper S according to the correction value setting program 320' and the scanner driver 350. Further, the CPU 311 performs control to print an image on paper S according to the correction value setting program 320' and the printer driver 330.

In the control for printing an image, the CPU 311 performs the following processing, for example. When an instruction to perform printing is given through a user interface, the CPU 311 converts image data into print data. Here, the print data is data of a format that can be interpreted by the printer 100, and includes pixel data and various command data. The command data is data for instructing the printer 100 to perform specific operations, and for example, is data for instructing paper supply, data that indicates the carry amount, and data for instructing paper discharge. In order to convert image data into print data, the CPU 311 performs such processes as a resolution conversion process, a color conversion process, a halftoning process, and a rasterization process. On the other hand, the pixel data is data on dots to be formed on the paper (data about the color, size, etc., of the dots), and is set respectively for each unit region. It should be noted that a "unit region" means a rectangular region virtually defined on a medium such as paper, the size and shape of which are determined depending on print resolution. For example, in cases where the print resolution is specified as 720 dpi (in the movement direction)×720 dpi (in the carrying direction), a unit region becomes a square region approximately 35.28 μm long and 35.28 μm wide ($\approx$1/720 inch×1/720 inch). In cases where the print resolution is specified as 360 dpi×720 dpi, a unit region becomes a rectangular region approximately 70.56 μm long and 35.28 μm wide ($\approx$1/360 inch×1/720 inch). If ink (also referred to as an ink droplet or drop-like ink) is ideally ejected, the ink lands in the center of this unit region, then the ink spreads on the medium, and a dot is thus formed in the unit region.

The resolution conversion process is a process for converting the resolution of image data (text data, picture data, etc.) into the resolution for printing the image on the paper S (i.e., the interval between dots when printing is performed; referred to also as "print resolution"). The color conversion process is a process for converting each piece of RGB pixel data included in the RGB image data into data expressed in the CMYK color space and having a tone value in multiple levels (for example, 256 levels). Here, CMYK refers to the colors of ink: C stands for cyan, M stands for magenta, Y stands for yellow, and K stands for black. The color conversion process is performed by referencing a table (color conversion lookup table LUT) in which the RGB tone values and the CMYK tone values are correlated. The halftoning process is a process for converting the CMYK pixel data having tone values in multiple levels into CMYK pixel data having tone values in a smaller number of levels that can be expressed by the printer 100. For example, through the halftoning process, the pieces of CMYK pixel data indicating tone values in 256 levels are converted into 2-bit CMYK pixel data indicating tone values in four levels. Each 2-bit CMYK pixel data is data indicating, for example, "formation of no dot" ("00" in binary), "formation of a small dot" ("01" in binary), "formation of a medium dot" ("10" in binary), and "formation of a large dot" ("11" in binary) for each color. Further, the generation rate for each dot is determined according to the tone value. For example, as shown in FIG. 5, for the pixel whose tone value is designated to be gr, the probability that a large dot is formed is 1d, the probability that a medium dot is formed is 2d, and the probability that a small dot is formed is 3d. The halftoning process employs, for example, dithering, gamma correction, error diffusion, and the like. The rasterization process is a process for changing the order of the halftoned CMYK image data into the order in which they are to be transferred to the printer 100. The rasterized data is output to the printer 100 as the above-mentioned print data.

Scanner 200

Figure 6:
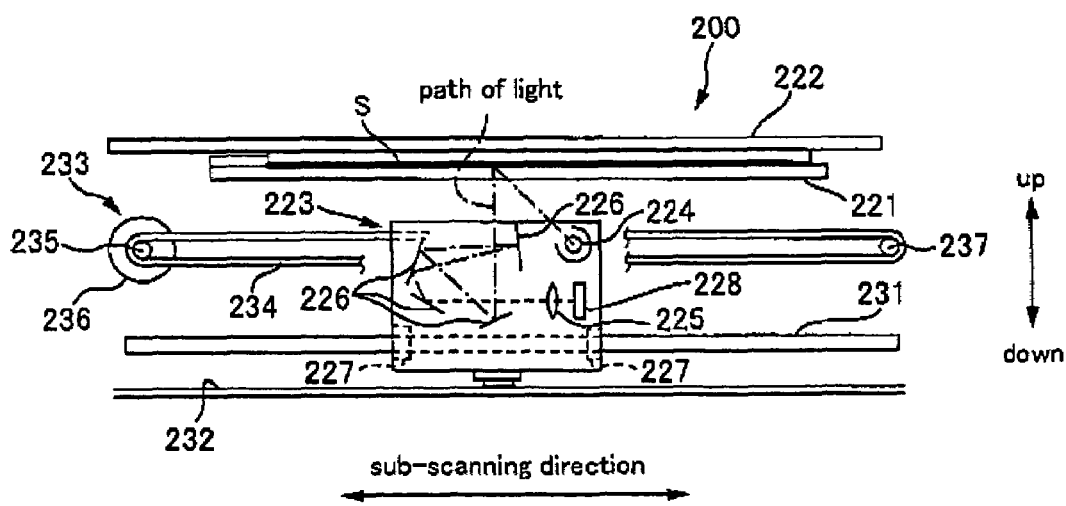
FIG. 6 is a front view for describing the inner structure of a scanner.
Figure 7:
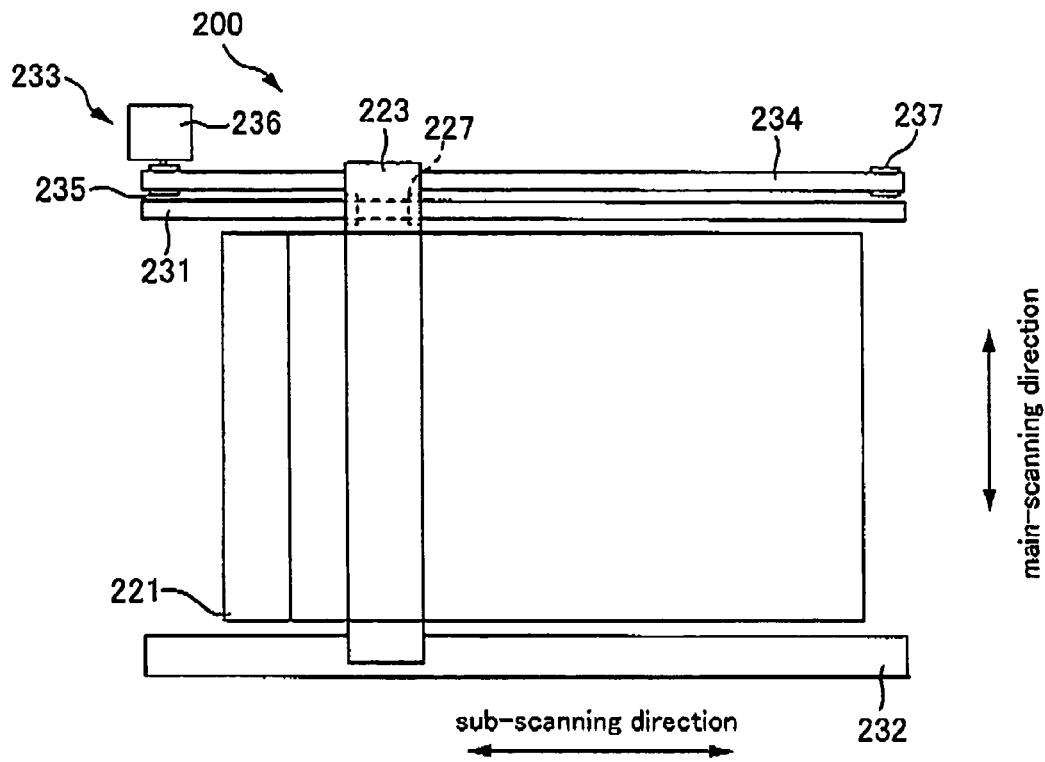
FIG. 7 is a plan view for describing the structure of the scanner.

The scanner 200 is described next. FIG. 6 is a front view for describing the inner structure of the scanner 200. FIG. 7 is a plan view for describing the structure of the scanner 200. It should be noted that in FIG. 7, the scanner 200 is shown with its document platen cover 222 removed, for convenience's sake. Further, FIG. 2 is also referred to in the explanation below. As shown in FIG. 2, the scanner 200 has a scanner-side controller 210, a reading mechanism 220, and a drive mechanism 230.

The scanner-side controller 210 has a CPU 211, a memory 212, and an interface section 213. The CPU 211 is an arithmetic processing device for performing overall control of the scanner 200. The CPU 211 is communicably connected to the reading mechanism 220 and the drive mechanism 230. The memory 212 is for reserving a work area, an area for storing computer programs to be used by the CPU 211, and so forth, and is made up of devices such as RAMS, EEPROMs, and ROMs. The interface section 213 is provided between the CPU 211 and the computer 300 and serves to exchange data with the computer 300.

As shown in FIGS. 6 and 7, the reading mechanism 220 has a document platen glass 221, a document platen cover 222, and a reading carriage 223. The document platen glass 221 is a transparent plate made of glass on which a document (for example, paper S on which an image is printed) is placed. The document platen cover 222 is for pressing the to-be-read surface of the document toward the document platen glass 221. The reading carriage 223 corresponds to a "reading section" for reading the darkness of the document. The reading carriage 223 is provided in opposition to the to-be-read surface of the document across the document platen glass 221 and moves in a predetermined direction (referred to also as "sub-scanning direction" below) along the document platen glass 221 while maintaining a constant distance therewith. The reading carriage 223 has an exposure lamp 224, a lens 225, a plurality of mirrors 226, a guide support section 227, and a CCD image sensor 228. The exposure lamp 224 serves as the light source at the time of reading the document. The lens 225 is for collecting light reflected from the document. The mirrors 226 are for guiding the reflected light to the lens 225. The guide support section 227 is where a regulating guide 231 is inserted. The CCD image sensor 228 is for receiving the reflected light that has been collected by the lens 225. In the illustrated scanner 200, the CCD image sensor 228 is structured as a so-called linear sensor. More specifically, the CCD image sensor 228 includes a plurality of photodiodes for performing optical-to-electrical conversion. These photodiodes are arranged in a row. More specifically, these photodiodes are arranged in a direction substantially orthogonal to the sub-scanning direction in which the reading carriage 223 moves (which is referred to also as "main-scanning direction" below). At the time of reading the image depicted on the document, each photodiode detects the amount of light irradiated within a predetermined period of time. In this way, darkness data indicating the darkness of the image is obtained.

The drive mechanism 230 has the regulating guide 231, a support rail 232, and a drive section 233. The regulating guide 231 is for regulating the direction in which the reading carriage 223 moves. The support rail 232 is for supporting the reading carriage 223. The drive section 233 is for moving the reading carriage 223 in the sub-scanning direction and has a timing belt 234, a drive pulley 235, a pulse motor 236, and an idler pulley 237. The timing belt 234 is an annular member whose end is fixed to the reading carriage 223, and is spanned across the drive pulley 235 and the idler pulley 237. The drive pulley 235 meshes with the timing belt 234 and is attached to a rotation shaft of the pulse motor 236. The pulse motor 236 serves as the drive power source for moving the reading carriage 223 and is arranged on one side in the sub-scanning direction. The idler pulley 237 is for applying tension to the timing belt 234 and is arranged on the other side, in the sub-scanning direction, from the side of the drive pulley 235. With this structure, the reading carriage 223 is moved along the regulating guide 231 as the timing belt 234 is carried. At this time, the operation of the pulse motor 236 is controlled by the scanner-side controller 210.

Further, the scanner 200 is provided with a home position sensor (not shown). The home position sensor is for detecting that the reading carriage 223 has reached the position of the starting point of the reading operation (which is referred to also as "home position" below). The home position sensor is made of a transmission-type optical sensor, for example. The position of the reading carriage 223 is managed by the scanner-side controller 210, taking the home position as a reference. For example, the position of the reading carriage 223 is managed based on the number of pulses provided to the pulse motor 236 after the carriage 223 has been detected by the home position sensor and the movement amount of the reading carriage 223 for a single pulse.

In the scanner 200 structured as described above, light from the exposure lamp 224 is irradiated onto the to-be-read surface of the document, and the light reflected therefrom is guided to the CCD image sensor 228 via the mirrors 226 and the lens 225. Further, the reading carriage 223 is moved along the document platen glass 221 (i.e., along the to-be-read surface of the document). Then, by obtaining, at a predetermined cycle, the voltage output from the CCD image sensor 228, the darkness of the document of an amount corresponding to the distance for which the reading carriage 223 has moved during a single cycle is read.

Printer 100

Structure

Figure 8:
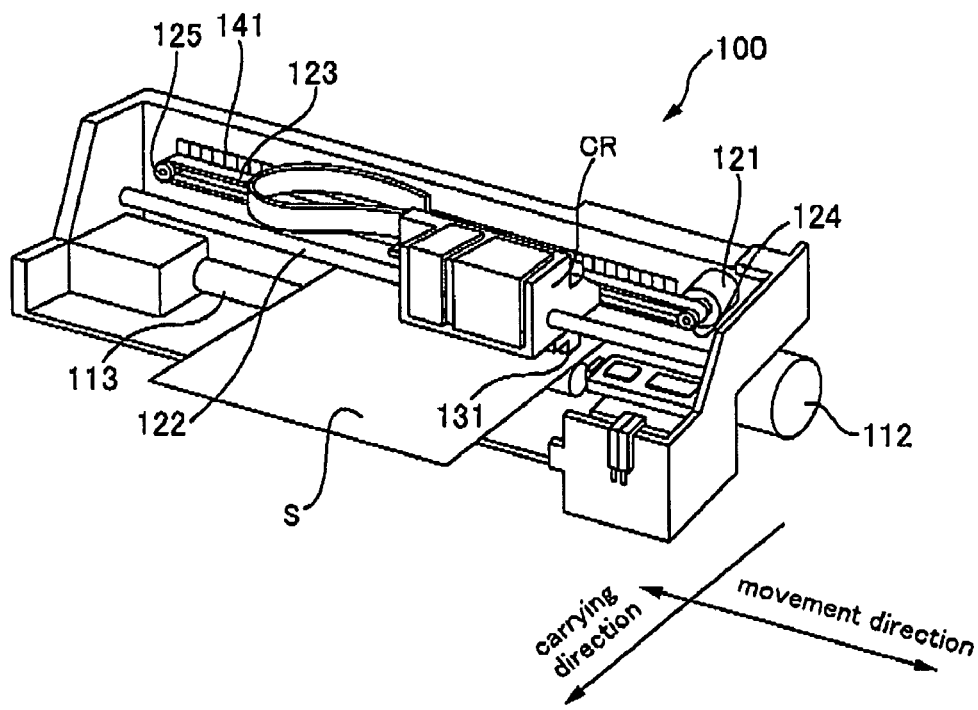
FIG. 8 is a perspective view for describing the inner structure of a printer.
Figure 9:
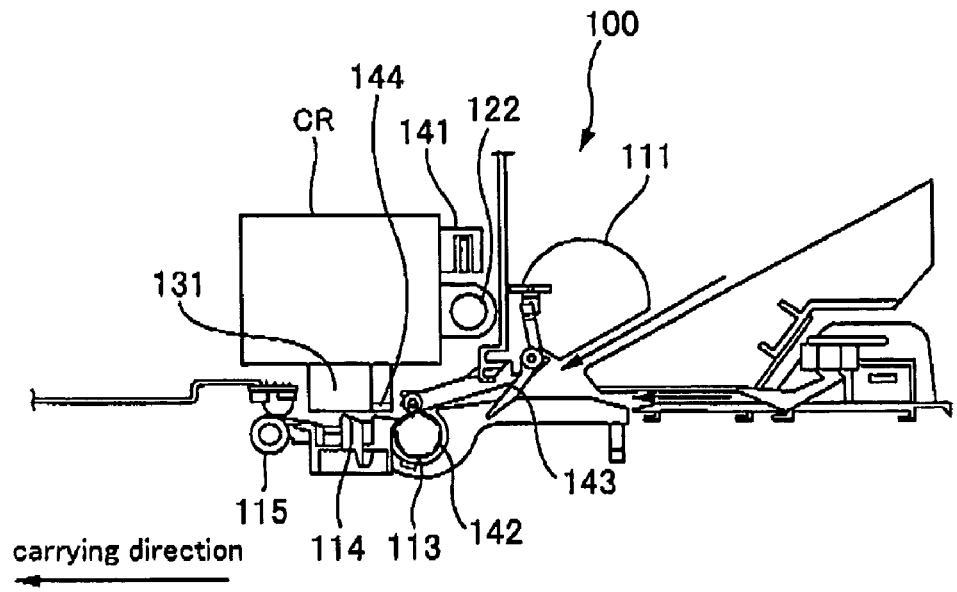
FIG. 9 is a side view for describing the inner structure of the printer.
Figure 10:
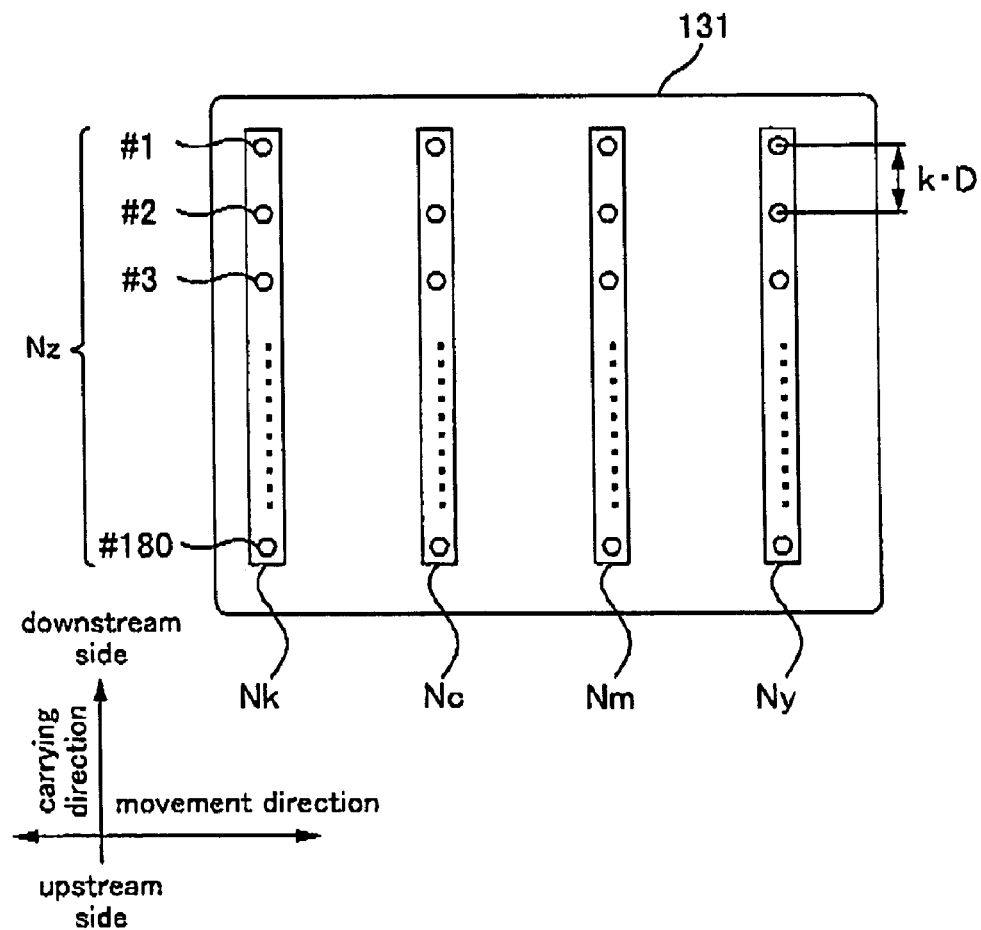
FIG. 10 is a diagram for describing an arrangement of nozzles.
Figure 11:
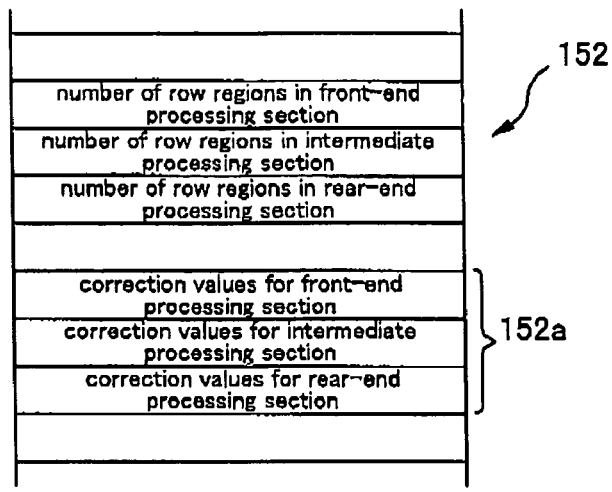
FIG. 11 is a diagram for describing an area of a memory of a printer-side controller.

The printer 100 is described next. FIG. 8 is a perspective view for describing the inner structure of the printer 100. FIG. 9 is a side view for describing the inner structure of the printer 100. FIG. 10 is a diagram for describing an arrangement of nozzles Nz of a head 131. FIG. 11 is a diagram for describing a portion of an area of a memory 152 of a printer-side controller 150. It should be noted that FIG. 2 is also referred to in the explanation below.

As described above, the printer 100 corresponds to a printing apparatus for printing images on media such as paper S, cloth, film, and OHP sheets. As shown in FIG. 2, the printer 100 has a paper carrying mechanism 110, a carriage moving mechanism 120, a head unit 130, a detector group 140, and a printer-side controller 150. On receiving print data from the computer 300, which is an external device, the printer 100 controls the targets of control, that is, the paper carrying mechanism 110, the carriage moving mechanism 120, and the head unit 130, using the printer-side controller 150. At this time, the detectors of the detector group 140 monitor the status inside the printer 100 and output the detection results to the printer-side controller 150. Having received the detection results from the detectors, the printer-side controller 150 controls the targets of control based on the detection results.

As shown in FIGS. 8 and 9, the paper carrying mechanism 110 is for sending in the paper S up to a printable position and for carrying the paper S in a carrying direction by a predetermined carry amount. Note that the "carrying direction" is a direction that intersects with the movement direction of a carriage CR, which is described below. The paper carrying mechanism 110 has a paper supply roller 111, a carry motor 112, a carry roller 113, a platen 114, and a paper discharge roller 115. The paper supply roller 111 is for automatically feeding the paper S, which has been inserted into a paper insertion opening, into the printer 100, and in this example, its cross sectional shape is in the shape of the letter "D". The carry motor 112 is for carrying the paper S in the carrying direction, and is made of a DC motor, for example. The operation of the carry motor 112 is controlled by the printer-side controller 150. The carry roller 113 is for carrying the paper S, which has been fed by the paper supply roller 111, up to a printable region. The operation of the carry roller 113 is also controlled by the printer-side controller 150. The platen 114 is a member for supporting the paper S, which is being printed, from the rear side thereof. The paper discharge roller 115 is for carrying the paper S for which printing has finished.

The carriage moving mechanism 120 is for moving the carriage CR, to which the head unit 130 is attached, in the movement direction. The movement direction includes the direction from one side to the other side and the direction back from the other side to the one side. The head unit 130 has a head 131, which serves as a print head. The head 131 has nozzles Nz for ejecting ink (see FIG. 10). Therefore, with the movement of the carriage CR, the head 131 as well as the nozzles Nz move in the movement direction of the carriage CR. That is, the movement direction of the carriage CR corresponds to the movement direction of the head 131 and also the movement direction of the carriage CR. Below, the movement direction of the carriage CR, the movement direction of the head 131, and the movement direction of the nozzles Nz are also collectively referred to simply as the "movement direction".

The carriage moving mechanism 120 has a carriage motor 121, a guide shaft 122, a timing belt 123, a drive pulley 124, and an idler pulley 125. The carriage motor 121 serves as a drive power source for moving the carriage CR. The operation of the carriage motor 121 is also controlled by the printer-side controller 150. The drive pulley 124 is attached to a rotation shaft of the carriage motor 121. The drive pulley 124 is arranged at the one-end side of the movement direction. The idler pulley 125 is arranged at the other-end side of the movement direction, i.e., at a position opposite from the drive pulley 124. The timing belt 123 is an annular member whose end section is secured to the carriage CR, and is spanned across the drive pulley 124 and the idler pulley 125. The guide shaft 122 is a rod-like member that supports the carriage CR movably. The guide shaft 122 is attached along the movement direction. Accordingly, on operation of the carriage motor 121, the carriage CR moves along the guide shaft 122 in the movement direction.

The head unit 130 is for ejecting ink toward the paper S and is provided with the head 131. As shown in FIG. 10, nozzles Nz for ejecting ink are provided in the bottom surface of the head 131. The nozzles Nz are divided into several groups; the groups correspond respectively to the types of ink ejected, and each group constitutes a nozzle row. The illustrated head 131 has a black ink nozzle row Nk, a cyan ink nozzle row Nc, a magenta ink nozzle row Nm, and a yellow ink nozzle row Ny. Each nozzle row includes n pieces of nozzles Nz (for example, n=180). The nozzles Nz in each nozzle row are arranged at constant intervals (nozzle pitch: k·D) in the carrying direction. Here, D is the minimum dot pitch in the carrying direction, that is, the spacing between dots formed on the paper S at maximum resolution. Further, k is a coefficient that indicates the relationship between the minimum dot pitch D and the nozzle pitch, and is set as an integer of 1 or more. For example, if the nozzle pitch is 180 dpi ($\frac{1}{180}$ inch) and the dot pitch in the carrying direction is 720 dpi ($\frac{1}{720}$ inch), then k=4. In the illustrated example, each nozzle Nz in each of the nozzle groups is assigned a number (#1 to #180) that becomes smaller as the nozzle is arranged more downstream. That is, the nozzle Nz #1 is located on the downstream side, in the carrying direction, from the nozzle Nz #180, i.e., located on the front-end side of the paper S.

With this printer 100, it is possible to eject, individually from each nozzle Nz, a plurality of types of ink of different amounts. For example, it is possible to eject three types of ink droplets; a large ink droplet of an amount with which a large dot can be formed with respect to a pixel, a medium ink droplet of an amount with which a medium dot can be formed, and a small ink droplet of an amount with which a small dot can be formed. In this example, the following four types of controls are possible: formation of no dot, which corresponds to pixel data "00"; formation of a small dot, which corresponds to pixel data "01"; formation of a medium dot, which corresponds to pixel data "10"; and formation of a large dot, which corresponds to pixel data "11". In other words, recording is possible in four levels.

The detector group 140 is for monitoring the status inside the printer 100. The detector group 140 includes a linear encoder 141, a rotary encoder 142, a paper detector 143, a paper-width detector 144, and so forth. The linear encoder 141 is for detecting the position of the carriage CR in the movement direction. The rotary encoder 142 is for detecting the amount of rotation of the carry roller 113. The paper detector 143 is for detecting the position of the front end of the paper S being printed. The paper-width detector 144 is for detecting the width of the paper S being printed.

The printer-side controller 150 is for controlling the printer 100. The printer-side controller 150 has a CPU 151, a memory 152, a control unit 153, and an interface section 154. The CPU 151 is an arithmetic processing device for performing overall control of the printer. The memory 152 is for reserving a work area, an area for storing programs to be used by the CPU 151, and so forth, and is made up of storage devices such as RAMs, SEPROMs, and ROMS. The CPU 151 controls the targets of control via the control unit 153 according to the programs stored in the memory 152. In this example, various kinds of information are stored in a portion of an area of the memory 152, as shown in FIG. 11. For example, the number of row regions in each processing section (described later on) and correction values for each processing section are stored. The interface section 154 is provided between the printer 100 and the computer 300, which is an external device, and serves to exchange data therebetween.

Printing Operation

Figure 12:
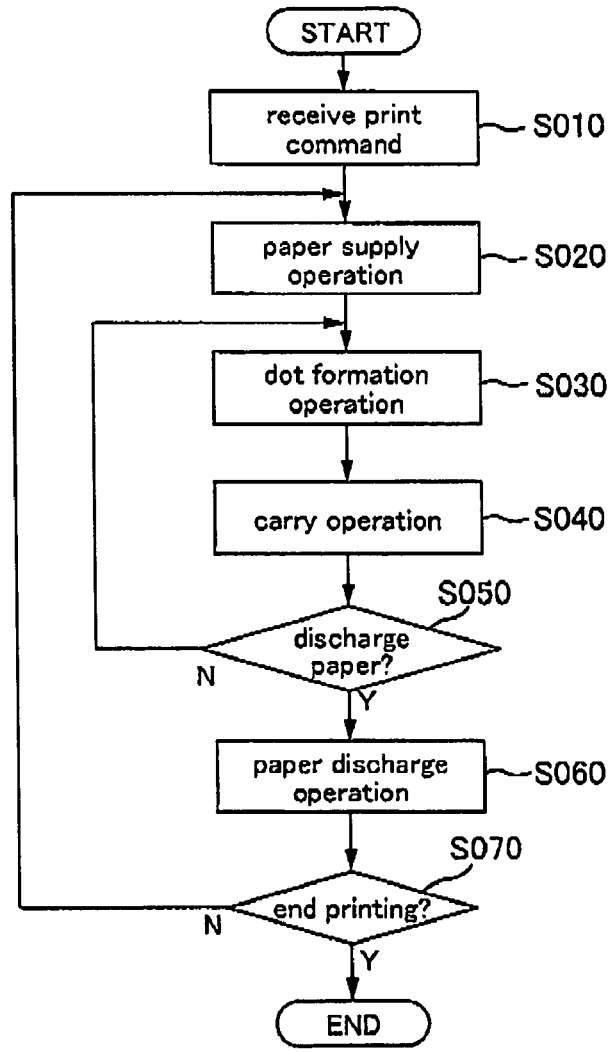
FIG. 12 is a flowchart describing processing during printing.

FIG. 12 is a flowchart describing processing during printing. The processes described below are executed by the printer-side controller 150 controlling the targets of control in accordance with a computer program stored in the memory 152. This computer program accordingly includes codes for executing the various processes.

When the printer-side controller 150 receives a print command included in the print data (S010), it carries out, in order, a paper supply operation (S020), a dot formation operation (S030), a carry operation (S040), paper discharge determination (S050), a paper discharge operation (S060), and print termination determination (S070). The paper supply operation is for moving the paper S, which is the target of printing, and positioning it in a print start position (so-called "indexed position"). The dot formation operation is for forming dots on the paper S. In this dot formation operation, the printer-side controller 150 performs such controls as driving the carriage motor 121 and outputting control signals to the head 131. The carry operation is for moving the paper S in the carrying direction. With this carry operation, it becomes possible to form dots at positions that are different from the positions of the dots formed in the preceding dot formation operation. The paper discharge determination is for determining whether or not to discharge the paper S being printed. The paper discharge operation is processing for discharging the paper S and is performed when it is determined that "the paper is to be discharged" in the preceding paper discharge determination. The print termination determination is for determining whether or not to continue printing.

An image is printed by alternately repeating the dot formation operation (S030) and the carry operation (S040). In the dot formation process, the head 131 (and the nozzles Nz), which moves in the movement direction, intermittently ejects ink. More specifically, the printer-side controller 150 makes the head 131 eject ink based on the pixel data included in the print data while making the carriage CR move by driving the carriage motor 121. Further, dots are formed on the paper when the ink ejected from the head 131 lands on the surface of the paper. Since the ink is ejected intermittently during movement of the head 131, a plurality of dots are formed on the paper lined up in the movement direction. In other words, a row of dots (also referred to as a "raster line" or a "dot row") made up of the plurality of dots lined up in the movement direction is formed on the paper. Accordingly, the image printed on the paper S is made up of a plurality of raster lines lined up adjacent to one another in the carrying direction.

Printing Method

Interlaced Printing

As described above, the printer 100 prints an image by making the nozzles Nz eject ink intermittently while moving the head 131 in the movement direction. Here, the above-mentioned head 131 is shaped extremely finely. Therefore, variations may occur in the parts of the head, such as the nozzles Nz, due to processing and assembly. These variations in the nozzle parts cause variations in characteristics such as the flight path of the ink and ink ejection amount (which are referred to below as "ejection characteristics"). Printing using the interlaced method (which is referred to below as "interlaced printing") is employed in order to reduce such variations in ejection characteristics. Here, interlaced printing refers to printing in which at least one non-recorded raster line exists between two adjacent raster lines recorded in one pass. Note that a "pass" refers to one dot formation operation, and "pass n" refers to the $n^{th}$ dot formation operation.

Figure 13:
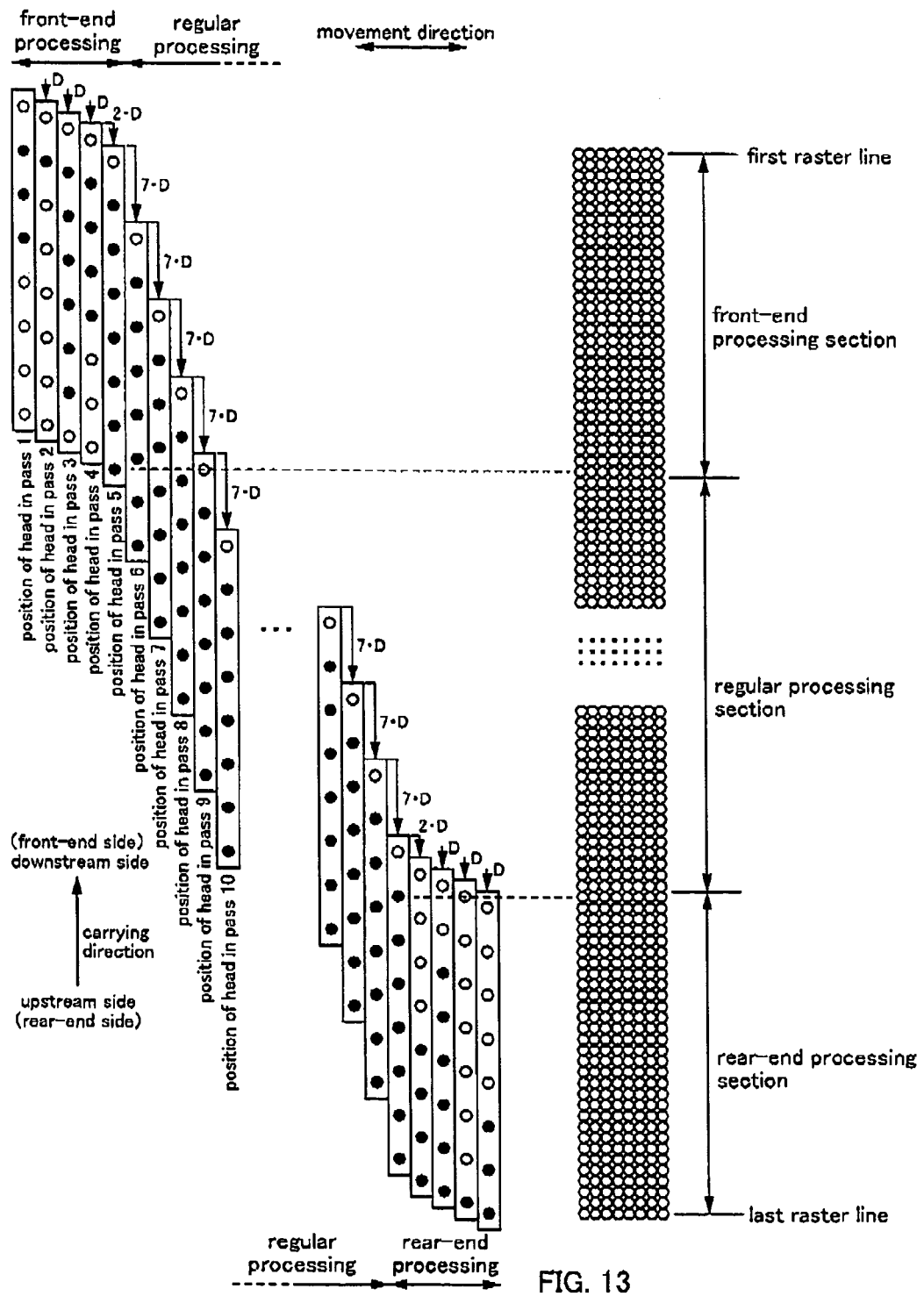
FIG. 13 is a diagram for describing an example of interlaced printing.

FIG. 13 is a diagram for describing an example of interlaced printing. In this example, there are three processing sections: the front-end processing section, the regular processing section, and the rear-end processing section. The regular processing section is a section in which raster lines are formed using only regular processing, which serves as a basis of all the processing. The front-end processing section is a section that is defined on the front-end side of the paper S with respect to the regular processing section and in which raster lines are formed using front-end processing and regular processing. In the front-end processing, the nozzles Nz for ejecting ink and the carry amount are predetermined such as to form raster lines that cannot be formed using only the regular processing. The rear-end processing section is a section that is defined on the rear-end side of the paper S with respect to the regular processing section and in which raster lines are formed using rear-end processing and regular processing. In the rear-end processing, the nozzles Nz for ejecting ink and the carry amount are predetermined such as to form raster lines that cannot be formed using only the regular processing. The regular processing section can be said to be the intermediate section sandwiched between the front-end processing section and the rear-end processing section. Therefore, the regular processing section corresponds to the "intermediate processing section" and the regular processing corresponds to "intermediate processing".

It should be noted that in the example shown in FIG. 13, for convenience of explanation, only one nozzle row of the plurality of nozzle rows of the head 131 is shown. Further, the number of nozzles Nz in one nozzle row is made smaller. Further, this example is depicted as if the head 131 (the nozzle row) moves with respect to the paper S, but this example is only for showing the relative positioning between the head 131 and the paper S, and therefore, in an actual printer 100, it is the paper S that moves in the carrying direction. Furthermore, numerous dots are formed lined up in the movement direction due to ink being intermittently ejected from the nozzles Nz. It should be noted that depending on the type of pixel data, there are instances in which no dot is formed. The nozzles Nz shown as black circles are the nozzles that are allowed to eject ink, and the nozzles Nz shown as white circles are the nozzles that are not allowed to eject ink.

In the process illustrated, the first five passes are the front-end processing, the last five passes are the rear-end processing, and the passes in between are the regular processing. In the regular processing, every time the paper S is carried in the carrying direction by a fixed carry amount F, each nozzle Nz records the raster line right above the raster line recorded in the immediately-previous pass. The following conditions (1) and (2) have to be met in order to perform recording with a fixed carry amount: (1) the number N (which is an integer) of nozzles that are allowed to eject ink is coprime to the coefficient k, and (2) the carry amount F is set to N·D (wherein D is the spacing between dots in the carrying direction at maximum resolution). In this example, in order to fulfill these conditions, N is set to seven (N=7), k is set to four (k=4), and F is set to 7·D (F=7·D) (wherein D=720 dpi). Further, as regards the group of raster lines formed with the regular processing, there is periodicity in the combination of nozzles Nz responsible for each raster line. In other words, raster lines formed with the same combination of nozzles Nz appear at an interval of a predetermined number of lines.

On the other hand, in the front-end processing, the paper S is carried by a carry amount (1·D or 2·D) which is smaller than the carry amount (7·D) for the regular processing, and the nozzles Nz for ejecting ink are not fixed. Also, similar to the front-end processing, in the rear-end processing, the paper S is carried by a carry amount (1·D or 2·D) which is smaller than the carry amount (7·D) for the regular processing. It should be noted that in the front-end processing and the rear-end processing, it is difficult to find regularity in the combination of nozzles Nz.

Correction Values

As described above, the printer 100 prints an image by alternately repeating the dot formation operation and the carry operation. Further, interlaced printing is employed to reduce any negative effects due to ejection characteristics of the nozzles Nz and to improve image quality. In recent years, however, there is an increasing demand for higher image quality, and there is also a demand for further improvement in quality for images printed using interlaced printing. In order to meet such demands, it is conceivable to set a correction value for each row region in which a raster line is formed, in order to correct the darkness of each raster line on a row-region-by-row-region basis. Herein, a "row region" is a region consisting of a plurality of unit regions lined up in the movement direction. For example, when the print resolution is 720 dpi×720 dpi, a row region is a belt-like region having a width of 35.28 μm (≈1/720 inch) in the carrying direction. If ink is ideally ejected intermittently from a nozzle Nz moving in the movement direction, a raster line is formed in that row region, Unevenness in Darkness (Banding)

Figure 14A:
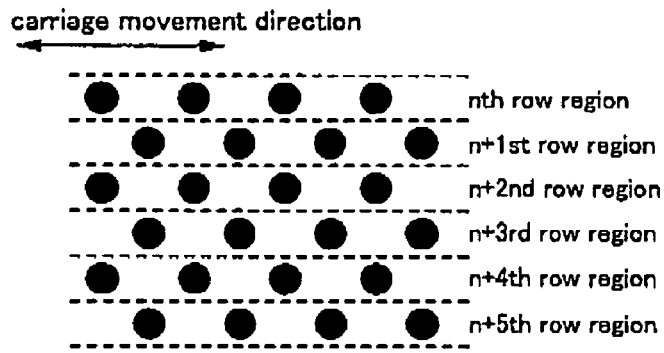
FIG. 14A is a diagram for describing groups of dots formed with ideal ejection characteristics.
Figure 14B:
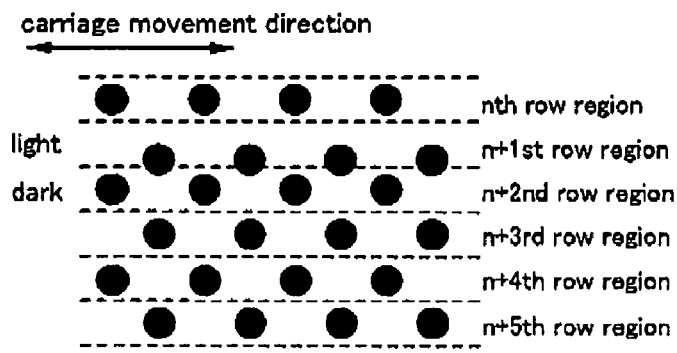
FIG. 14B is a diagram for describing the negative effect of variations in the ejection characteristics.
Figure 15:
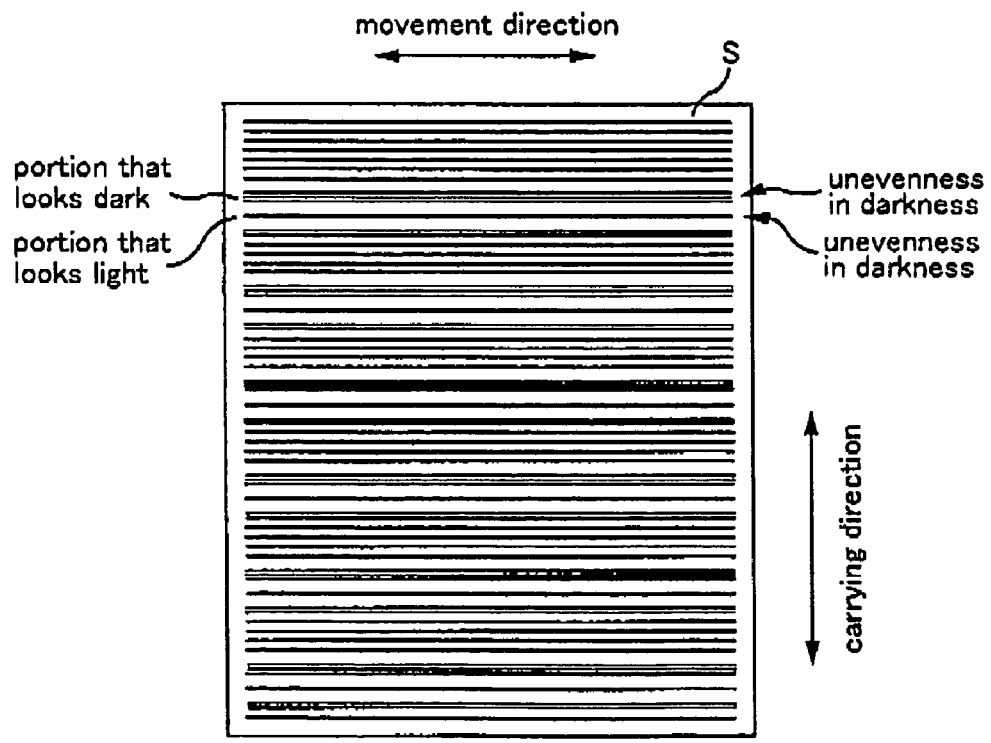
FIG. 15 is a conceptual diagram for describing unevenness in darkness.

Before giving a description on the correction values, the unevenness in darkness (variation in darkness) is described first. The unevenness in darkness appears as stripes parallel to the movement direction of the carriage CR (referred to also as horizontal stripes for convenience' sake). In other words, the unevenness in darkness occurs in the carrying direction of the paper S. FIG. 14A is a diagram for describing groups of dots formed with ideal ejection characteristics. FIG. 14B is a diagram for describing the negative effect of variations in the ejection characteristics. FIG. 15 is a conceptual diagram for describing the unevenness in darkness. For convenience's sake, in the description below, an example is given in which an image is printed using a single color. Further, in FIGS. 14A and 14B, the darkness of the image is fixed at middle tone (for example, at 50% darkness).

In the example of FIG. 14A, since the ejection characteristics are ideal, the ink ejected from the nozzles Nz lands in the unit regions, which are virtually defined on the paper, with good positional precision; in other words, the center of each unit region and the center of each dot match. Each raster line is made up of a plurality of dots lined up in the movement direction. Therefore, each raster line is formed with good positional precision in the center, with respect to the carrying direction, of each row region. In this example, when comparing the darkness of the printed image in units of row regions, the image darkness is the same among the row regions. For convenience's sake, in the description below, the individual images divided up in units of row regions are also referred to as "image strips". An image strip is different from a row region in terms that a raster line is a row of dots formed as a result of the ink landing on paper whereas an image strip is a piece of image obtained by divided up the printed image in units of row regions.

In the example of FIG. 14B, due to variations in the ejection characteristics, the raster line corresponding to the n+1$^{st}$ row region is formed out of its proper position and closer to the n+2$^{nd}$ row region (toward the bottom in FIG. 14B). That is, the darkness of the image strips should be the same as in the example of FIG. 14A, but in the example of FIG. 14B, there is a variation in the darkness among the image strips due to the variations in the ejection characteristics. For example, the darkness of the image strip corresponding to the n+1$^{st}$ row region is lighter than the darkness of the image strip corresponding to a standard row region (for example, the n$^{th}$ row region or the n+3$^{rd}$ row region). Further, the darkness of the image strip corresponding to the n+2$^{nd}$ row region is darker than the darkness of the image strip corresponding to a standard row region.

As shown in FIG. 15, the variations in darkness among the image strips are visually perceived macroscopically as horizontal stripe-like unevenness in darkness. More specifically, the image strips located in a section where the spacing between adjacent raster lines is relatively wide appear light macroscopically, whereas the image strips located in a section where the spacing between adjacent raster lines is relatively narrow appear dark macroscopically. Such unevenness in darkness causes deterioration in the quality of the printed image.

It should be noted that the above-mentioned cause of unevenness in darkness also applies for the other ink colors. If there is even one color, among the four colors CMYK, that exhibits variation in darkness, then unevenness in darkness will appear in an image in the case of multi-color printing.

Overview of Correction Values

In order to correct the above-mentioned unevenness in darkness for each row region, correction values are set to the printer 100 for every row region. For example, as for a row region that tends to be visually perceived darker than a reference, a correction value is set such that the image strip in that row region is formed light, and as for a row region that tends to be visually perceived lighter than a reference, a correction value is set such that the image strip in that row region is formed dark. Such correction values are referred to in processing by the printer driver 330, for example. For example, the CPU 311 of the computer 300 corrects the CMYK pixel data, which are obtained through the color conversion process, based on the correction values, and then performs the halftoning process on the CMYK pixel data that have been corrected. In short, the tone values of the pixel data are corrected based on the correction values. In this way, the amount of ink ejected is adjusted such that the variations in darkness among the image strips are suppressed.

It should be noted that, in the example of FIG. 14B, the reason why the image strip corresponding to the n+2$^{nd}$ row region becomes dark is because the spacing between the adjacent raster lines is narrower than the normal spacing. More specifically, the n+1$^{st}$ raster line which should be formed in the center, in the carrying direction, of the n+1$^{st}$ row region is actually formed closer to the n+2$^{nd}$ row region, and this is why the corresponding image strip becomes dark. In other words, the reason why the corresponding image strip becomes dark is not due to the raster line corresponding to the n+2$^{nd}$ row region. Accordingly, when focusing on a certain image strip, it is necessary to take into consideration the raster line(s) formed in the adjacent row region(s). Therefore, a method in which correction values are simply set for the respective nozzles cannot suppress such kind of unevenness in darkness. In view of the above, in the printer 100 of the present embodiment, correction values are set for the respective row regions and the darkness of the printed image is corrected based on these correction values.

In order to set such correction values, the following processes are carried out in an inspection step in a printer manufacturing factory: a printer 100 targeted for processing is made to print a test pattern CP, the test pattern CP is read with a scanner 200, at least one correction value is determined for each row region based on the darkness of each image strip in the test pattern CP, and the correction values for the respective row regions are stored in the correction value storing section 152a in the memory 152 of the printer-side controller 150. Note that the test pattern CP is printed by the printer 100 for which the correction values are to be set, that is, the printer 100 targeted for processing. Thus, the correction values that are set reflect the characteristics of the unevenness in darkness of each individual printer 100. Then, under instructions by a user who has purchased the printer 100, the computer (i.e., the computer that the user owns) obtains the correction values, corrects the tone values of the pixel data based on the obtained correction values, generates print data based on the corrected tone values, and outputs the print data to the printer 100. The printer 100 then performs printing based on the print data.

Processing in Printer Manufacturing Factory

Printing Test Pattern CP

Figures 16A, 16B:
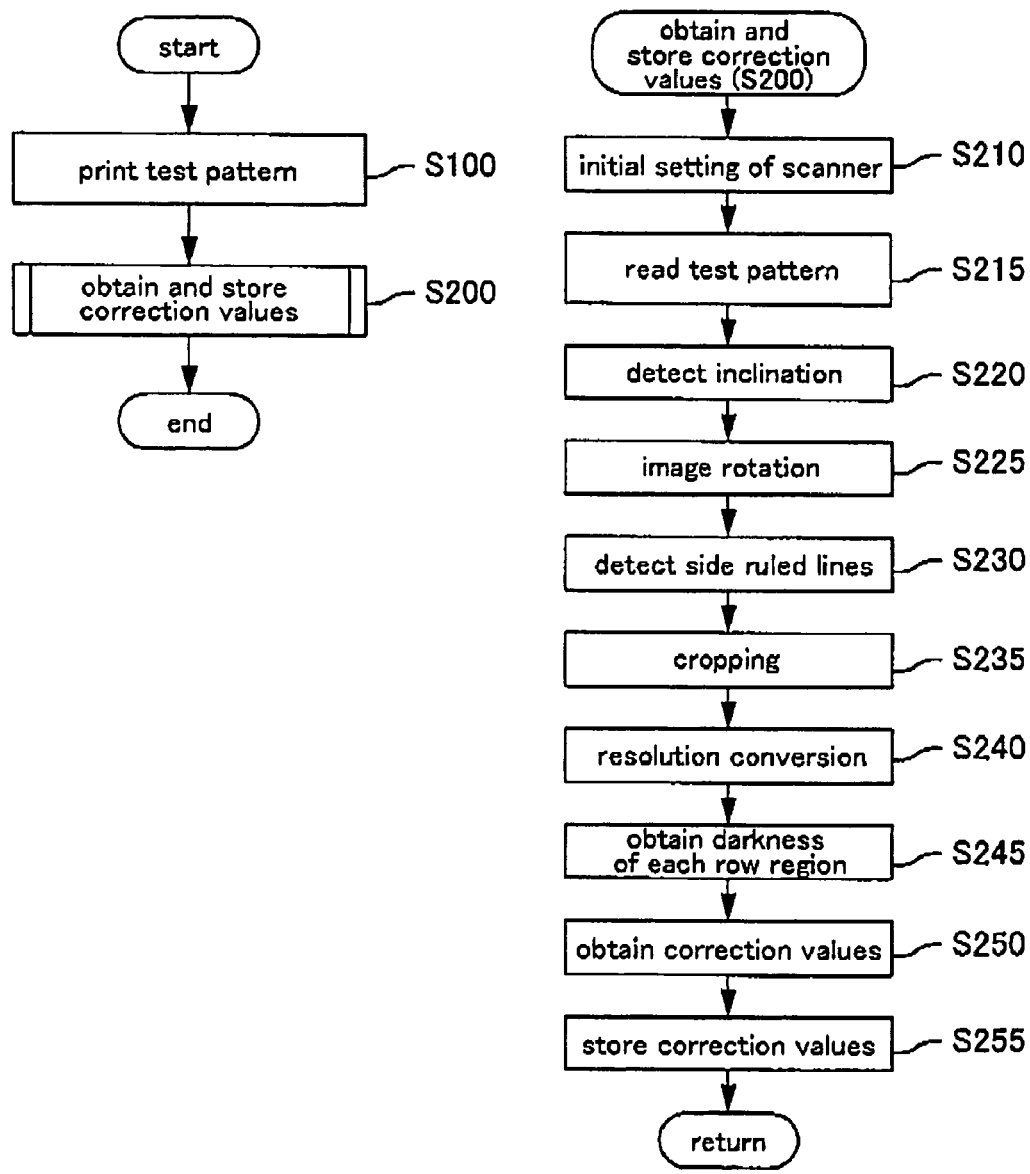
FIG. 16A is a flowchart of a correction value setting process.
FIG. 16B is a flowchart of a process for obtaining and storing correction values.

Next, processing carried out in a printer manufacturing factory is described. FIG. 16A is a flowchart of a correction value setting process performed in an inspection step after the printer 100 has been manufactured. FIG. 16B is a flowchart of a process for obtaining and storing correction values in the correction value setting process. It should be noted that the correction value setting process described below is achieved by the correction value setting program 320', the scanner driver 350, and the printer driver 330 which are installed in the computer 300. Accordingly, the correction value setting program 320', the scanner driver 350, and the printer driver 330 include codes for performing the correction value setting process.

Before running the correction value setting process, the worker connects the printer 100 for which the correction values are to be set to the computer 300. The computer 300 is connected to the scanner 200 in advance. In addition, the correction value setting program 320' is installed to the computer 300. As described above, the correction value setting program 320' is a type of application program 320, and makes the CPU 311 perform processes necessary for setting the correction values. Examples of such processes include: a process for making the printer 100 print a test pattern CP, a process for performing image processing, analysis, and the like with respect to data on the darkness of an image obtained through the scanner 200, and a process for storing the obtained correction values in the memory 152 (correction value storing section 152a) of the printer 100.

After connection of the printer 100, printing of a test pattern CP is started (S100). In this step, the worker in the factory gives out an instruction for printing the test pattern CP via the user interface of the correction value setting program 320'. Receiving this instruction, the CPU 311 of the host-side controller 310 generates print data for the test pattern and sends the generated print data to the printer 100. The printer 100 prints a test pattern on paper S, which serves as a medium, based on the print data sent from the computer 300. This printing operation is performed according to the processes described above (see FIG. 12). Describing this briefly, the printing is performed by repeating, in accordance with the print data, the dot formation operation (S030) in which the ink is ejected toward the paper S while the head 131 is moved in the movement direction and the carry operation (S040) in which the paper S is carried in the carrying direction.

Test Pattern CP

Figure 17A:
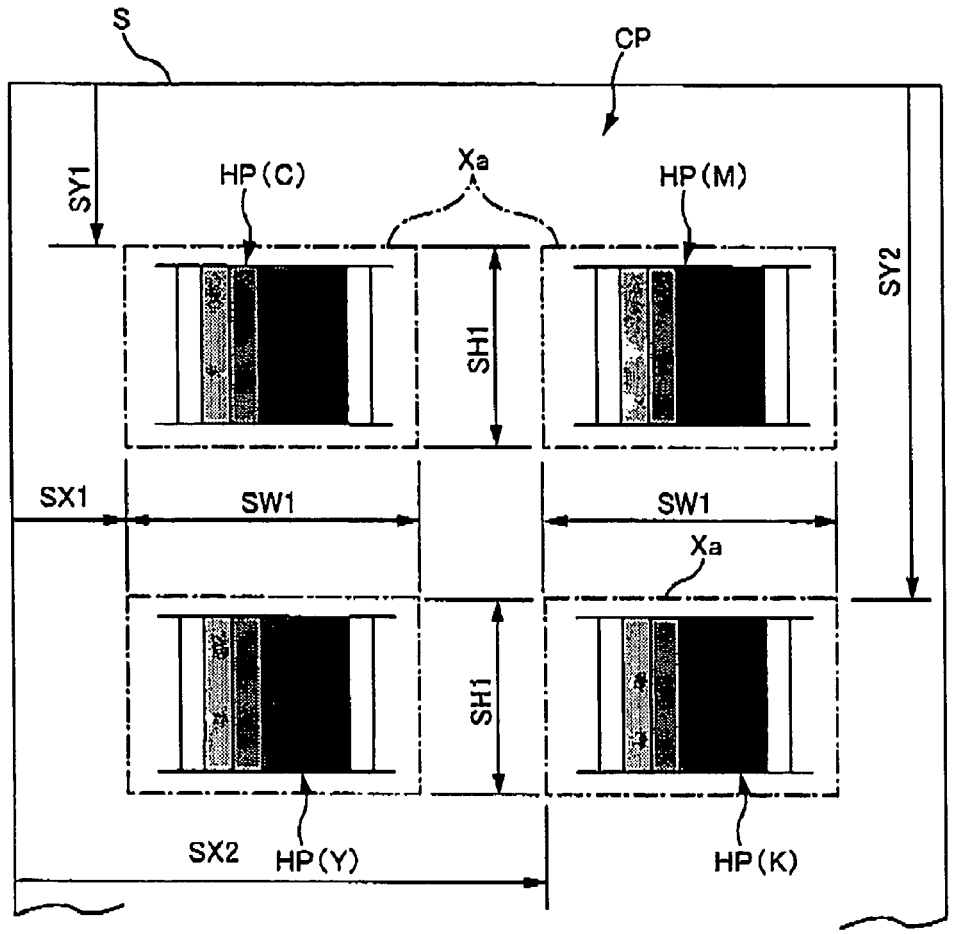
FIG. 17A is an explanatory diagram of a test pattern.
Figure 17B:
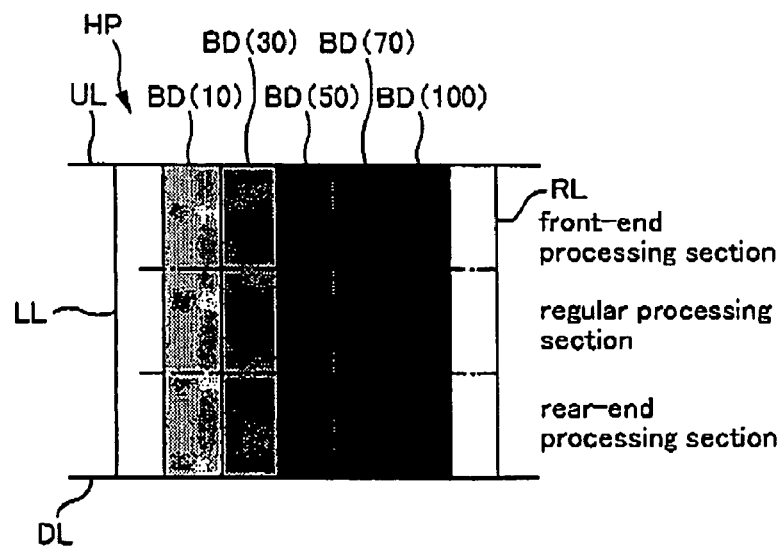
FIG. 17B is an explanatory diagram of a correction pattern.

The test pattern CP that is printed is described next. FIG. 17A is an explanatory diagram of a test pattern CP. FIG. 17B is an explanatory diagram of a correction pattern HP. Note that a test pattern CP refers to the correction patterns HP altogether which are printed on the paper S. A correction pattern HP refers to a section printed using the same type of ink, and is used to evaluate the variation in darkness. As described above, the present printer 100 is capable of ejecting four types of ink: cyan ink (C), magenta ink (M), yellow ink (Y), and black ink (K). Thus, it can be said that the test pattern CP includes four correction patterns HP for the respective colors. Further, the term "type of ink" includes differences in color material. For example, black dye ink and black pigment ink are different types of ink, although they have the same color. Therefore, for a printer 100 that uses both black dye ink and black pigment ink, a correction pattern HP is printed using black dye ink and another correction pattern HP is printed using black pigment ink.

Each correction pattern HP consists of five types of belt-like patterns BD (BD(10) to BD(100)) printed respectively at their predetermined darkness, a top ruled line UL, a bottom ruled line DL, a left ruled line LL, and a right ruled line RL. The belt-like patterns BD are respectively generated from image data of a constant tone value. Starting from the belt-like pattern BD on the left end in FIG. 17B, the belt-like patterns BD respectively represent tone value 26 (darkness of 10%), tone value 76 (darkness of 30%), tone value 128 (darkness of 50%), tone value 179 (darkness of 70%), and tone value 255 (darkness of 100%), and the patterns closer to the right are printed darker in darkness. It should be noted that the five types of tone values (darkness) correspond to designated values in terms of control, and are therefore referred to as "designated tone values (designated darkness)", and are expressed using the following symbols: Sa (tone value 26), Sb (tone value 76), Sc (tone value 128), Sd (tone value 179), and Se (tone value 255).

As described above, the front-end processing, the regular processing, and the rear-end processing are performed during printing of an image. Thus, each correction pattern HP is printed using the front-end processing, the regular processing, and the rear-end processing. In other words, each correction pattern HP includes a front-end processing section, a regular processing section (corresponding to an intermediate processing section), and a rear-end processing section. It should be noted that in image printing performed under instructions by a user, several thousand raster lines make up the regular processing section in cases of, for example, A4-size paper. Since there is periodicity in the combination of nozzles Nz responsible for each raster line in the regular processing section, the length (i.e., the length in the carrying direction) of the regular processing section in each correction pattern HP is set to a length in which raster lines corresponding to several periods are included. For example, it is set to a length corresponding to eight periods.

Further, as regards the top ruled line UL and the bottom ruled line DL in the present correction pattern HP, the top ruled line UL is formed by the first raster line in the belt-like patterns BD, and the bottom ruled line DL is formed by the last raster line in the belt-like patterns BD.

Obtaining Correction Values

Initial Setting of Scanner 200

After printing the test pattern CP, a process for obtaining correction values and storing those correction values in the printer 100 is performed (S200). This process is described below. As shown in FIG. 16B, in this process, first, initial setting of the scanner 200 is performed (S210). In this initial setting, settings, such as reading resolution of the scanner 200, the type of document, the type of image, the scan mode, and the format for saving the image that has been read, are made. Among these items, it is necessary to set the reading resolution of the scanner 200 higher than the print resolution, and preferably, the reading resolution is set to an integer multiple of the print resolution. In this example, the print resolution of the test pattern CP is 720 dpi, and thus the reading resolution of the scanner 200 is set to 2880 dpi which is four times the print resolution. Further, the type of document is "reflection document", the type of image is "8-bit grayscale", and the save format is "bitmap".

Reading Test Pattern CP

After the initial setting of the scanner 200 is made, the test pattern CP is read (S215). In this step, the worker sets the document (the paper S on which the test pattern CP is printed) onto the scanner 200, and gives out an instruction, via the user interface of the correction value setting program 320', to read the darkness of the test pattern CP. On receiving this instruction, the CPU 311 of the host-side controller 310 outputs to the scanner 200 a read command (a type of control command) for making the scanner read the darkness of the document. The scanner-side controller 210 receives the read command and controls the reading mechanism 220 and the drive mechanism 230 to obtain the darkness data of the entire paper. Here, the test pattern CP is read by making the reading carriage 223 move in a predetermined direction (the sub-scanning direction). In other words, the darkness of each of the belt-like patterns BD, which are printed respectively with their predetermined darkness, is obtained along the longitudinal direction of the belt-like patterns BD. Then, the scanner-side controller 210 outputs the obtained darkness data to the computer 300. Note that each piece of darkness data obtained in this way becomes data indicative of the darkness for each pixel (here, a region of a size defined by the reading resolution), and the pieces of darkness data make up an image. Therefore, in the description below, the data obtained by the scanner 200 is also referred to as "image data", and the pieces of darkness data for the respective pixels that make up this image data are also referred to as "pixel darkness data". Each pixel darkness data is made of a tone value (corresponding to a "readout value") indicative of the darkness.

Receiving the image data from the scanner 200, the host-side controller 310 obtains, from the received image data, image data within a predetermined range Xa corresponding to each correction pattern HP. As shown by the long-and-short dashed lines in FIG. 17A, the predetermined range Xa is set as a rectangular range larger than the correction pattern HP. The host-side controller 310 obtains, from the image data of the entire paper, image data for each correction pattern HP. For example, as for the cyan correction pattern HP (C) located in the upper left in FIG. 17A, the predetermined range Xa defined by the long-and-short dashed lines surrounding the correction pattern HP (C) becomes the image data of the cyan correction pattern HP (for convenience' sake, this is referred to also as "cyan pattern image data"; same for the other colors). This range is specified according to predetermined parameters SX1, SY1, SW1, and SH1. The parameter SX1 is data on the X-axis coordinate indicating the point of origin of the predetermined range Xa. The parameter SY1 is data on the Y-axis coordinate indicating the point of origin of the predetermined range Xa. The parameter SW1 is data indicating the width of the predetermined range Xa in the X-axis direction.

The parameter SH1 is data indicating the width of the predetermined range Xa in the Y-axis direction. These parameters are stored, for example, in the correction value setting program 320'. Accordingly, the host-side controller 310 obtains the image data (pixel darkness data) for the predetermined range Xa specified by these parameters SX1, SY1, SW1, and SH1. Note that the image data for the correction patterns HP of the other colors is obtained in the same way by appropriately using parameters SX2 and SY2 indicating the point of origin.

Correcting Inclination of Correction Pattern HP

Figure 18A:
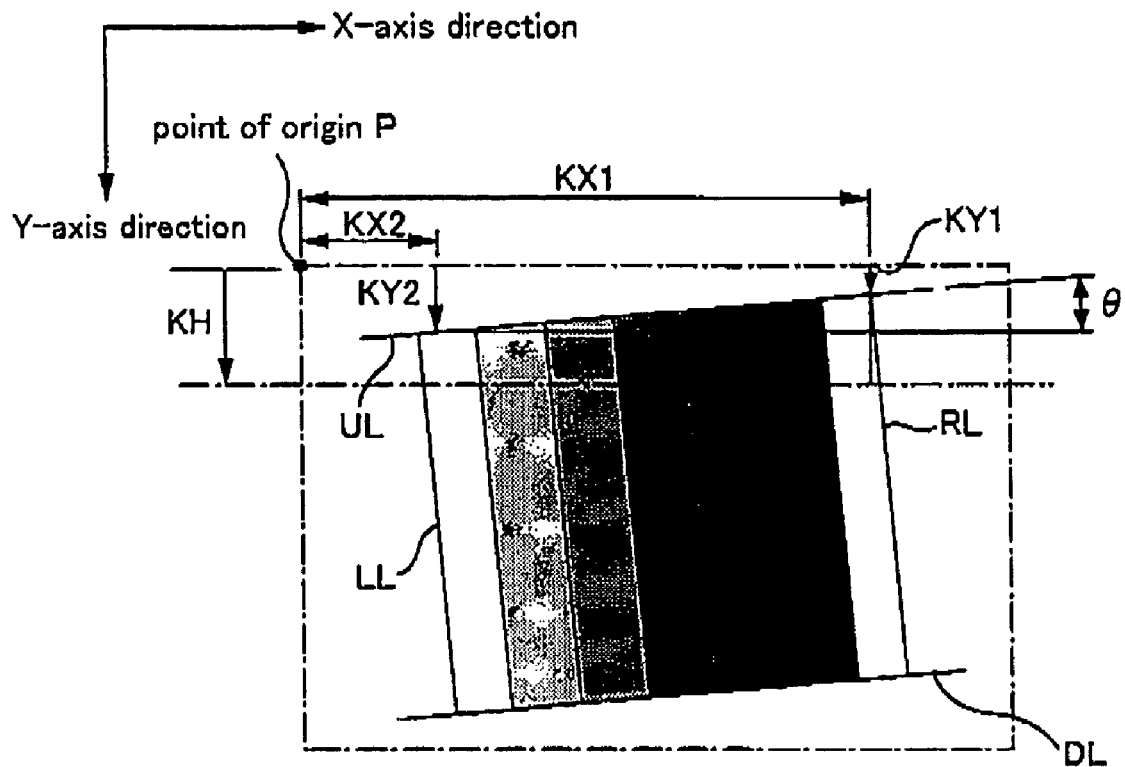
FIG. 18A is a diagram for describing image data at the time of detecting an inclination.
Figure 18B:
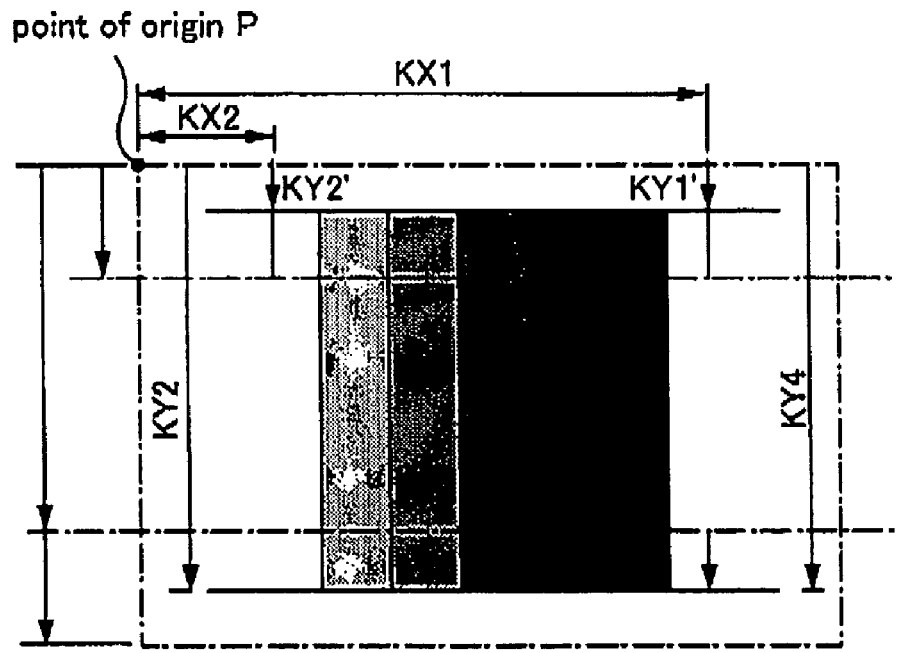
FIG. 18B is an explanatory diagram of image data after rotation processing.

Next, the host-side controller 310 finds the inclination θ in the correction pattern HP included in the image data (S220), and performs rotation processing on the image data in accordance with the inclination θ (S225). FIG. 18A is a diagram for describing image data at the time of detecting the inclination 9. FIG. 18B is an explanatory diagram of image data after the rotation processing. The host-side controller 310 obtains, from the image data that has been obtained, pixel darkness data for pixels within a predetermined range. In this example, the pixel darkness data are obtained for a group of KH pieces of pixels in the Y-axis direction located at a distance of KX1 in the X-axis direction from the point of origin P. Likewise, the pixel darkness data are obtained for a group of KH pieces of pixels in the Y-axis direction located at a distance of KX2 in the X-axis direction from the point of origin P. In these cases, the parameters KX1, KX2, and KH are set such that the pixels corresponding to the right ruled line RL and the left ruled line LL are not included in the pixels that are obtained, but are set such that the pixels corresponding to the top ruled line UL are included. Then, in order to detect the position of the top ruled line UL, the host-side controller 310 finds the respective barycentric positions KY1 and KY2 of the KH pieces of pixel darkness data (tone values) that have been obtained. Then, based on the parameters KX1 and KX2 and the barycentric positions KY1 and KY2, the host-side controller 310 calculates the inclination θ of the correction pattern HP using the following expression (1), and performs image data rotation processing based on the calculated inclination θ:

$$\theta = \tan^{-1}\{(KY2-KY1)/(KX2-KX1)\} \quad (1)$$

Cropping Correction Pattern HP

Figure 19:
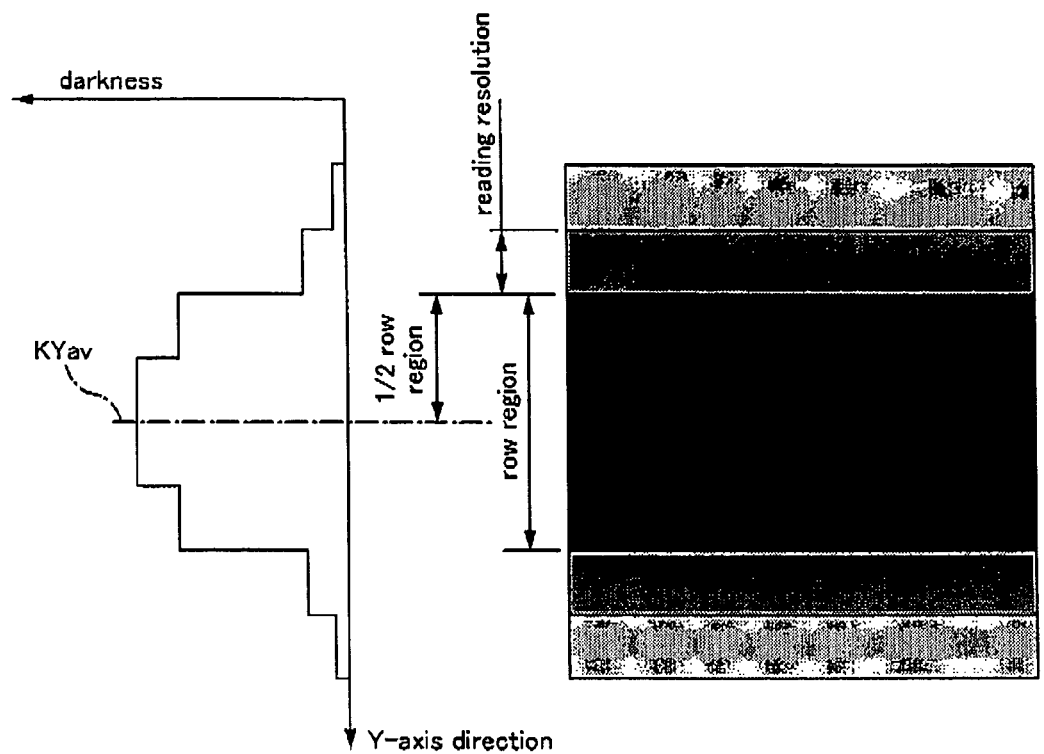
FIG. 19 is an explanatory diagram showing image data at the time of cropping.

Next, the host-side controller 310 finds the horizontal ruled lines (the top ruled line UL and the bottom ruled line DL) from the image data of each correction pattern HP (S230) and performs cropping (S235). FIG. 19 is an explanatory diagram showing image data at the time of cropping, and is for describing the cropping position at the top ruled line UL. Note that FIG. 18B is also referred to in the description below. The host-side controller 310 obtains, from the image data that has been subjected to the rotation processing, pixel darkness data for pixels within a predetermined range. In this example, as in the rotation processing described above, the pixel darkness data are obtained for KH pieces of pixels in the Y-axis direction located at a distance of KX1 and KX2 in the X-axis direction from the point of origin. Next, the host-side controller 310 finds the barycentric positions KY1' and KY2' (the barycentric positions regarding the darkness) of the KH pieces of pixel data that have been obtained respectively for the two pixel groups, and takes the average value of the two barycentric positions KY1' and KY2' that have been obtained as the barycentric position KYav of the top ruled line UL. The host-side controller 310 then determines, as the cropping position, the position located half the width of a row region toward the side of the point of origin from the barycentric position KYav of the top ruled line UL. More specifically, the border between the pixels closest to this position is determined as the cropping position. It should be noted that, in this embodiment, half the width of a row region is equal to a width of two pixels in the image data, since the reading resolution at the time of obtaining the image data is 2880 dpi and the width of the row region at the time of printing the test pattern CP is 720 dpi. The correction value obtaining program then executes the cropping by cropping the pixels located on the upper side from the cropping position that has been determined. The description above is about the cropping position at the top ruled line UL, but the same processing is performed for the bottom ruled line DL. That is, as regards cropping at the bottom ruled line DL, the position located half the width of a row region away from the point of origin from the barycentric position of the bottom ruled line DL is determined as the cropping position.

Resolution Conversion

After cropping, the host-side controller 310 converts the resolution of the cropped image data (S240). In this process, the resolution of the image data is converted such that the number of pixels in the image data in the Y direction becomes equal to the number of raster lines that make up the correction pattern HP. In a case where a correction pattern HP printed at a resolution of 720 dpi is read at a resolution of 2880 dpi, the number of pixels in the image data in the Y-axis direction should ideally be four times the number of raster lines making up the correction pattern HP. In reality, however, there are cases in which the number of raster lines does not match the number of pixels due, for example, to influence of misalignment during printing and/or reading. The resolution conversion is performed on the image data in order to eliminate such a mismatch.

In this process, the host-side controller 310 performs calculation according to the following expression (2) with respect to the cropped image data, to calculate the magnification for the resolution conversion:

"magnification for resolution conversion"="number of raster lines making up the correction pattern HP"/"number of pixels in the Y-axis direction of the cropped image data"    (2)

After calculating the magnification, the resolution conversion process is performed at that magnification. There are many ways to perform this resolution conversion; in this example, the Bicubic method is employed. As a result, the number of pixels lined up in the Y-axis direction becomes equal to the number of row regions, and a row of pixels lined up in the X-axis direction will have a one-to-one correspondence with a row region. For example, the row of pixels closest to the point of origin in the Y-axis direction will correspond to the first row region, and the row of pixels located below the first row will correspond to the second row region. In other words, it is possible to obtain pixel darkness data for every unit region making up the row region for the correction pattern HP. Accordingly, it can be said that the present correction value setting system 1000 reads the darkness of the test pattern CP for every unit region. Since the unit for reading the darkness of the test pattern CP matches the unit region, it becomes easy to evaluate the variation in darkness and to correlate the settings of the correction values, thus improving workability.

Obtaining Darkness of Each Row Region

Figure 20:
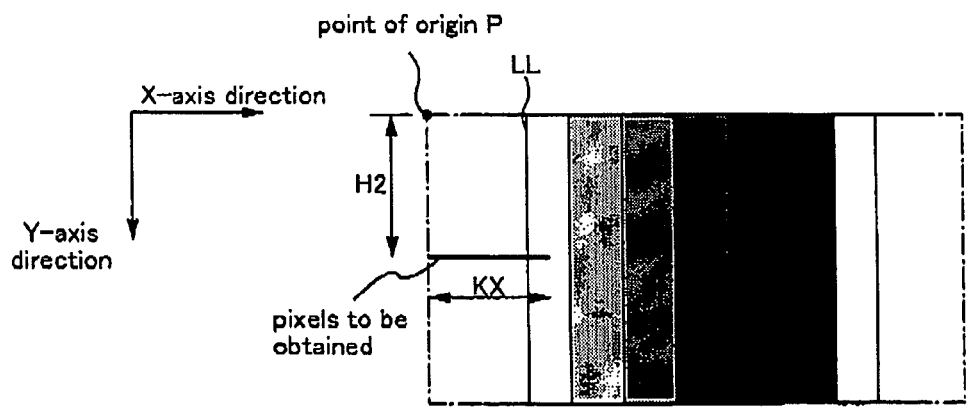
FIG. 20 is a diagram for describing detection of a left ruled line.

Next, the host-side controller 310 obtains the darkness of each row region in the correction pattern HP (S245). FIG. 20 is a diagram for describing detection of the left ruled line LL.

Figure 21:
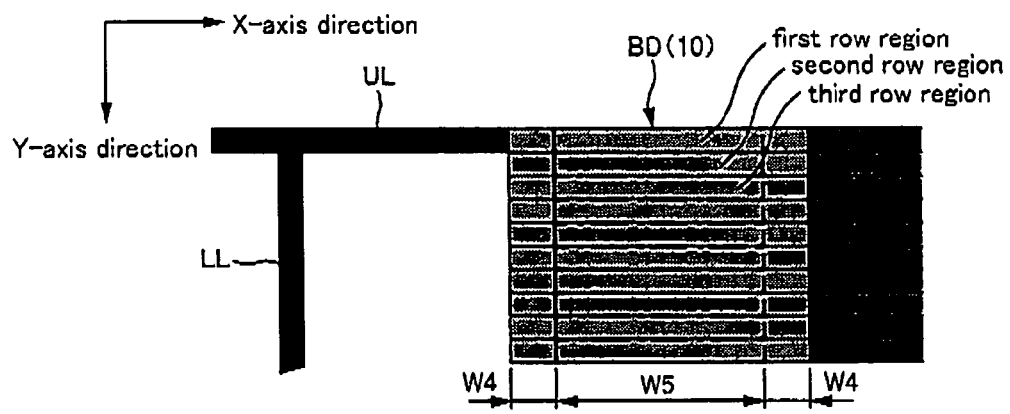
FIG. 21 is a diagram for describing a range in which darkness of a belt-like pattern is measured.

FIG. 21 is a diagram for describing the range in which the darkness of a belt-like pattern BD is measured. In obtaining the darkness of each row region, the host-side controller 310 detects the position of a vertical ruled line (the left ruled line LL in this example) which serves as a reference. First, the host-side controller 310 obtains, from the image data that has been subjected to the resolution conversion, pixel darkness data for pixels within a predetermined range. For example, as shown in FIG. 20, the pixel darkness data are obtained for KX pieces of pixels in the X-axis direction located at a distance of H2 in the Y-axis direction from the point of origin P. Note that the number of pixels in the X-axis direction ("KX") is set such that the pixel darkness data corresponding to the left ruled line LL are included in the group of pixel darkness data that are obtained. Then, the host-side controller 310 finds the barycentric position of the pixel darkness data (tone values) that have been obtained. This barycentric position corresponds to the central position of the left ruled line LL. The distance, in the X-axis direction, from the left ruled line LL to each of the belt-like patterns BD is known in advance. Accordingly, the host-side controller 310 specifies the pixels that make up each belt-like pattern BD (BD(10) to BD(100)) using the barycentric position of the left ruled line LL as a reference, and obtains the pixel darkness data of the pixels that have been specified. For example, as for the belt-like pattern BD(10) printed at 10% darkness, the pixel darkness data are obtained for the pixels that belong to the range (the range of width W5) surrounded by the dotted lines and excluding the ranges indicated by W4. Then, the average value of the pixel darkness data that have been obtained is employed as the readout darkness for the first row region at 10% darkness. The readout darkness is obtained in the same way for the other row regions and the other belt-like patterns BD. It should be noted that the readout darkness can be expressed as a darkness measurement value obtained by the scanner 200. The pieces of information on the readout darkness obtained are stored in the data table (see FIG. 3) in the memory 312 of the host-side controller 310. More specifically, each readout darkness is stored in a region specified by the ink color, the darkness at which the pattern is printed, and the row region number. Note that the "darkness 1" to "darkness 5" in FIG. 3 refer to the darkness of the respective belt-like patterns BD. For example, the darkness 1 corresponds to 10% darkness, and the darkness 5 corresponds to 100% darkness. Further, in the present correction value setting system 1000, it is judged whether or not the darkness of a foreign matter Z other than the test pattern CP has been read at the time of obtaining the darkness of each row region. If it is judged that the darkness of a foreign matter Z has been read, then the system notifies the user of that fact and prompts the user to re-read the test pattern CP, or calculates the darkness after excluding the section corresponding to the foreign matter Z from the target of calculation. This is described later on.

Obtaining Correction Values

Figure 22:
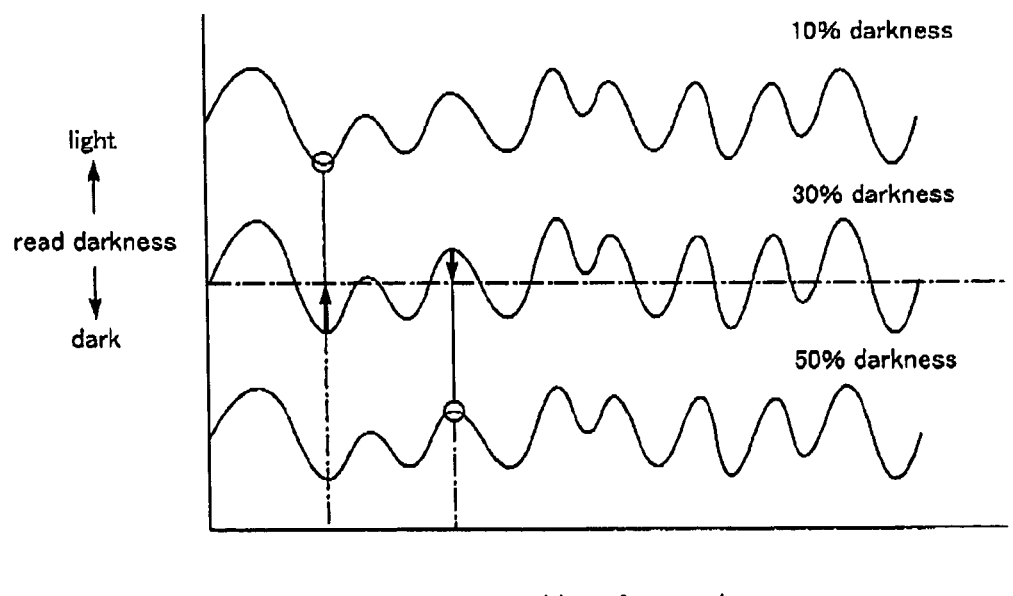
FIG. 22 is a diagram for describing a combination of readout darkness used for obtaining correction values.
Figure 23A:
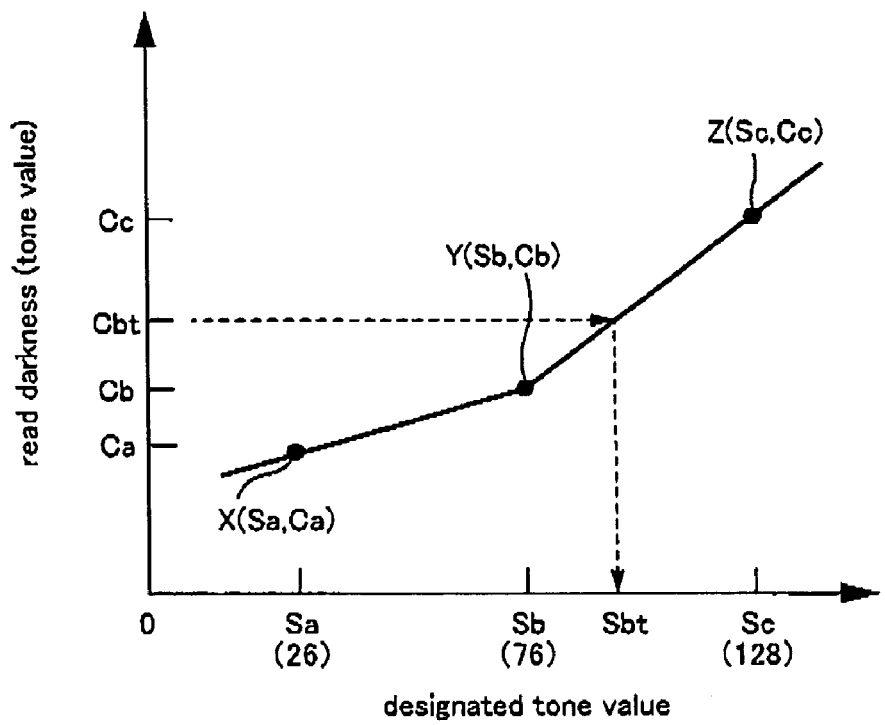
FIG. 23A is a diagram for describing how to obtain correction values in cases where the readout darkness is lower (lighter) than a target darkness.
Figure 23B:
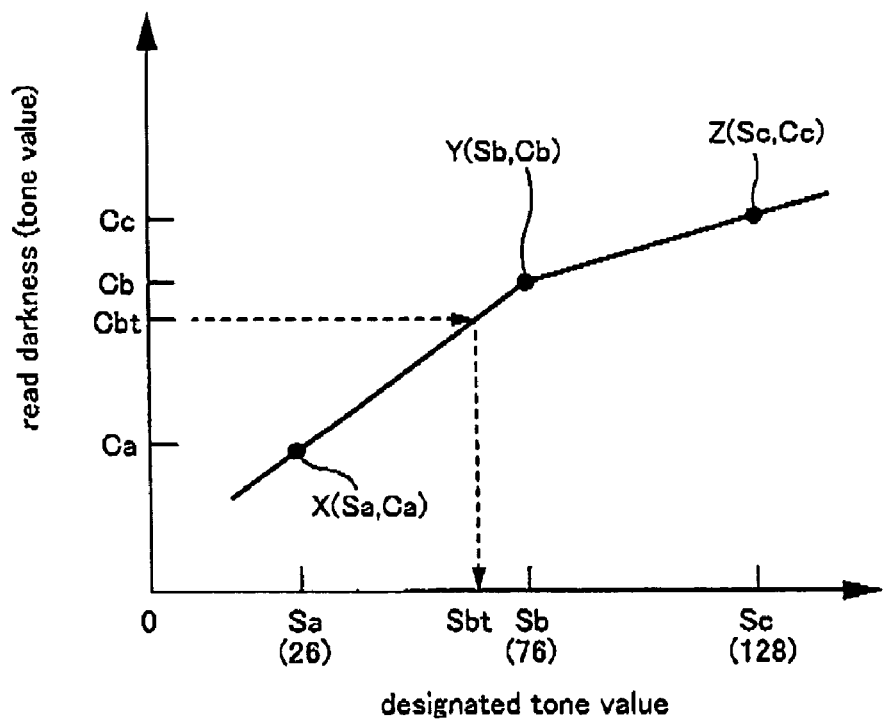
FIG. 23B is a diagram for describing how to obtain correction values in cases where the readout darkness is higher (darker) than a target darkness.

After obtaining the readout darkness of each row region, the host-side controller 310 obtains correction values for each row region (S250). As described above, a single belt-like pattern BD is printed using the same designated tone value. However, there is a variation among the readout darkness obtained for the respective row regions. This variation causes unevenness in darkness in a printed image. In order to eliminate this unevenness in darkness, it is desired to make the readout darkness uniform among the row regions in each belt-like pattern BD as much as possible. From such a point of view, a correction value is set for each row region based on the readout darkness of each row region, The example described below is about a case in which a correction value for a certain row region at the designated tone value Sb (30% darkness; tone value 76) is obtained. FIG. 22 is a diagram for describing a combination of readout darkness used for obtaining correction values. FIG. 23A is a diagram for describing how to obtain correction values in cases where the readout darkness is lower (lighter) than a target darkness. FIG. 23B is a diagram for describing how to obtain correction values in cases where the readout darkness is higher (darker) than a target darkness.

In the present correction value setting system 1000, the host-side controller 310 sets a target darkness for the darkness for which the correction values are to be set. In this example, the average value of the readout darkness of each row region is set as the target darkness for the belt-like pattern BD with the darkness for which the correction values are to be set. The correction value for a certain row region is then determined according to the difference between the readout darkness therefor and the target darkness. In other words, it can be said that variations in the darkness among the row regions are being evaluated at the time of obtaining the correction values. In setting the correction value for each row region, the host-side controller 310 refers to the readout darkness of the higher-side darkness which is higher than the darkness targeted for the setting and also the readout darkness of the lower-side darkness which is lower than the darkness targeted for the setting. For example, as shown in FIG. 22, in setting the correction values for the designated tone value Sb (30% darkness), the readout darkness of the designated tone value Sc (50% darkness; tone value 128) is employed as the higher-side darkness, whereas the readout darkness of the designated tone value Sa (10% darkness; tone value 26) is employed as the lower-side darkness.

Then, if the readout darkness of a certain row region is lower than the target darkness, then as shown in FIG. 23A, a correction value is obtained based on the designated tone value Sb and the readout darkness Cb for that certain row region, and also the designated tone value Sc and the readout darkness Cc of the corresponding row region, which are of the higher-side darkness. More specifically, the host-side controller 310 performs linear interpolation (linear interpolation based on line YZ) as shown in the following expression (3) to calculate the designated tone value Sbt corresponding to the target darkness, and then performs calculation as shown in the following expression (4) to obtain a correction value Hb:

$$Sbt = Sb + (Sc - Sb) \times \{(Cbt - Cb)/(Cc - Cb)\} \quad (3)$$

$$Hb = (Sbt - Sb)/Sb \quad (4)$$

On the other hand, if the readout darkness of a certain row region is higher than the target darkness, then as shown in FIG. 23B, a correction value is obtained based on the designated tone value Sb and the readout darkness Cb for that certain row region, and also the designated tone value Sa and the readout darkness Ca of the corresponding row region, which are of the lower-side darkness. More specifically, the host-side controller 310 performs linear interpolation (linear interpolation based on line XY) as shown in the following expression (5) to calculate the designated tone value Sbt corresponding to the target darkness, and then performs calculation as shown in the following expression (4) (described above) to obtain a correction value Hb:

$$Sbt = Sb - (Sb - Sa) \times \{(Cbt - Cb)/(Ca - Cb)\} \quad (5)$$

$$Hb = (Sbt - Sb)/Sb \quad (4)$$

The host-side controller 310 performs the above-mentioned calculation for each row region to obtain a correction value Hb for the tone value Sb (30% darkness) for every row region. In the same way, the host-side controller 310 obtains a correction value Hc for the tone value Sc (50% darkness) for every row region. In this case, the readout darkness of the designated tone value Sd (70% darkness; tone value 179) is employed as the higher-side darkness, whereas the readout darkness of the designated tone value Sb (30% darkness; tone value 76) is employed as the lower-side darkness. Furthermore, the host-side controller 310 also obtains a correction value Hd for the tone value Sd (70% darkness) for every row region. The correction values Hb, Hc, and Hd obtained in this way are temporarily stored in the memory 312 (for example, a work memory) of the host-side controller 310. Thereafter, the correction values are stored in the memory 152 of the printer-side controller 150.

As described above, as regards the group of raster lines formed with the regular processing, there is periodicity in the combination of nozzles Nz responsible for each raster line. Therefore, this periodicity is taken into consideration when determining the correction values for the regular processing section. More specifically, correction values are determined for row regions in a single period. In this case, the correction value for a certain row region is determined by calculating a provisional correction value for each row region in each of the periods and then averaging the provisional correction values of corresponding row regions in the respective periods.

Storing Correction Values

Figures 24, 25:
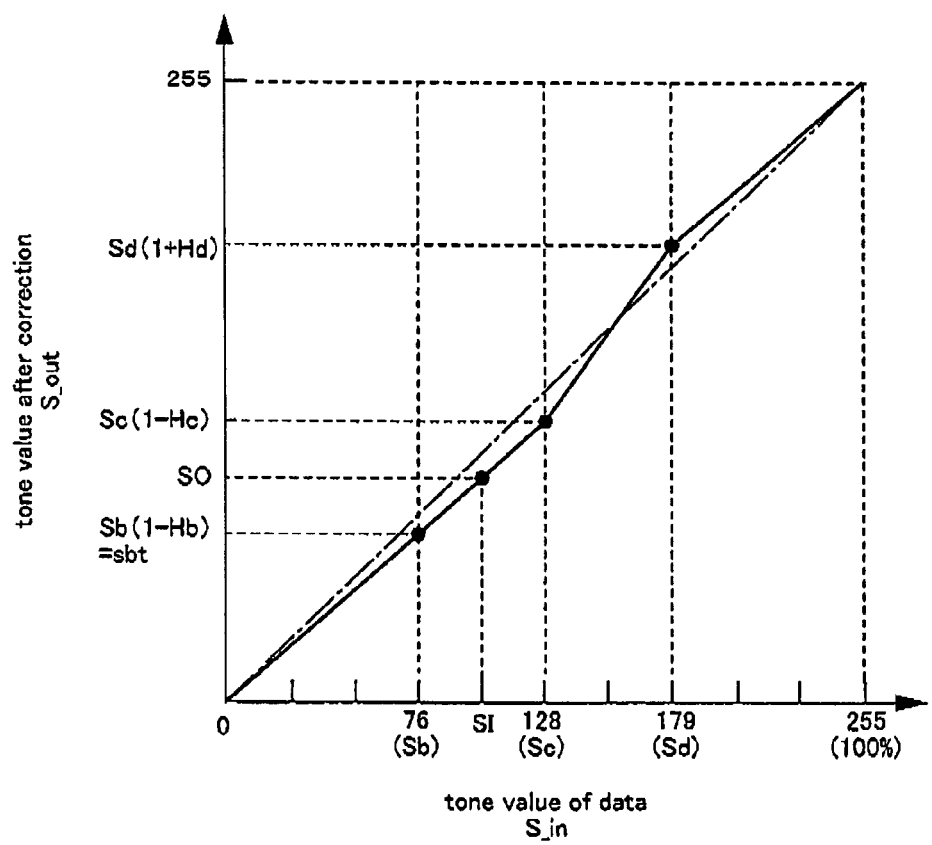
FIG. 24 is a diagram for describing the correction values stored in a correction value storing section.
FIG. 25 is a diagram for describing a darkness correction process.

After obtaining the correction values, the host-side controller 310 stores the obtained correction values in the memory 152 (the correction value storing section 152a; see FIG. 11) of the printer-side controller 150 (S255). FIG. 24 is a diagram for describing the correction values stored in the correction value storing section 152a. In this case, the host-side controller 310 communicates with the printer 100 to establish a state in which the correction values can be stored. The host-side controller 310 then transfers the correction values stored in its memory 312 and stores the correction values in the memory 152 of the printer-side controller 150. As shown in FIG. 11, the correction value storing section 152a includes a region for storing the correction values for the front-end processing, a region for storing the correction values for the regular processing, and a region for storing the correction values for the rear-end processing. As shown in detail in FIG. 24, a multitude of these storing regions are provided corresponding to the respective row regions. Note that the number of storing sections provided for the regular processing section corresponds to one period, as described above. Accordingly, the correction value storing section 152a stores, respectively for the row regions, a set of three types of correction values corresponding to the three different darkness. Further, this set is provided for each type of ink. Note that in FIG. 24, "darkness 2" refers to the second lightest darkness, and corresponds to 30% darkness in this example. Likewise, 50% darkness corresponds to "darkness 3", and 70% darkness corresponds to "darkness 4".

Processing Under Instructions by User

Printing System

The printer 100 for which the correction values have been stored in the memory 152 (the correction value storing section 152a) of the printer-side controller 150 according to the above-mentioned procedure is shipped from the factory after other inspections have been performed. At the time of shipping, a CD-ROM storing the printer driver 330 is also packaged with the printer 100. A user who has purchased the printer 100 connects the printer 100 to his/her computer (which is, of course, different from the computer 300 in the factory) to construct a printing system. The "printing system" refers to a system that includes at least a printing apparatus to which the correction values have been set and a print-control apparatus. The "print-control apparatus" is constructed, for example, by the user's computer, and has installed thereto application programs and the printer driver. The correction values stored in the memory 152 of the printer 100 may be transferred to the computer when the printer driver is installed. Otherwise, the computer 300 may be made to reference the correction values stored in the memory 152 at the time of printing. Note that the printer driver does not have to be installed from the CD-ROM, but it may be downloaded through a communications line.

Printing Operation

When the power is turned ON, the printer 100 waits until print data is sent from the computer 300. On receiving print data from the computer 300, the printer 100 performs printing operation. The basic operation of the printing operation is the same as the printing operation for printing the test pattern CP, and therefore, detailed description thereof will not be given here. What is different from the printing operation for the test pattern CP is that, in the printing operation under instructions by the user, the pixel data are corrected per every row region using the correction values. More specifically, the host-side controller 310 of the computer performs a darkness correction process after the color conversion process, and then performs the halftoning process with respect to the multi-level pixel data that have been corrected in darkness. This is described below. FIG. 25 is a diagram for describing the darkness correction process with respect to the pixel data. The darkness correction process is a process for correcting the tone value of each piece of pixel data based on the correction values. In this case, the correction values determined corresponding to the target row region is used. As described above, in this example, three correction values respectively corresponding to 30% darkness (tone value 76), 50% darkness (tone value 128), and 70% darkness (tone value 179) are correlated to each row region. The host-side controller 310 corrects the pixel data for each of the unit regions that belong to the target row region based on the three correction values. That is, a tone value S_out after correction is obtained from the tone value S_in of the pixel data obtained through the color conversion process, and the tone value S_out is subjected to the halftoning process.

If the tone value S_in of the pixel data before correction is the same as the designated tone value Sb, then the host-side controller 310 can for a dot corresponding to the target darkness Cbt in that pixel on the paper by correcting the tone value S_in to the target designated tone value Sbt. On the contrary, if the tone value S_in before correction is a tone value Sl that is different from the designated tone value, then, for example, a tone value SO to be output can be obtained by linear interpolation as shown in FIG. 25. This, however, is not a limitation, and for example, interpolation may be performed by a curved line between the correction values (Hb, Hc, and Hd) corresponding to the respective designated tone values.

As a result of the above-mentioned darkness correction process, as for a row region that tends to be visually perceived dark, the tone values of the pixel data (CMYK data) of the unit regions corresponding to that row region are corrected such that they become smaller. On the contrary, as for a row region that tends to be visually perceived light, the tone values of the pixel data of the unit regions corresponding to that row region are corrected such that they become larger. Note that the printer driver performs the same correction process for the row regions of the other colors.

Outputting the print data thus generated to the printer 100 results in the darkness of each image strip corresponding to the respective row regions in the image printed by the printer 100 being corrected and unevenness in darkness in the entire image thus being suppressed.

Reference Example for Judging Whether Darkness of Foreign Matter has Been Read

Problem Regarding Foreign Matter Z on Test Pattern CP

Figure 26A:
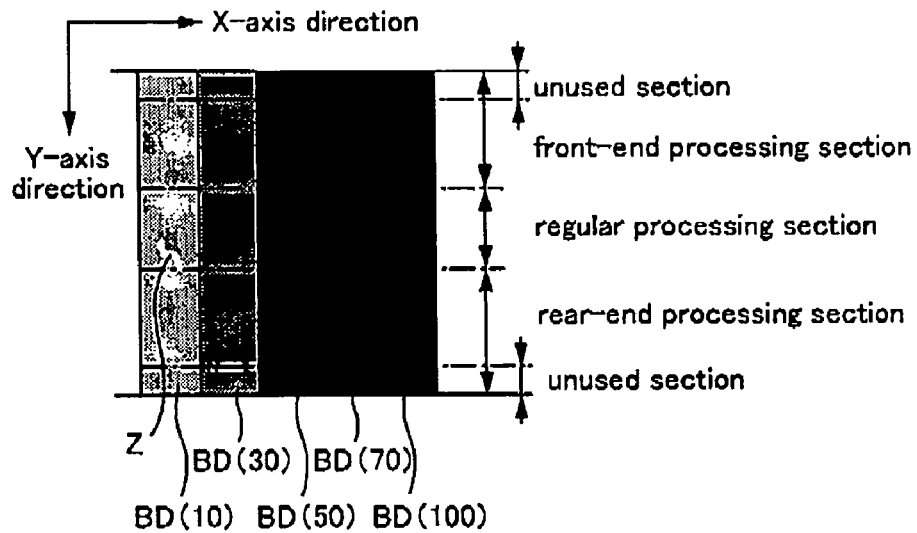
FIG. 26A is a diagram for describing a state in which a foreign matter is adhering to the correction pattern.

There are cases in which foreign matter Z, such as dust and dirt, adheres to the paper on which the test pattern CP (the correction patterns HP for the respective colors) is printed and/or the document platen glass 221 of the scanner 200. It the foreign matter Z adheres, for example, onto the regular processing section of the 10% darkness belt-like pattern BD as shown in FIG. 26A, the darkness of this foreign matter Z will also be read at the time of reading the darkness of the correction pattern HP with the scanner 200.

Figure 26B:
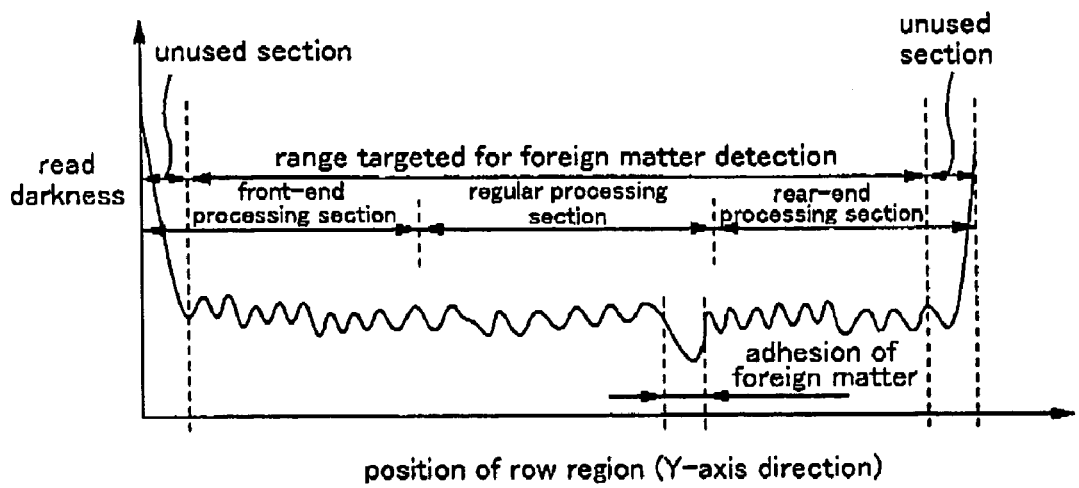
FIG. 26B is a diagram for describing the change in the readout darkness due to adhesion of the foreign matter.

FIG. 26B is a diagram for describing the change in the readout darkness due to adhesion of the foreign matter Z. In cases where the color of the foreign matter Z is different from the color of the belt-like pattern BD, a difference in the readout darkness arises between a row region to which the foreign matter Z is adhering and a row region without the foreign matter Z, as shown in the figure. In this example, the foreign matter Z is adhering to the regular processing section as shown in FIG. 26A, and accordingly, the value of the readout darkness of the row region to which the foreign matter Z is adhering is largely different from that of the other row regions as shown in FIG. 26B. This difference in the value of the readout darkness negatively affects the precision of the correction values for the respective row regions, and there is a possibility that the effect of suppression of the unevenness in darkness, which should be achieved by the darkness correction described above, cannot be attained.

In view of the above, judgment on whether or not darkness of a foreign matter Z has been read is performed in the process for obtaining the darkness of each row region from the correction patterns HP (the "process for obtaining darkness of each row region" of S245 in FIG. 16B) in the "process for obtaining correction values and storing those correction values (S200)" of FIG. 16A. If it is judged that the darkness of a foreign matter Z has been read, then a message to that effect is displayed through the display device 400 to prompt the worker to perform cleaning and the like.

Process for Obtaining Darkness of Each Row Region (S245)

As described above, each belt-like pattern BD includes a front-end processing section, a regular processing section, and a rear-end processing section. The range targeted for detecting the foreign matter Z is set to a section in the belt-like patterns BD excluding both ends in the Y-axis direction as shown in FIGS. 26A and 26B. Accordingly, a single belt-like pattern BD includes an unused section in the front-end processing section (referred to also as the front-end-side unused section), a front-end processing section, a regular processing section, a rear-end processing section, and an unused section in the rear-end processing section (referred to also as the rear-end-side unused section), and detection of the foreign matter Z is performed in the three processing sections except for the unused sections. The two unused sections and the three processing sections can be distinguished from one another using the row region numbers. Accordingly, in the "process for obtaining darkness of each row region (S245)", the host-side controller 310 determines the processing section to which a target row region belongs based on the row region number, to perform judgment on the foreign matter Z.

Figure 27:
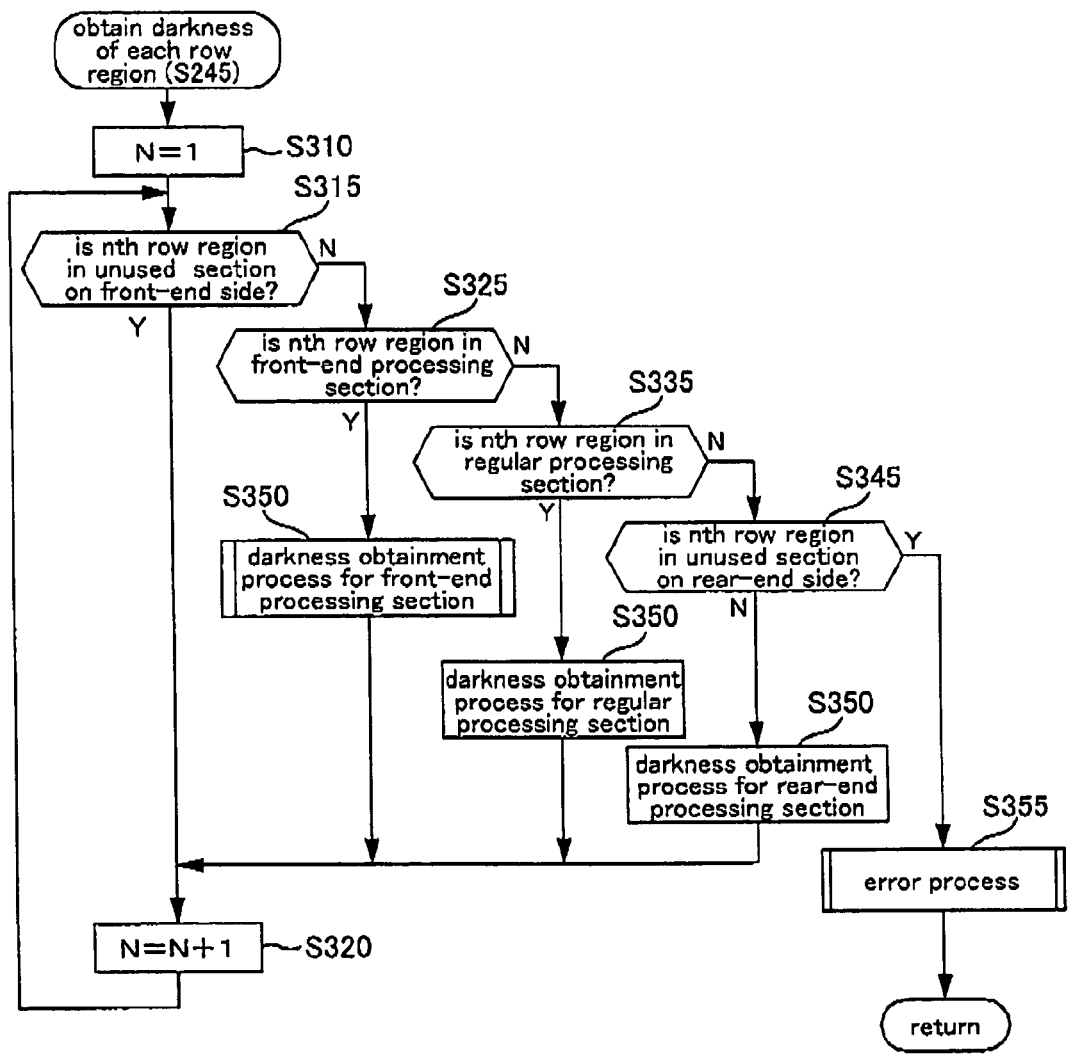
FIG. 27 is a flowchart describing a process for obtaining darkness of each row region (S245).

The process for obtaining darkness of each row region (S245) is described below. FIG. 27 is a flowchart describing the process for obtaining darkness of each row region (S245). In this process, the host-side controller 310 first sets N=1 as the count value indicating the row region number (S310) and determines whether the $N^{th}$ row region is in the front-end-side unused section (S315). This determination is made, for example, based on row region number information stored in the memory 312 of the host-side controller 310. More specifically, the determination is made based on information indicating the number of row regions in the front-end processing section, information indicating the number of row regions in the rear-end processing section, and information indicating the number of row regions in the unused sections.

If it is determined here that the $N^{th}$ row region is in the front-end-side unused section, then the host-side controller 310 increments the count value, which indicates the row region number, by one (S320) and returns to the process of step S315. Accordingly, while the target row regions belong to the front-end-side unused section, the process of step S315 and the process of step S320 are repeated alternately. Then, when it is determined that the $N^{th}$ row region is not in the front-end-side unused section, then the host-side controller 310 determines whether the $N^{th}$ row region is in the front-end processing section (S325). If it is determined here that the $N^{th}$ row region is in the front-end processing section, then the darkness obtainment process (S350) is performed on the $N^{th}$ row region. Note that the darkness obtainment process (S350) will be described in detail later on. From this point onward, similar processing is performed while changing the target row region. More specifically, it is determined whether or not the $N^{th}$ row region is in the regular processing section (S335), and if it is determined that the $N^{th}$ row region is in the regular processing section, then the darkness obtainment process (S350) is performed on the $N^{th}$ row region. Further, it is determined whether or not the $N^{th}$ row region is in the rear-end-side unused section (S345), and if it is determined that the $N^{th}$ row region is not in the rear-end-side unused section, then it is determined that the $N^{th}$ row region is in the rear-end processing section and the darkness obtainment process (S350) is performed on the $N^{th}$ row region. On the other hand, if it is determined that the $N^{th}$ row region is in the rear-end-side unused section, then an error process is performed for giving out a notification etc. to the worker (S355). This error process is a process for displaying an error message indicating "foreign matter: existing" through the display device 400 in cases where information indicating "foreign matter: existing" (described later) is stored in the memory 312. Note that it is needless to say that, if the information indicating "foreign matter: existing" is not stored, then the error message indicating "foreign matter: existing" is not displayed. When the error process is performed, the series of processes relating to the "process for obtaining darkness of each row region (S245)" are terminated, and the procedure returns to the "process for obtaining correction values and storing those correction values (S200)" of FIG. 16B.

Darkness Obtainment Process (S350)

As described above, in cases where the $N^{th}$ row region is in the front-end processing section except for the unused section, the regular processing section, or the rear-end processing section except for the unused section, the darkness obtainment process (S350) is performed for that row region.

Figure 28:
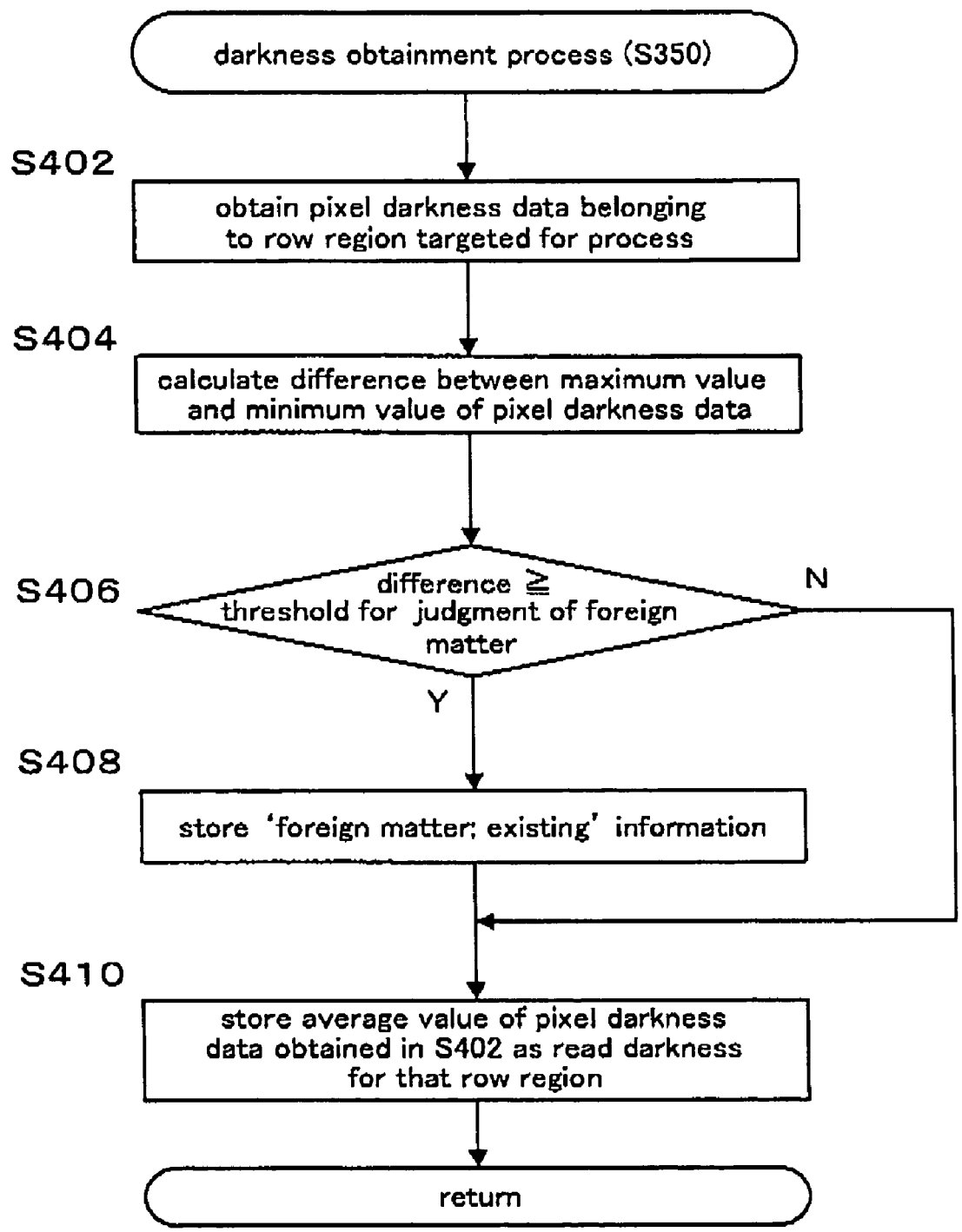
FIG. 28 is a flowchart of a darkness obtainment process (S350) performed for each row region.
Figures 29A, 29B:
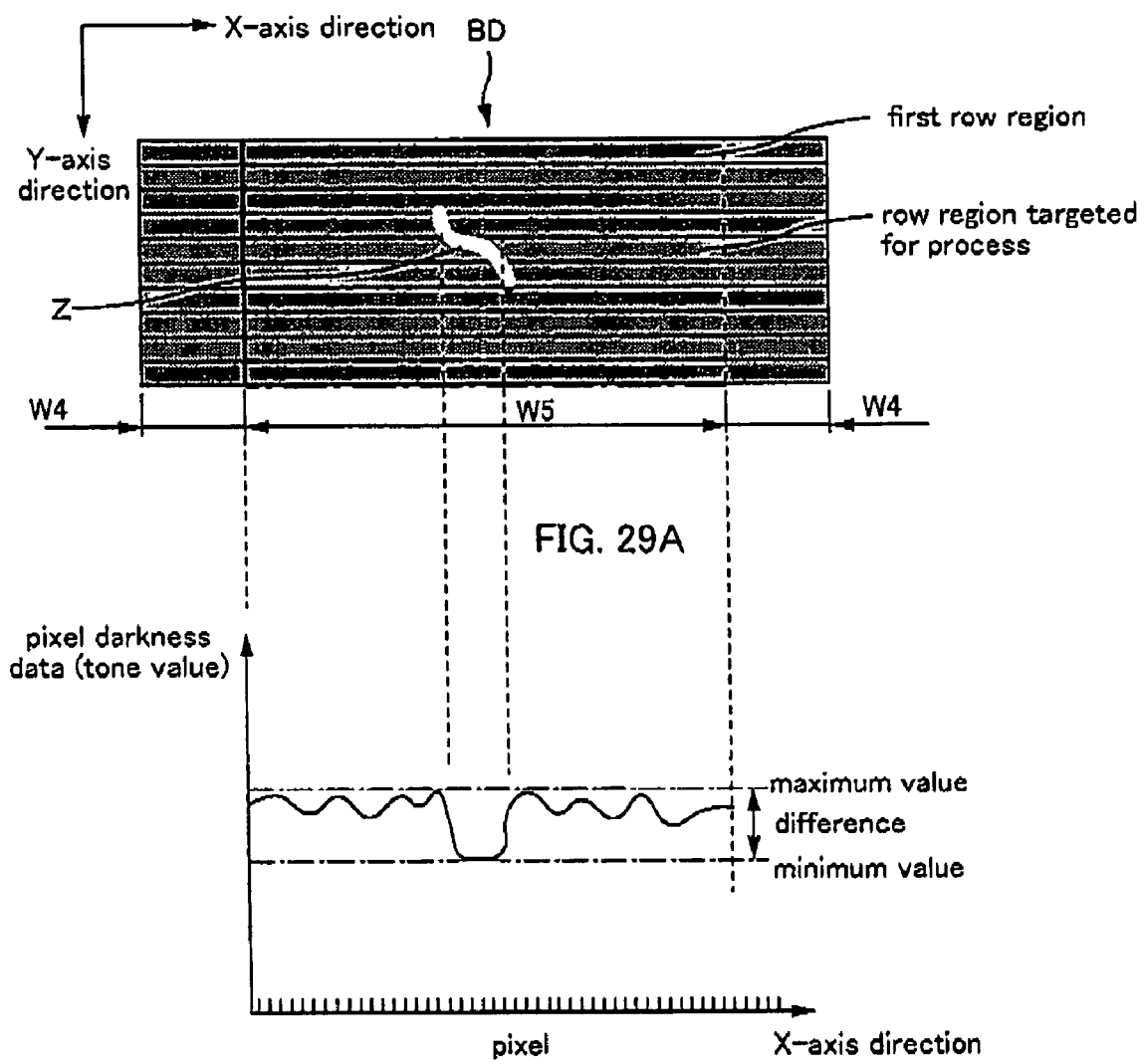
FIG. 29A is a diagram showing in magnification a section to which a foreign matter is adhering in a certain belt-like pattern.
FIG. 29B is a diagram for describing pixel darkness data (tone value) obtained for each pixel in a row region that is the target of the darkness obtainment process (S350).

FIG. 28 is a flowchart of the darkness obtainment process (S350) performed for each row region. FIG. 29A is a diagram showing in magnification the section to which the foreign matter Z is adhering in a certain belt-like pattern BD, and FIG. 29B is a diagram for describing the pixel darkness data (tone value) obtained for each pixel in a row region that is the target of the darkness obtainment process (S350). Note that the scales in the horizontal axis of FIG. 29B indicate the positions of the respective pixels lined up in the X-axis direction.

The darkness obtainment process (S350) is basically a process of obtaining the readout darkness of a certain row region (which corresponds to a "darkness representative value" of that row region) by averaging the multitude of pixel darkness data belonging to the row region targeted for processing and taking the average value as the readout darkness of that row region, as described above with reference to FIG. 21. Further, along with the obtainment of the readout darkness for the target row region, judgment on whether or not the darkness of a foreign matter Z is included in the readout darkness (i.e., "judgment on whether darkness of a foreign matter has been read") is performed.

More specifically, first, in step S402 of FIG. 28, the pieces of pixel darkness data belonging to the row region targeted for processing are obtained. Here, as shown in FIG. 29A, the pixel darkness data that belong to the range (the range of width W5) surrounded by the long-and-short dashed lines and excluding the ranges indicated by W4 from both ends in the X-axis direction of the target row region are obtained.

Then, as shown in FIG. 29B, the difference between the maximum value and the minimum value of the pieces of pixel darkness data that have been obtained is found (S404). If this difference is smaller than a predetermined threshold for judgment of foreign matter ("foreign-matter judgment threshold"), then it is judged that the darkness of a foreign matter Z has not been read in the pixel darkness data belonging to the target row region (S406) and step S408 is skipped, and the procedure advances to step S410. In step S410, all pieces of the pixel darkness data obtained in step S402 are averaged and the average value is stored in the data table (see FIG. 3) in the memory 312 of the host-side controller 310 as the readout darkness (corresponding to the darkness representative value) for that row region.

On the other hand, if, at step 5406, the difference is equal to or larger than the foreign-matter judgment threshold, then it is judged that the darkness of a foreign matter Z has also been read in the measurement values of the target row region (S406), and information indicating "foreign matter: existing" is recorded in the memory 312 of the host-side controller 310 (S408).

When the procedure advances to step S410, all pieces of the pixel darkness data obtained in step S402 are averaged and the average value is stored in the data table in the memory 312 of the host-side controller 310 as the readout darkness for that row region, as described above.

Then, when step S410 is over, the procedure returns to the "process for obtaining darkness of each row region" in FIG. 27; that is, step S350 in FIG. 27 is terminated and the procedure advances to the next step 5320.

Problem Residing in Reference Example for Judging Whether Darkness of Foreign Matter has Been Read In the above-mentioned reference example for judging whether the darkness of a foreign matter has been read, the judgment on whether or not the darkness of a foreign matter Z has been read is made based merely on the difference between the maximum value and the minimum value of the pixel darkness data belonging to the target row region and within the range of width W5. However, judgment based merely on such a difference may result in a situation where the presence of excessively small dirt having hardly any negative influence on the precision of the above-mentioned correction values is judged that "the darkness of a foreign matter Z has been read".

Figures 30A, 30B:
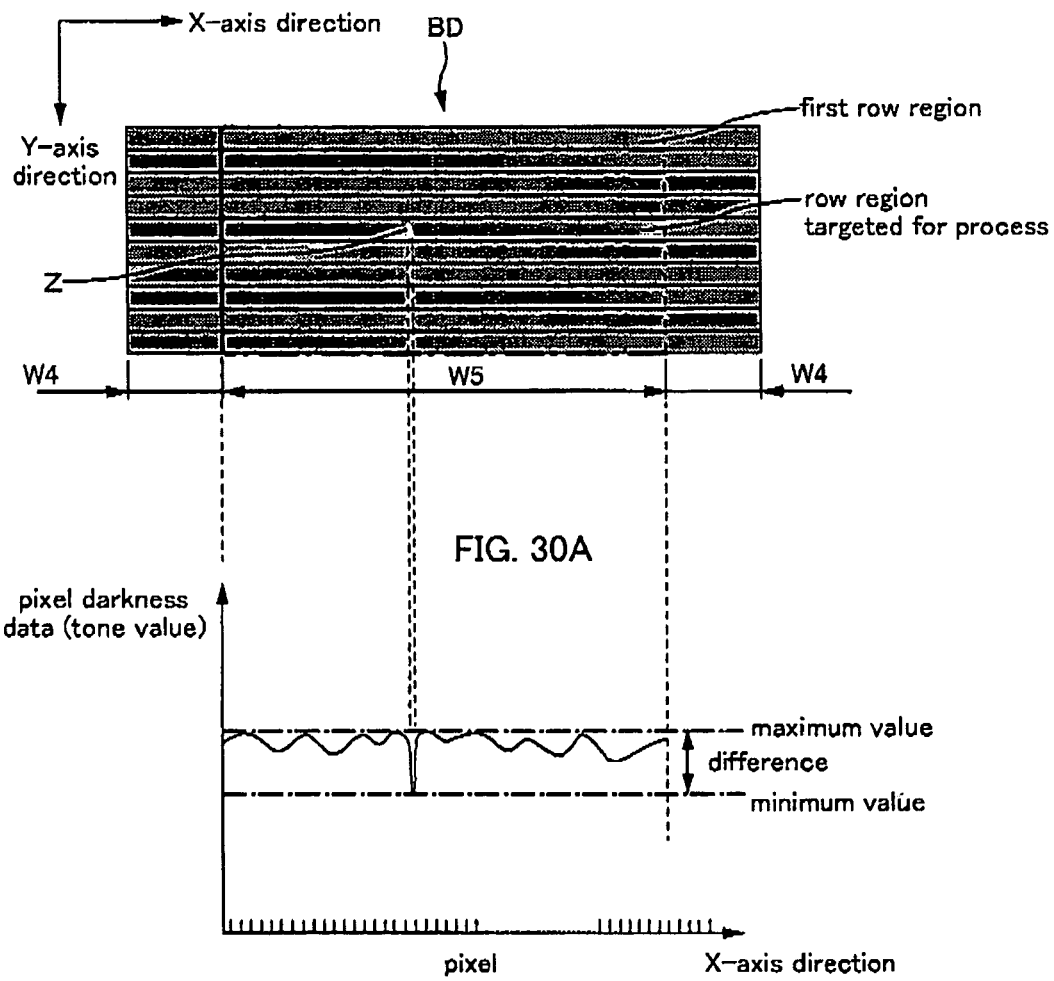
FIGS. 30A and 30B are explanatory diagrams showing a state in which a piece of dirt having an extremely small planar dimension is attached, and are depicted using the same format as that of FIGS. 29A and 29B.

In other words, as shown in FIGS. 30A and 30B, the presence of dirt whose planar dimension is extremely small, that is, the presence of dirt of a size small enough as not to cause any substantial problem when averaging the pixel darkness data to obtain the readout darkness, may be judged that "the darkness of a foreign matter Z has been read", and as a result thereof, a worker carrying out the correction value setting process may be forced to carry out cleaning and other unnecessary removal tasks even in the case of extremely small dirt. Therefore, the above-mentioned reference example has a drawback in terms of judgment accuracy.

In view of the above, in the method for judging whether the darkness of a foreign matter has been read according to the present embodiment described below, judgment on whether or not the darkness of a foreign matter Z has been read is made based not only on the difference related to the pixel darkness data, but also by taking into consideration the size of the foreign matter Z on the test pattern CP that has been detected based on the difference. As a result thereof, a situation in which the presence of an extremely small foreign matter Z whose planar dimension is small enough as not to cause any substantial problem is excessively judged that "the darkness of a foreign matter Z has been read" is prevented from arising.

Figure 31:
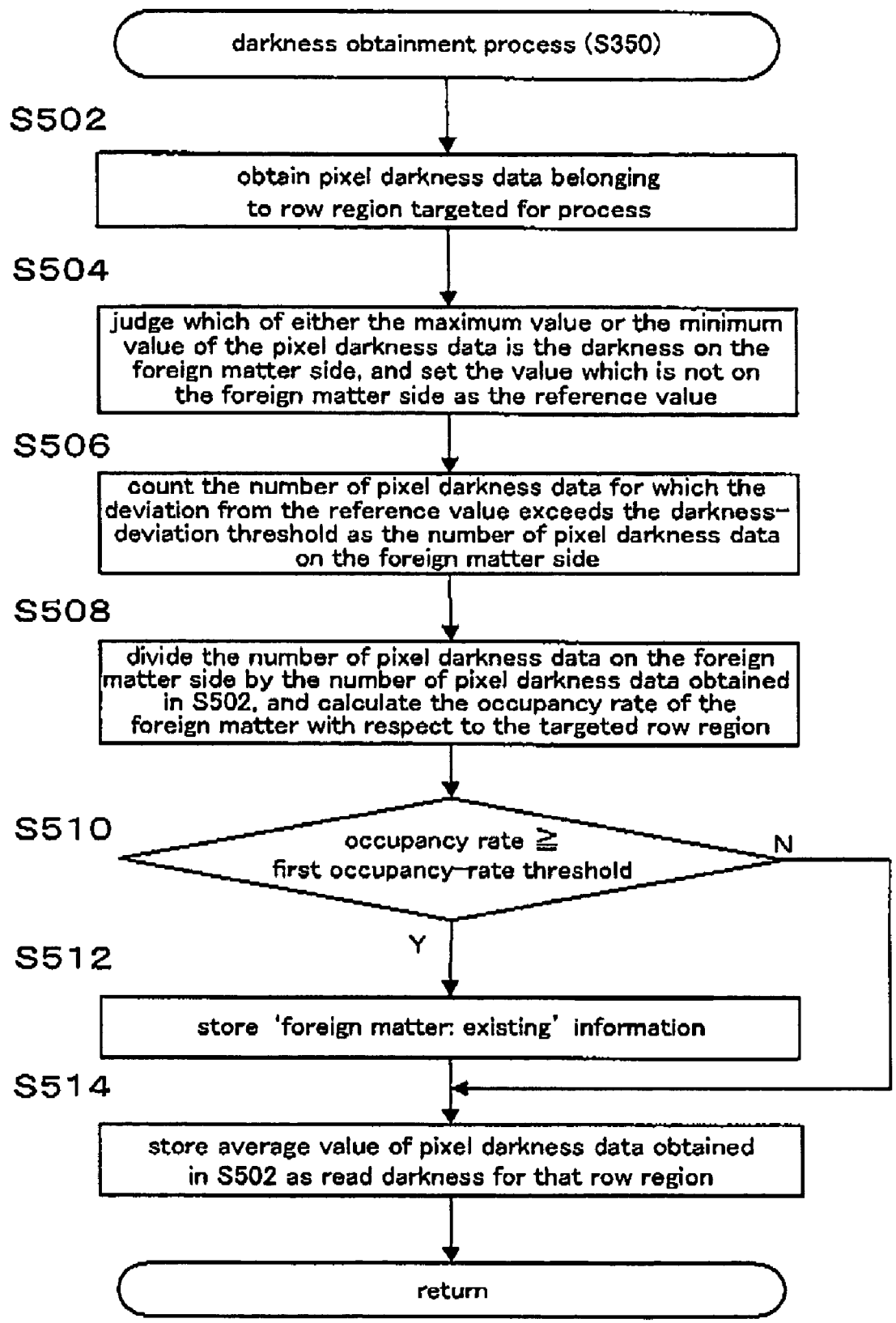
FIG. 31 is an explanatory diagram describing judgment on whether the darkness of a foreign matter has been read according to the present embodiment, and is a flowchart of the darkness obtainment process of step S350.

Judgment on Whether Darkness of Foreign Matter has Been Read According to Present Embodiment FIG. 31 is an explanatory diagram describing judgment on whether the darkness of a foreign matter has been read according to the present embodiment, and is a flowchart of the darkness obtainment process of step S350. Note that since the judgment on whether the darkness of a foreign matter has been read is performed as a part of the darkness obtainment process (S350) as in the above-mentioned reference example, the process is described using the flowchart of the darkness obtainment process (S350).

Further, FIGS. 32A to 32C and FIGS. 33A to 33C are explanatory diagrams describing the judgment on whether the darkness of a foreign matter has been read, and are depicted using the same format as that of FIGS. 29A and 29B described above.

Figure 32A:
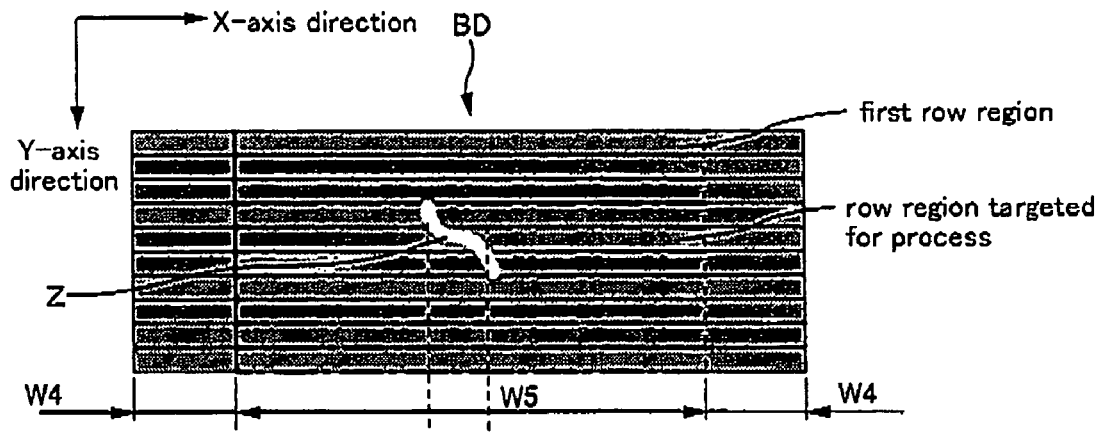
FIGS. 32A to 32C are explanatory diagrams describing the judgment on whether the darkness of a foreign matter has been read.

First, in step S502 of FIG. 31, the pieces of pixel darkness data belonging to the row region targeted for processing are obtained. More specifically, as in the above-mentioned reference example, the pixel darkness data that belong to the range (the range of width W5) surrounded by the long-and-short dashed lines and excluding the ranges indicated by W4 from both ends in the X-axis direction of the target row region are obtained, as shown in FIG. 32A.

Next, in step S504, it is judged which of either the maximum value or the minimum value of the obtained pixel darkness data is the darkness on the foreign-matter side, and the value which is not on the foreign-matter side is set as a reference value.

Figure 32B:
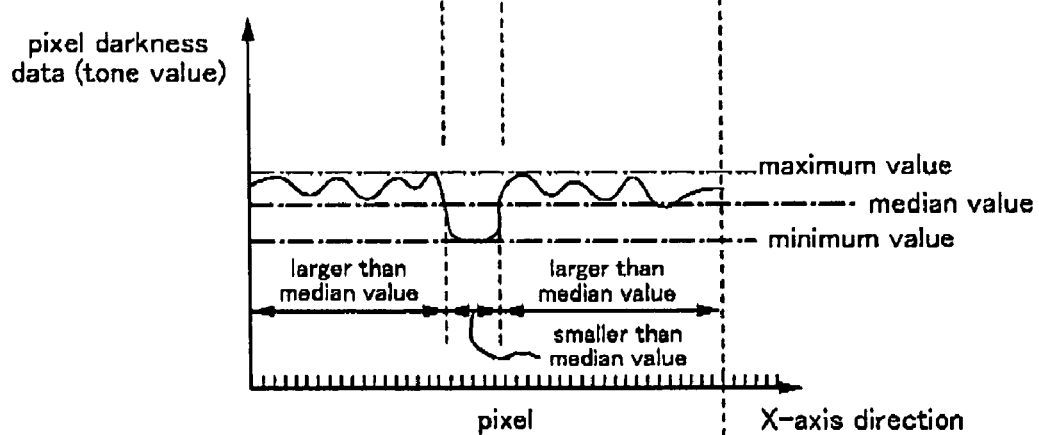
Figure 32C:
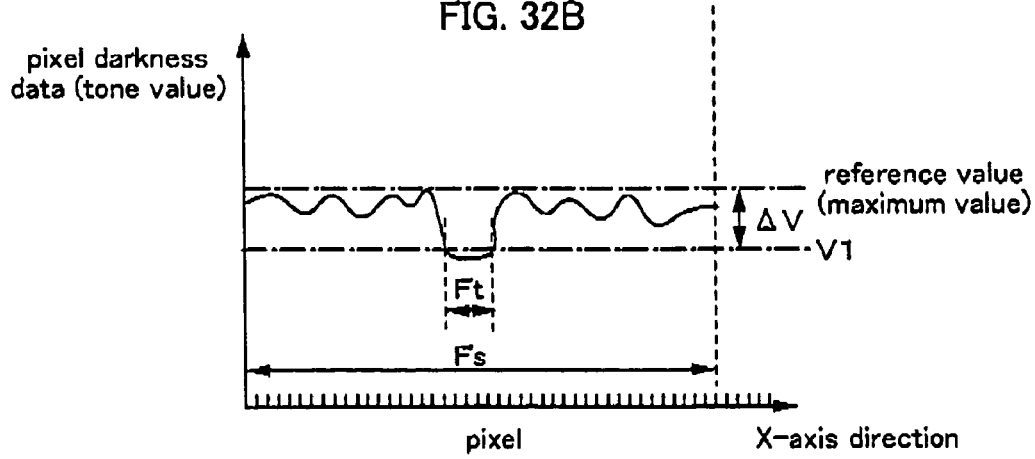
Figure 33A:
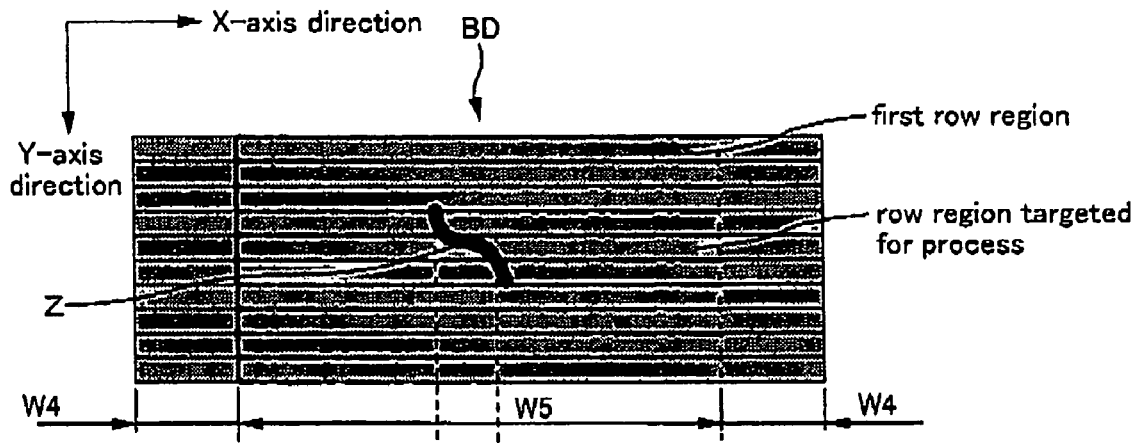
FIGS. 33A to 33C are explanatory diagrams describing the judgment on whether the darkness of a foreign matter has been read.
Figure 33B:
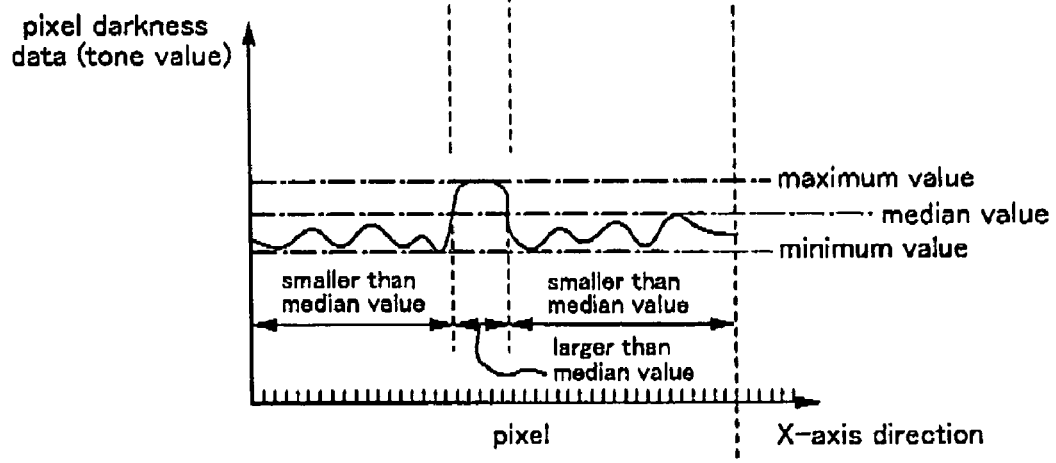
Figure 33C:
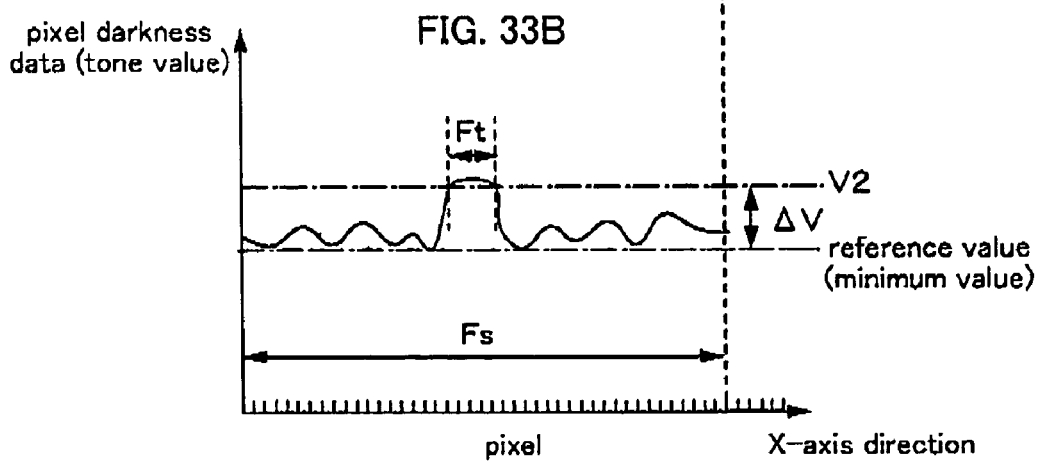

The judgment regarding which of either the maximum value or the minimum value is the darkness on the foreign-matter side is performed, for example, as follows. First, as shown in FIG. 32B, the arithmetic mean of the maximum value and the minimum value of the obtained pixel darkness data is calculated to obtain the median value of the pixel darkness data, and then, taking this median value as a border, the number of pieces of pixel darkness data larger than the median value and the number of pieces of pixel darkness data smaller than the median value are counted and obtained respectively. Then, as shown in FIG. 32B, if the number of the former (i.e., the number of pieces of pixel darkness data larger than the median value) is larger than the number of the latter (i.e., the number of pieces of pixel darkness data smaller than the median value), then it is judged that the minimum value of the pixel darkness data is the darkness on the foreign-matter side, and in that case, the maximum value of the pixel darkness data becomes the reference value as shown in FIG. 32C. On the contrary, as shown in FIG. 33B, if the number of the latter (i.e., the number of pieces of pixel darkness data smaller than the median value) is larger, then it is judged that the maximum value of the pixel darkness data is the darkness on the foreign-matter side, and in that case, the minimum value of the pixel darkness data becomes the reference value as shown in FIG. 33C.

Next, in step S506, the number of pieces of pixel darkness data for which the deviation from the reference value exceeds a predetermined threshold $\Delta V$ adopted for the darkness deviation ("darkness-deviation threshold $\Delta V$") is counted from among the pieces of pixel darkness data obtained in step S502, and this number is regarded as the number of pieces of pixel darkness data in which there is possibility that the darkness of the foreign matter z has been read.

For example, in a case where the maximum value of the pixel darkness data is taken as the reference value as shown in FIG. 32C, a value V1 is obtained by subtracting the darkness-deviation threshold $\Delta V$ from the maximum value, and the number Ft of pieces of pixel darkness data that are smaller than the value V1 is counted and obtained. On the contrary, in a case where the minimum value of the pixel darkness data is taken as the reference value as shown in FIG. 33C, a value V2 is obtained by adding the darkness-deviation threshold LV to the minimum value, and the number Ft of pieces of pixel darkness data that are larger than the value V2 is counted and obtained.

When the number Ft of pieces of pixel darkness data in which there is possibility that the darkness of the foreign matter Z has been read has been obtained in this way, the number Ft is divided by the total number Fs of pieces of pixel darkness data obtained in step S502, to obtain an occupancy rate R of the foreign matter Z in the target row region (which is something like a ratio indicating the area of the foreign matter Z that occupies the area of the row region: R=Ft/Fs) (S508).

The procedure then advances to step S510, and using this occupancy rate R, judgment is made as to whether or not the darkness of the foreign matter Z has been read.

This judgment is made based on a predetermined first threshold Rth1 adopted for the occupancy rate ("first occupancy-rate threshold Rth1"). More specifically, if the occupancy rate R is smaller than the first occupancy-rate threshold Rth1, then it is judged that the darkness of the foreign matter Z has not been read. In this case, step S512 is skipped and the procedure advances to step S514, and in step S514, all pieces of the pixel darkness data obtained in step S502 are averaged and the average value is stored in the data table (see FIG. 3) in the memory 312 as the readout darkness (corresponding to the darkness representative value) for that row region. Then, when step S514 is over, the procedure returns to the "process for obtaining darkness of each row region (S245)" in FIG. 27.

On the other hand, if the occupancy rate R is equal to or larger than the first occupancy-rate threshold Rth1 in step S510, then it is judged that the darkness of the foreign matter Z has been read and information indicating "foreign matter: existing" is stored in the memory 312 (S512). Then, when the procedure advances to step S514, all pieces of the pixel darkness data obtained in step S502 are averaged and the average value is stored in the data table in the memory 312 of the host-side controller 310 as the readout darkness for that row region, as described above. Then, the procedure returns to the "process for obtaining darkness of each row region (S245)" in FIG. 27.

Note that the first occupancy-rate threshold Rth1 and the darkness-deviation threshold ΔV are stored in advance in the memory 312 of the host-side controller 310; this is described later on.

Darkness-Deviation Threshold ΔV

FIGS. 34A and 34B show reference tables that are referred to for finding the darkness-deviation threshold ΔV. As shown in FIGS. 34A and 34B, the reference tables are provided separately for each type of color material contained in the ink; FIG. 34A shows the reference table for dye ink, and FIG. 34B shows the reference table for pigment ink. In each reference table, an appropriate darkness-deviation threshold ΔV is determined for each ink color, each level of darkness of the belt-like pattern BD, and each processing section, thereby enabling judgment to be performed under conditions appropriate for each type of color material of ink, each ink color, each level of darkness of the belt-like pattern BD, and each processing section.

The respective darkness-deviation thresholds ΔV are determined in advance according to the determination method described below.

First, the basic concept of this determination method is described. Usually, if the darkness of a foreign matter Z is read at the time of reading the darkness of a test pattern CP, the correction value will deviate from the true value that it should take. If darkness correction process is performed based on such a correction value, not only will it be impossible to eliminate unevenness in darkness, but the unevenness in darkness may become worse. In the meantime, the darkness-deviation threshold LV is a threshold related to the darkness for detecting the foreign matter Z from the test pattern CP.

From this viewpoint, the most preferable method for determining the darkness-deviation threshold ΔV would be to gradually change, in stages, the darkness of the foreign matter Z such that it deviates from the darkness of the test pattern CP, obtain respective correction values for each stage, observe the unevenness in darkness that appears in each test pattern CP which is printed through performing the darkness correction process based on the respective correction values, and determine the darkness-deviation threshold ΔV based on the level of darkness of the foreign matter Z at the stage where the unevenness in darkness becomes visually confirmable. The process flow of this method is similar to the steps regarding the above-mentioned correction value setting process (see FIGS. 16A and 16B).

Accordingly, the darkness-deviation threshold ΔV is determined according to the flowcharts of FIGS. 35A and 35B which employ the correction value setting process, as described below. Note that, in the flowcharts of FIGS. 35A and 35B, the steps surrounded by the dotted lines are the steps different from the correction value setting process of FIGS. 16A and 16B, and the sections other than that are basically the same as the flowchart for the correction value setting process. Below, the method for determining the darkness-deviation threshold ΔV is described in detail with reference to FIGS. 35A and 35B.

First, a printer 100 having high-precision nozzles that are capable of printing a test pattern CP with uniform darkness and with almost no unevenness in darkness is provided. Then, as with the above-mentioned correction value setting process, the printer 100 is made to print a test pattern CP based on print data of the test pattern CP (S100), the scanner 200 is made to read the printed test pattern CP to obtain image data thereof (S210, S215), and the processes of steps S220 and S225 are performed on the image data.

Next, an imitation foreign matter Zs is written into the image data and image data including the imitation foreign matter is generated (S227). The imitation foreign matter Zs is written in using image editing applications such as Photoshop (trademark; product of Adobe Systems Inc.).

Figure 36:
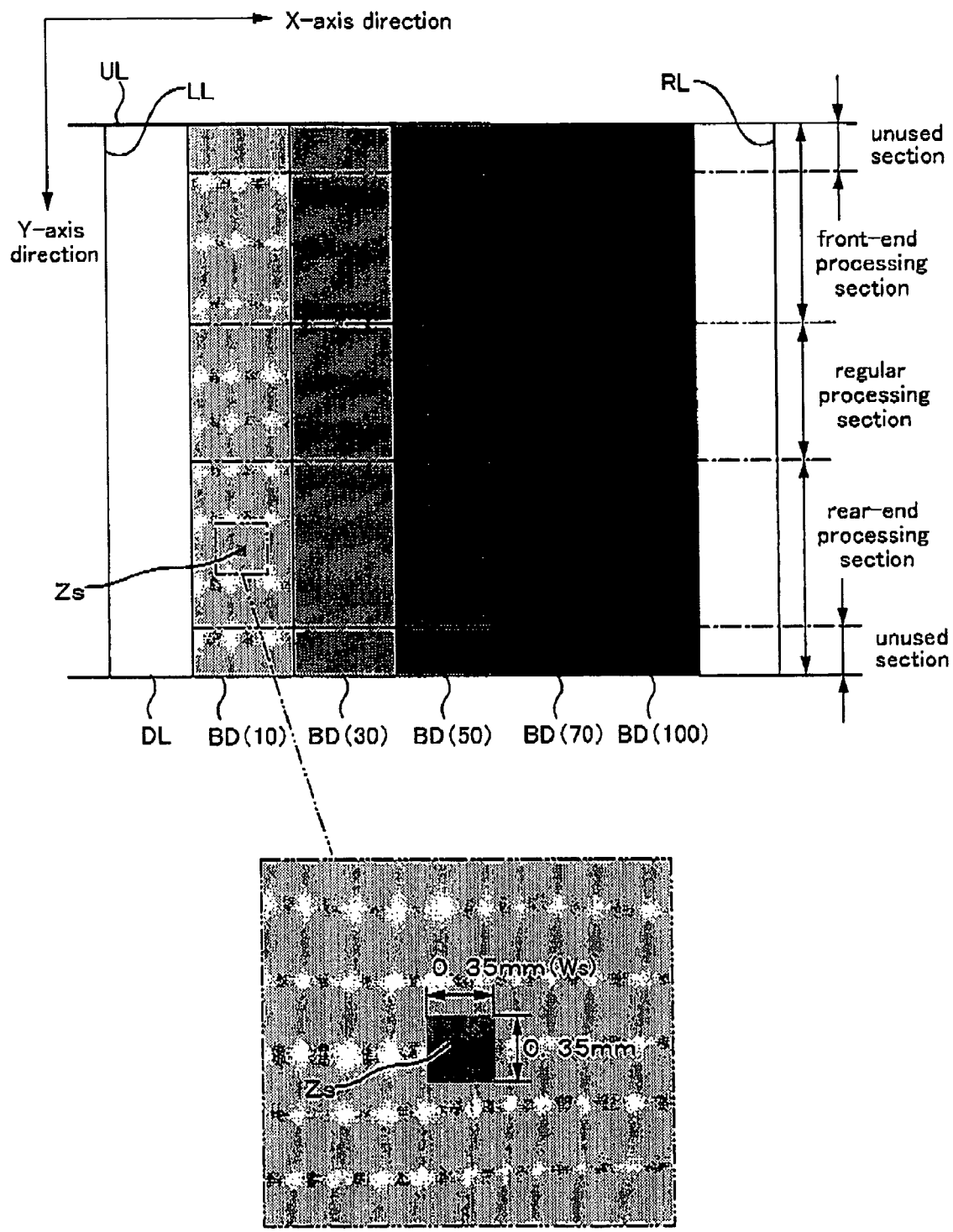
FIG. 36 is a diagram showing an image of image data in which an imitation foreign matter has been written.

FIG. 36 is a diagram showing an image of the image data of a correction pattern HP in which the imitation foreign matter Zs has been written. This figure shows how a piece of imitation foreign matter Zs is written in only the rear-end processing section of the 10% darkness belt-like pattern BD of the cyan-ink correction pattern HP; actually, however, the imitation foreign matter Zs is similarly written also in the other regions for which the darkness-deviation thresholds ΔV are to be determined.

The imitation foreign matter Zs is written such that it becomes a square shape whose sides are, for example, 0.35 mm on the printed test pattern CP. The size of the imitation foreign matter Zs is determined in advance by, for example, making a sample survey of an average size of a foreign matter Zs that is assumed to adhere to the pattern.

Then steps S230 to S255 are performed with respect to the image data including the imitation foreign matter, to obtain the correction values for the respective row regions. Note that the steps S230 to S255 are the same as those in the above-mentioned correction value setting process of FIG. 16B.

Next, while performing the darkness correction process using these correction values, the printer 100 is made to print a test pattern CP based on the print data of the test pattern CP (S600). Note that the print data used here is the print data used for printing the test pattern CP in step S100.

Then, the worker visually evaluates the state of unevenness in darkness appearing in the printed test pattern CP (S700).

The above-mentioned processes from step S100 to step S700 are repeated while gradually increasing, in stages, the level of darkness of the imitation foreign matter Zs. Then, at the level of darkness at which unevenness in darkness becomes visually confirmable, the difference between the darkness of the imitation foreign matter Zs and the darkness of the belt-like pattern BD is obtained in grayscale, and this difference is employed as the darkness-deviation threshold ΔV for the rear-end processing section of the 10% darkness belt-like pattern BD of the cyan-ink correction pattern HP.

Note that, although only the darkness-deviation threshold ΔV for the rear-end processing section of the 10% darkness belt-like pattern BD of the cyan-ink correction pattern HP is described in the above section, the other darkness-deviation thresholds ΔV are obtained in the same way.

On the other hand, the first occupancy-rate threshold Rth1 is a threshold adopted for the occupancy rate of the foreign matter Z with respect to the row region, and from this viewpoint, the first occupancy-rate threshold Rth1 is determined based on the size of the above-mentioned imitation foreign matter Zs. More specifically, when the width in the X-axis direction of the imitation foreign matter Zs shown in FIG. 36 is Ws and the width of the range excluding the ranges indicated by W4 from both ends in the X-axis direction of the row region shown in FIG. 32A is W5, the first occupancy-rate threshold Rth1 can be obtained by dividing Ws by W5 (Rth1=Ws/W5).

Figures 35A, 35B:
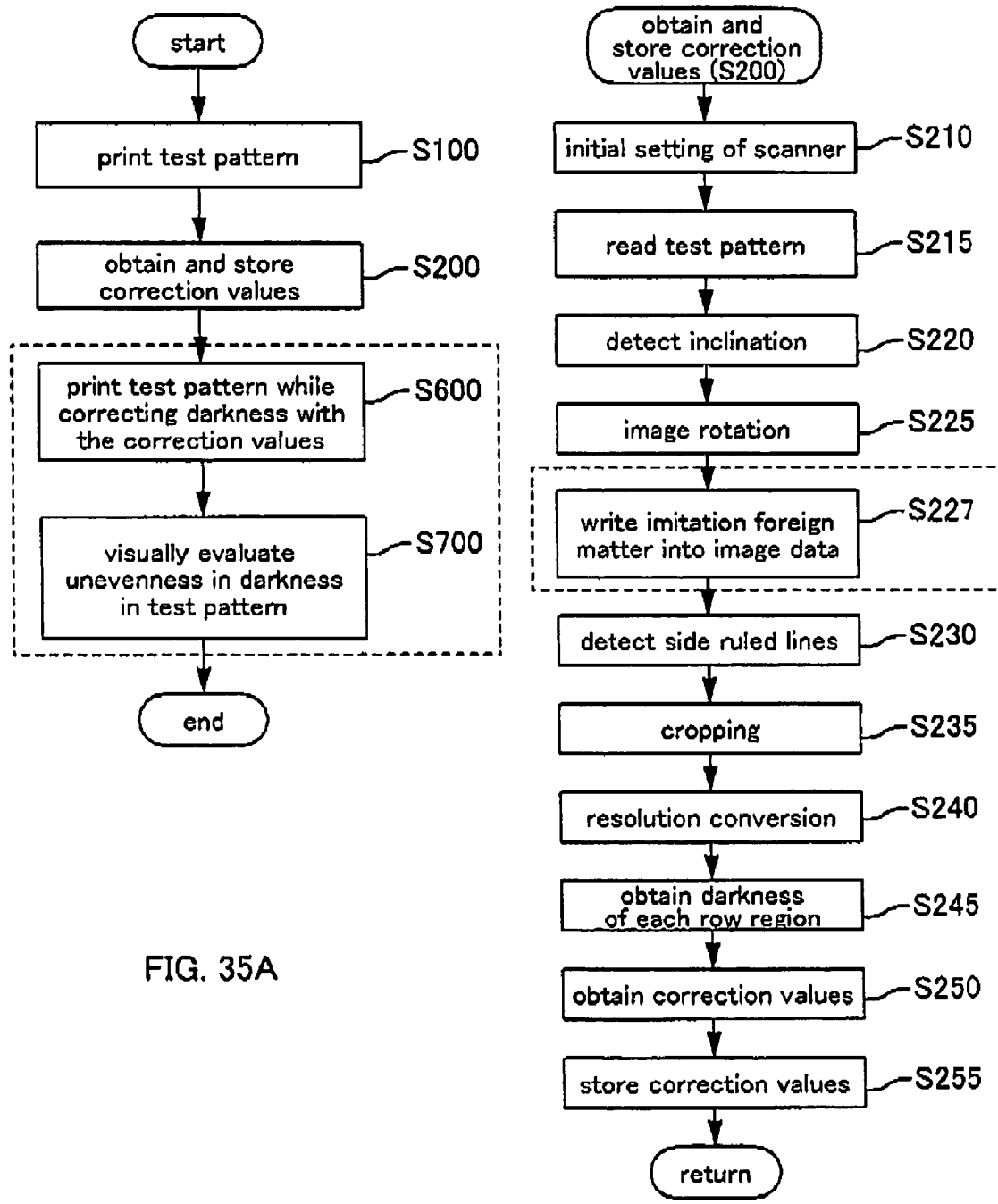
FIGS. 35A and 35B are flowcharts on a method for determining the darkness-deviation threshold.

Note that the processes in the flowchart of the method for determining the darkness-deviation threshold ΔV described above are executed using the above-mentioned correction value setting program; however, it is of course possible to provide a program dedicated for the flowcharts of FIGS. 35A and 35B and make that program execute the processes.

Modified Example of Judgment on Whether Darkness of Foreign Matter has been Read In the embodiment described above, when the occupancy rate R is equal to or larger than the first occupancy-rate threshold Rth1 in step S510, then information indicating "foreign matter: existing" is stored in the memory 312 and the worker is notified of an error message indicating "foreign matter: existing", as shown in FIG. 31.

However, if the occupancy rate R is rather small even when the occupancy rate R is equal to or larger than the first occupancy-rate threshold Rth1, then it is conceivable that the readout darkness can be obtained by excluding the pixel darkness data corresponding to the foreign matter Z and finding the average value of the pixel darkness data after exclusion. In other words, in cases where it is possible to secure a sufficient population parameter (population) of the pixel darkness data for finding the average value (=Fs–Ft (see, for example, FIG. 31C)), then it would be possible to obtain a readout darkness that is highly reliable, even when using such an average value. In such cases, it is conceivable that it is not necessary to notify the worker of an error message indicating "foreign matter: existing".

Therefore, in the present modified example, in addition to the first occupancy-rate threshold Rth1, a second threshold Rth2 adopted for the occupancy rate ("second occupancy-rate threshold Rth2") which is larger than the first threshold Rth1 is also stored in the memory 312. Even when the occupancy rate R is equal to or larger than the first occupancy-rate threshold Rth1, if the rate R is smaller than the second occupancy-rate threshold Rth2, then the information indicating "foreign matter existing" is not stored in the memory 312 in that case, because it is conceivable that a highly-reliable readout darkness can be obtained by excluding the pixel darkness data corresponding to the foreign matter Z and finding the average value of the pixel darkness data after exclusion. In this way, a further reduction in the worker's work load can be achieved.

Figure 37:
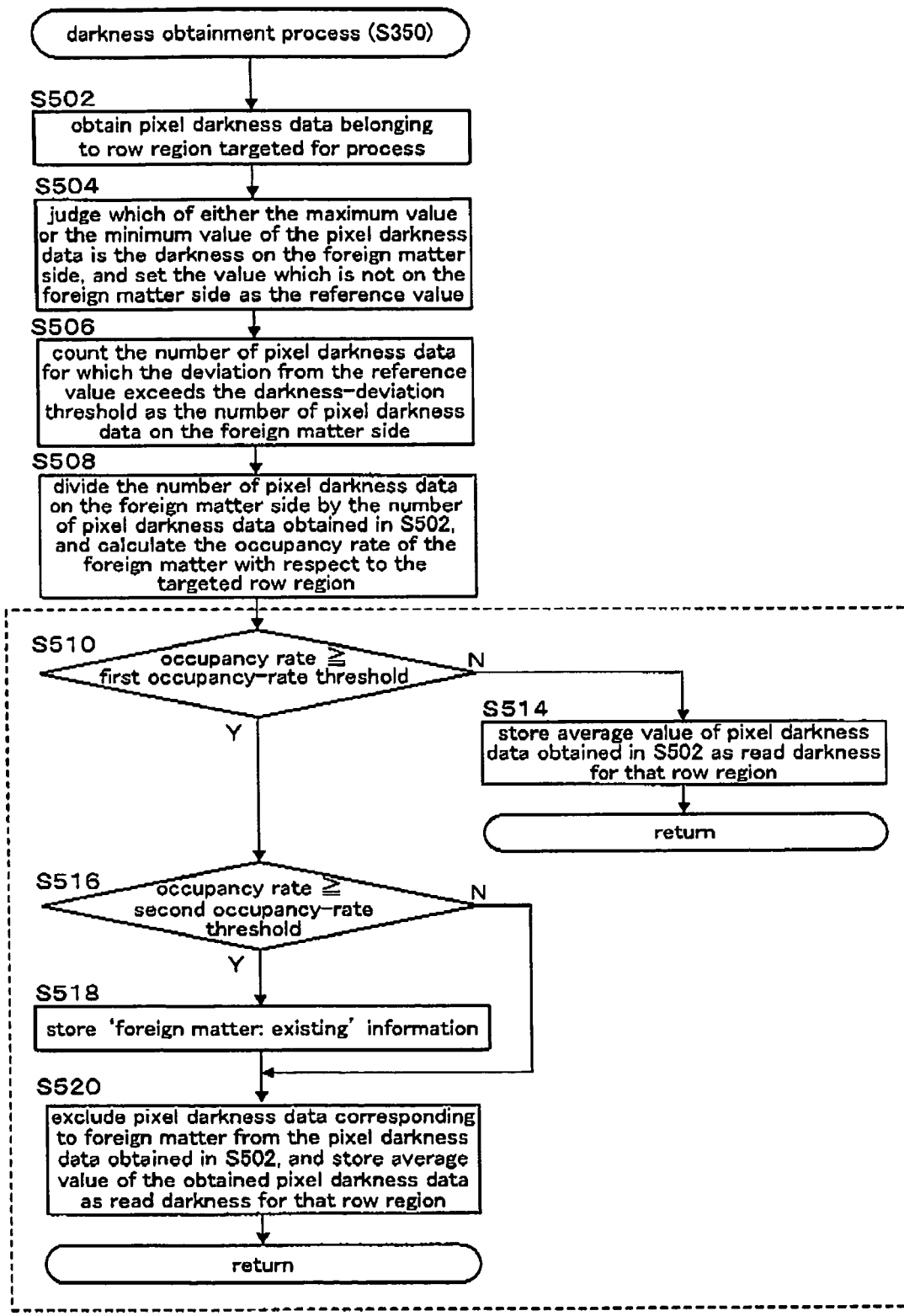
FIG. 37 is an explanatory diagram of a modified example of how to judge whether the darkness of a foreign matter has been read, and is a flowchart of the darkness obtainment process of step S350.

FIG. 37 is an explanatory diagram of the present modified example, and is a flowchart of the darkness obtainment process of step S350. Note that the main difference from the flowchart of the darkness obtainment process (S350) of the above-described embodiment (FIG. 31) is in step S510 and the steps thereafter (refer to the range shown surrounded by the dotted lines) as shown in FIG. 37. Therefore, the description below mainly focuses on steps S510 to S520.

First, in step S510, the occupancy rate R is compared with the first occupancy-rate threshold Rth1, as described above. If the occupancy rate R is smaller than the first occupancy-rate threshold Rth1, then it is judged that the darkness of a foreign matter Z has not been read and the procedure advances to step S514. Then, in step S514, all pieces of the pixel darkness data obtained in step S502 are averaged, the average value is stored in the data table (see FIG. 3) in the memory 312 as the readout darkness for that row region, and the procedure returns to the "process for obtaining darkness of each row region (S245)" in FIG. 27.

On the other hand, if, in step S510, the occupancy rate R is equal to or larger than the first occupancy-rate threshold Rth1, then the procedure advances to step S516. In step S516, the occupancy rate R is compared with the second occupancy-rate threshold Rth2 which is larger than the first occupancy-rate threshold Rth1. If the occupancy rate is smaller than the second occupancy-rate threshold, then step S518 is skipped and the procedure advances to step S520. In step S520, the average value of the pixel darkness data obtained after excluding the pixel darkness data corresponding to the foreign matter Z is stored in the data table in the memory 312 as the readout darkness of the target row region. Note that the "pixel darkness data corresponding to the foreign matter Z" are the pixel darkness data that constitute the number Ft described above (see FIGS. 32C and 33C).

On the other hand, if, in step S516, the occupancy rate R is equal to or larger than the second occupancy-rate threshold Rth2, then it is judged that the population parameter (population) of the pixel darkness data is no longer sufficient for finding a reliable readout darkness, and the information indicating "foreign matter: existing" is stored in the memory 312 (S518). Then, on advancing to step 5520, the average value of the pixel darkness data obtained after excluding the pixel darkness data corresponding to the foreign matter Z is stored in the data table in the memory 312 as the readout darkness of the target row region, as described above. Then, when step S520 is over, the procedure returns to the "process for obtaining darkness of each row region (S245)" in FIG. 27.

Other Embodiments

A correction value setting system 1000 including a printer 100 is mainly described in the foregoing embodiments, but the description includes disclosure on correction value obtaining methods, correction value setting methods, and the like. Further, the above-mentioned embodiments are provided for facilitating the understanding of the invention, and are not to be interpreted as limiting the invention. As a matter of course, the invention can be altered and improved without departing from the gist thereof and the invention includes equivalents thereof. In particular, the invention also includes the following embodiments.

Printing Method

The interlaced method is exemplified as the printing method in the foregoing embodiments, but the invention is not limited thereto. For example, the overlap method can instead be employed. The "overlap method" is a printing method in which a single raster line is formed using a plurality of different nozzles Nz.

Printing System

The foregoing embodiments describe a printing system in which a printer 100, which serves as a printing apparatus, and a computer 300, which serves as a print-control apparatus, are structured separately; the invention, however, is not limited thereto. The printing system may be an apparatus in which the printing apparatus and the print-control apparatus are made into a single unit. Further, the system may be a printer-and-scanner multifunction apparatus in which the printer 100 and the scanner 200 are made into a single unit. With such a multifunction apparatus, it would be easy to re-set the correction values under instructions by the user. In other words, a correction value setting system can be constructed easily.

Ink

The foregoing embodiments relate to embodiments of a printer 100; therefore, dye ink or pigment ink is ejected from the nozzles Nz. Ink to be ejected from the nozzles Nz, however, is not limited to such types of ink.

Other Application Examples

Although a printer 100 is described in the foregoing embodiments, the invention is not limited thereto. For example, the same technology as that mentioned in the foregoing embodiments can apply to a variety of recording apparatuses utilizing inkjet technology; color filter manufacturing equipment, dyeing equipment, micromachining equipment, semiconductor manufacturing equipment, surface treatment equipment, three-dimensional molding machine, vaporizer, organic EL manufacturing equipment (especially, polymer EL manufacturing equipment), display manufacturing equipment, film formation equipment, and DNA chip manufacturing equipment. In addition, methods used therein and manufacturing methods thereof are also included in applications to which the technology as mentioned in the foregoing embodiments can apply.

What is claimed is:

1. A method of judging whether or not darkness of a foreign matter on a test pattern printed on a medium with predetermined darkness has been read, the method comprising:
    reading the darkness of the test pattern using a reading section;
    detecting a section in the test pattern for which an amount of deviation, from a predetermined reference value, of a readout value on the darkness of that section exceeds a predetermined darkness-deviation threshold which is a threshold adopted for the deviation in darkness; and
    judging whether or not the darkness of the foreign matter has been read based on a size of said section that has been detected,
    wherein the test pattern is divided up into row regions, each of the row regions being made up of a plurality of the unit regions that are arranged adjacent to one another in the movement direction of a nozzle, and the detection of said section is performed row-region-by-row-region,
    wherein the size of said section is obtained as an occupancy rate indicating a ratio of the size of said section with respect to a size of a row region that is targeted for the detection, and if the obtained occupancy rate is equal to or larger then a predetermined first occupancy-rate threshold which is a threshold adopted for the occupancy rate, then a judgment is made that the darkness of the foreign matter has been read,
    wherein when a total number of unit regions for which the readout values have been obtained in the row region that is targeted for the detection is defined as Fs, a number of the unit region in the targeted row region for which the amount of deviation, from the reference value, of the readout value of that unit region exceeds the darkness-deviation threshold is defined as Ft, and the occupancy rate is defined as R, the occupancy rate R is calculated according to the following equation:

$R=Ft/Fs.$

2. A method of judging whether or not darkness of a foreign matter has been read according to claim 1, wherein:
    the test pattern is printed by repeating an ink ejection operation in which ink is ejected from the nozzle while the nozzle is being moved in a movement direction, and a carry operation in which the medium is carried in a carrying direction that intersects with the movement direction; and
    readout values on the darkness of the test pattern are generated respectively for unit regions that are arranged adjacent to one another in the movement direction and adjacent to one another in the carrying direction.

3. A method of judging whether or not darkness of a foreign matter has been read according to claim 1, wherein:
    the reference value is determined for each of the row regions.

4. A method of calculating a representative value of darkness of a test pattern by reading the darkness of the test pattern using the method of judging whether or not darkness of a foreign matter has been read according to claim 1, wherein:
    as for a row region whose occupancy rate is smaller than the first occupancy-rate threshold, an average value of all of the readout values read for that row region is adopted as a representative value of darkness of that row region.

5. A method of calculating a representative value of darkness of a test pattern according to claim 4, wherein:
    as for a row region whose occupancy rate is equal to or larger than the first occupancy-rate threshold, an average value of readout values obtained by excluding readout values that correspond to said section from all of the readout values read for that row region is adopted as a representative value of darkness of that row region.

6. A method of calculating a representative value of darkness of a test pattern according to claim 5, wherein:
    a second occupancy-rate threshold that is larger than the first occupancy-rate threshold is employed; and
    if there is even one row region whose occupancy rate is equal to or larger than the second occupancy-rate threshold, then an error message is given out.

7. A method of calculating a representative value of darkness of a test pattern according to claim 4, wherein:
    the test pattern includes
        a front-end processing section for obtaining a front-end-section correction value that is used at the time of performing printing on a front-end section, in the carrying direction, of the medium,
        a rear-end processing section for obtaining a rear-end-section correction value that is used at the time of performing printing on a rear-end section of the medium, and
        an intermediate processing section for obtaining an intermediate-section correction value that is used at the time of performing printing on an intermediate section located between the front-end section and the rear-end section; and
    the first occupancy-rate threshold is set respectively for the front-end processing section, the intermediate processing section, and the rear-end processing section.

8. A method of judging whether or not darkness of a foreign matter on a test pattern printed on a medium with predetermined darkness has been read at the time of reading the darkness of the test pattern using a reading section, the method comprising:
    detecting a section in the test pattern for which an amount of deviation, from a predetermined reference value, of a readout value on the darkness of that section exceeds a predetermined darkness-deviation threshold which is a threshold adopted for the deviation in darkness; and
    judging whether or not the darkness of the foreign matter has been read based on a size of said section that has been detected,
    wherein:
        the test pattern is printed by repeating an ink ejection operation in which ink is ejected from a nozzle while the nozzle is being moved in a movement direction, and a carry operation in which the medium is carried in a carrying direction that intersects with the movement direction;
        readout values on the darkness of the test pattern are generated respectively for unit regions that are arranged adjacent to one another in the movement direction and adjacent to one another in the carrying direction;

the test pattern is divided up, in the carrying direction, into row regions, each of the row regions being made up of a plurality of the unit regions that are arranged adjacent to one another in the movement direction;

the detection of said section is performed row-region-by-row-region;

the size of said section is obtained as an occupancy rate indicating a ratio of the size of said section with respect to a size of a row region that is targeted for the detection;

if the obtained occupancy rate is equal to or larger than a predetermined first occupancy-rate threshold which is a threshold adopted for the occupancy rate, then it is judged that the darkness of the foreign matter has been read;

when a total number of the unit regions for which the readout values have been obtained in the row region that is targeted for the detection is defined as Fs, a number of the unit region in the targeted row region for which the amount of deviation, from the reference value, of the readout value of that unit region exceeds the darkness-deviation threshold is defined as Ft, and the occupancy rate is defined as R, the occupancy rate R is R=Ft/Fs;

the reference value is determined for each of the row regions; in determining the reference value, it is judged which of either a maximum value and a minimum value of the readout values for the row region that is targeted for the detection indicates darkness on the foreign-matter side, and of the maximum value and the minimum value, the value that has not been judged to be the darkness on the foreign-matter side is determined as the reference value for the targeted row region;

taking a median value between the maximum value and the minimum value as a border, a number of unit regions whose readout values are larger than the median value and a number of unit regions whose readout values are smaller than the median value are counted for each of the row regions; and the maximum value is judged to be the darkness on the foreign-matter side for a row region in which the number of unit regions whose readout values are larger than the median value is smaller, whereas the minimum value is judged to be the darkness on the foreign-matter side for a row region in which the number of unit regions whose readout values are smaller than the median value is smaller.

9. An apparatus that judges whether or not darkness of a foreign matter has been read, the apparatus comprising:

a reading section that reads the darkness of a test pattern printed on a medium with predetermined darkness; and a controller that:

detects a section in the test pattern for which an amount of deviation, from a predetermined reference value, of a readout value on the darkness of that section exceeds a predetermined darkness-deviation threshold which is a threshold adopted for the deviation in darkness, and judges whether or not the darkness of the foreign matter on the test pattern has been read based on a size of said section that has been detected, wherein the test pattern is divided up into row regions, each of the row regions being made up of a plurality of the unit regions that are arranged adjacent to one another in the movement direction of a nozzle, and the detection of said section is performed row-region-by-row-region, wherein the size of said section is obtained as an occupancy rate indicating a ratio of the size of said section with respect to a size of a row region that is targeted for the detection, and if the obtained occupancy rate is equal to or larger than a predetermined first occupancy-rate threshold which is a threshold adopted for the occupancy rate, then a judgment is made that the darkness of the foreign matter has been read, wherein when a total number of the unit regions for which the readout values have been obtained in the row region that is targeted for the detection is defined as Fs, a number of the unit region in the targeted row region for which the amount of deviation, from the reference value, of the readout value of that unit region exceeds the darkness-deviation threshold is defined as Ft, and the occupancy rate is defined as R, the occupancy rate R is calculated according to the following equation:

$$R=Ft/Fs.$$

* * * * *